United States Patent
Quan et al.

(10) Patent No.: US 12,520,352 B2
(45) Date of Patent: Jan. 6, 2026

(54) WIRELESS COMMUNICATION METHOD, AND DEVICE

(71) Applicant: GUANGDONG OPPO MOBILE TELECOMMUNICATIONS CORP., LTD., Dongguan (CN)

(72) Inventors: Yingqiao Quan, Dongguan (CN); Lei Huang, Singapore (SG); Pei Zhou, Dongguan (CN); Ronghui Hou, Dongguan (CN); Liuming Lu, Dongguan (CN); Chaoming Luo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/272,847

(22) Filed: Jul. 17, 2025

(65) Prior Publication Data

US 2025/0351206 A1    Nov. 13, 2025

Related U.S. Application Data

(63) Continuation of application No. 18/674,481, filed on May 24, 2024, which is a continuation of application No. PCT/CN2021/133662, filed on Nov. 26, 2021.

(51) Int. Cl.
*H04W 76/10* (2018.01)
*H04W 74/0816* (2024.01)
*H04W 84/12* (2009.01)

(52) U.S. Cl.
CPC ....... *H04W 76/10* (2018.02); *H04W 74/0816* (2013.01); *H04W 84/12* (2013.01)

(58) Field of Classification Search
CPC .. H04W 76/10; H04W 74/0816; H04W 84/12
See application file for complete search history.

(56) References Cited

U.S. PATENT DOCUMENTS

| | | | | |
|---|---|---|---|---|
| 2022/0408367 A1* | 12/2022 | Shafin | ................... | H04W 76/14 |
| 2023/0180314 A1* | 6/2023 | Kim | ....................... | H04W 72/04 |
| 2023/0199850 A1* | 6/2023 | Li | ..................... | H04W 74/0816 |
| | | | | 370/329 |

FOREIGN PATENT DOCUMENTS

| | | |
|---|---|---|
| WO | 2021215753 A1 | 10/2021 |
| WO | 2022270833 A1 | 12/2022 |

OTHER PUBLICATIONS

International Search Report in the international application No. PCT/CN2021/133662, mailed on Aug. 31, 2022. 6 pages with English translation.
Written Opinion of the International Search Authority in the international application No. PCT/CN2021/133662, mailed on Aug. 31, 2022. 10 pages with English translation.

(Continued)

*Primary Examiner* — Farid Seyedvosoghi
(74) *Attorney, Agent, or Firm* — BAYES PLLC

(57) ABSTRACT

A wireless communication method includes that: an access point (AP) determines a second non-access point (non-AP) station (STA). The second non-AP STA is a receiver device that is to perform a peer-to-peer (P2P) transmission with a first non-AP STA. A non-access point station and an access point are also provided.

20 Claims, 22 Drawing Sheets

(56) References Cited

OTHER PUBLICATIONS

Liwen Chu, "CC36 comment resolution: Triggered TXOP Sharing", IEEE P802.11 Wireless LANs, IEEE 802.11-21/1509r0, Aug. 20, 2020, pp. 7-11.

Stephane Baronn et al., "Triggered P2P transmissions follow up", IEEE 802.11-20/0813r7, Aug. 31, 2020, pp. 4-5.

IEEE P802.11be™/D1.2, "Draft Standard for Information technology—Tele-communications and information exchange between systems Local and metropolitan area networks—Specific requirements", IEEE P802.11be™/D1.2, Sep. 2021, pp. 315-318, pp. 354-362.

Jay Yang (Nokia): "TB SU PPDU and TB P2P PPDU Consideration", IEEE Draft; Nov. 20, 1938 -00 -00BE-TB-SU-PPDU-AND-TB-P2P-P PDU-Consideration, IEEE-SA Mentor, Piscataway, NJ USA vol. 802.11 EHT; 802.11be, Dec. 8, 2020 (Dec. 8, 2020), pp. 1-19,XP068175418, the whole document.

Supplementary European Search Report in the European application No. 21965221.1, mailed on Nov. 29, 2024, 8 pages.

\* cited by examiner

WIRELESS COMMUNICATION METHOD, AND DEVICE

CROSS-REFERENCE TO RELATED APPLICATION

The present disclosure is a U.S. continuation application of U.S. patent application Ser. No. 18/674,481 filed on May 24, 2024, which is a continuation of International Patent Application No. PCT/CN2021/133662, entitled "WIRELESS COMMUNICATION METHOD, AND DEVICE" and filed on Nov. 26, 2021. The disclosures of the above applications are hereby incorporated by reference in their entirety.

TECHNICAL FIELD

Embodiments of the present disclosure relate to the technical field of communications, and in particular to a wireless communication method, a non-access point station, and an access point.

BACKGROUND

Wireless local area networks (WLANs) are widely applied in scenarios such as enterprises and homes due to their low cost, flexibility, and easy scalability, etc. Various peer-to-peer (P2P) communication technologies applied in wireless fidelity (Wi-Fi) networks have been designed and promoted by standardization organizations related to wireless local area networks and manufacturers, which allow Wi-Fi devices to bypass access points (APs) for P2P communication, thereby reducing occupation of wireless resources during a communication process and channel overhead.

In order to improve the efficiency of P2P transmission, a transmission opportunity (TXOP) sharing mechanism has been introduced, in which an AP device assists a station (STA) in competing for channels for P2P transmission. However, in practical applications, there are some functionally restricted multi-link devices (MLDs), such as an MLD that is restricted by non-simultaneous transmit and receive (NSTR), or an MLD working on an NSTR link pair. For such an MLD, operating multiple links simultaneously in the MLD may actually lead to performance degradation, or operating multiple links simultaneously in the MLD may lead to the performance not reaching the expected level. Therefore, how to perform the P2P transmission to improve the performance of the P2P transmission is an urgent issue that needs to be solved.

SUMMARY

The present disclosure provides a wireless communication method, a non-access point station, and an access point.

In a first aspect, a method for wireless communication is provided, which includes: an access point (AP) determines a second non-access point (non-AP) station (STA), where the second non-AP STA is a receiver device that is to perform a P2P transmission with a first non-AP STA.

In a second aspect, a non-access point station (non-AP STA) is provided, which includes a memory configured to store a computer program; and a processor configured to invoke and run the computer program stored in the memory to perform operations comprising: sending, through a transceiver to an access point (AP), first indication information indicating a second non-AP STA, wherein the second non-AP STA is to perform a peer-to-peer (P2P) transmission with the non-AP STA.

In a third aspect, an access point (AP) is provided, which is configured to perform the method in the above first aspect or various implementations thereof.

DETAILED DESCRIPTION

The technical solutions in embodiments of the present disclosure will be described in conjunction with the accompanying drawings in the embodiments of the present disclosure below, and it will be obvious that the described embodiments are part of embodiments of the present disclosure, but not all of them. With respect to embodiments in the present disclosure, all other embodiments obtained by those ordinarily skilled in the art without making creative efforts fall within the scope of protection of the present disclosure.

The technical solutions of embodiments of the present disclosure may be applied to various communication systems, such as: wireless local area network (WLAN), wireless fidelity (Wi-Fi), or other communication systems.

Figure 1:
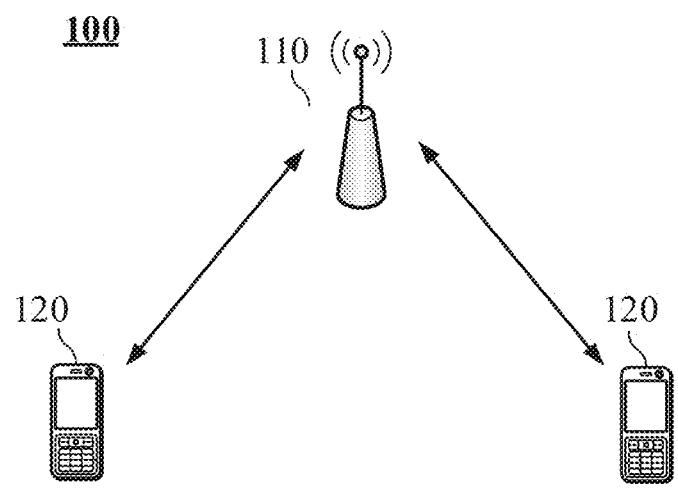
FIG. 1 is a schematic diagram of a communication system architecture provided by an embodiment of the present disclosure.

Exemplary, a communication system 100 to which embodiments of the present disclosure are applied is shown in FIG. 1. The communication system 100 may include an access point (AP) 110 and stations (STAs) 120 that accesses a network through the access point 110.

In some scenarios, AP is also referred to as AP STA, which means that in a sense, AP is also a type of STA.

In some scenarios, STA is also referred to as non-AP STA.

The communication in the communication system 100 may be a communication between an AP and a non-AP STA, a communication between a non-AP STA and a non-AP STA, or a communication between a STA and a peer STA. Here, the peer STA may refer to a device that communicates with STA in a peer-to-peer manner, for example, the peer STA may be an AP or a non-AP STA.

AP is functioned as a bridge connecting wired and wireless networks, mainly used to connect various wireless network clients together, and then connect the wireless network to Ethernet. The AP device may be a terminal device with a Wi-Fi chip (such as a smartphone) or a network device (such as a router).

It should be understood that the role of STA in the communication system is not absolute. For example, in some scenarios, when a smartphone is connected to a router, the smartphone is a non-AP STA, and when the smartphone serves as a hotspot for other smartphones, the smartphone plays the role of AP.

AP and non-AP STA may be devices used in the Internet of Vehicles, Internet of Things (IoT) nodes and sensors in the IoT, smart cameras, smart remote controls, smart water and electricity meters in smart homes, and sensors in smart cities.

In some embodiments, non-AP STA may support the 802.11be standard. Non-AP STA may also support various current and future wireless local area network (WLAN) standards of the 802.11 family, including 802.11ax, 802.11ac, 802.11n, 802.11g, 802.11b, and 802.11a, etc.

In some embodiments, AP may be a device that supports the 802.11be standard. AP may also be a device that supports various current and future WLAN standards of the 802.11 family, including 802.11ax, 802.11ac, 802.11n, 802.11g, 802.11b, and 802.11a, etc.

In embodiments of the present disclosure, STA may be a mobile phone, a pad, a computer, a virtual reality (VR) device, an augmented reality (AR) device, a wireless device in industrial control, a set-top box, a wireless device in self-driving, a vehicle communication device, a wireless device in remote medical, a wireless device in smart grid, a wireless device in transportation safety, a wireless device in smart city, a wireless device in smart home, or a wireless communication chip/ASIC/SOC/etc. that supports WLAN or Wi-Fi technology.

WLAN technology may support frequency bands, including but not limited to: low frequency bands (such as 2.4 GHZ, 5 GHZ, and 6 GHZ) and high frequency bands (such as 60 GHz).

FIG. 1 exemplarily illustrates one AP STA and two non-AP STAs. In an example, the communication system 100 may include multiple AP STAs as well as other numbers of non-AP STAs, which are not limited in embodiments of the present disclosure.

It should be understood that a device with a communication function in a network/system in embodiments of the present disclosure may be referred to as a communication device. Taking the communication system 100 shown in FIG. 1 as an example, the communication device may include an access point 110 and a station 120 with communication functions, and the access point 110 and the station 120 may be specific devices described above, which will not be repeated here. The communication device may also include other devices in the communication system 100 such as a network controller, a gateway and other network entities, which are not limited by embodiments of the present disclosure.

It should be understood that the terms "system" and "network" are often used interchangeably in the present disclosure. The term "and/or" in the present disclosure is only an association relationship describing associated objects and represents that three relationships may exist. For example, A and/or B may represent three conditions: i.e., independent existence of A, existence of both A and B, and independent existence of B. In addition, character "/" in the present disclosure usually represents that previous and next associated objects form an "or" relationship.

It should be understood that the reference to "indication" in embodiments of the present disclosure may be indicating directly, may be indicating indirectly, or may be indicative of an association. For example, A indicates B, which can mean that A directly indicates B, for example, B can be obtained through A. It can also mean that A indirectly indicates B, for example, A indicates C, and B can be obtained through C. It can also mean that there is an association between A and B.

In the description of embodiments of the present disclosure, the term "corresponding" may indicate a direct correspondence or an indirect correspondence between the two, may also mean that there is an association between the two, may also be a relationship between indication and being indicated, configuration and being configured, etc.

In embodiments of the present disclosure, "predefined" may be achieved by pre-storing corresponding codes, tables or other modes that may indicate relevant information in devices (e.g., including access points and stations), and the present disclosure does not limit the specific implementation thereof. For example, predefined may refer to being defined in the protocol.

In order to facilitate understanding of the technical solutions of embodiments of the present disclosure, the related terms of the present disclosure are explained below.

Association identifier (AID) is used to identify a terminal established an association with the access point.

Medium access control (MAC), which is the abbreviation for medium access control address.

Transmission opportunity (TXOP) refers to a period of time during which a device with the transmission opportunity may initiate one or more transmissions proactively.

In order to facilitate understanding of the technical solutions of embodiments of the present disclosure, the multi-link device (MLD) involved in the present disclosure is explained below.

Wireless devices support multi-band communications, such as simultaneous communication on the 2.4 GHz, 5 GHZ, 6 GHZ, and 60 GHz frequency bands, or simultaneous communication on different channels in the same frequency band (or different frequency bands), thereby improving communication throughput and/or reliability between devices. This type of device is often referred to as a multi-band device, or an MLD, sometimes also referred to as a multi-link entity or a multi-band entity. The multi-link device may be an access point device or a station device. If the multi-link device is an access point device, then the multi-link device includes one or more APs; if the multi-link device is a station device, then the multi-link device includes one or more non-AP STAs.

A multi-link device including one or more APs is also referred to as an AP MLD, and a multi-link device including one or more non-AP STAs is also referred to as a non-AP MLD. In embodiments of the present disclosure, the non-AP MLD may be referred to as a STA MLD.

In embodiments of the present disclosure, the AP MLD may include multiple APs, while the non-AP MLD may include multiple STAs. Multiple links may be formed between the APs in the AP MLD and the STAs in the non-AP MLD, and data communication may be performed between an AP in the AP MLD and a corresponding STA in the non-AP MLD through a corresponding link.

Figure 2:
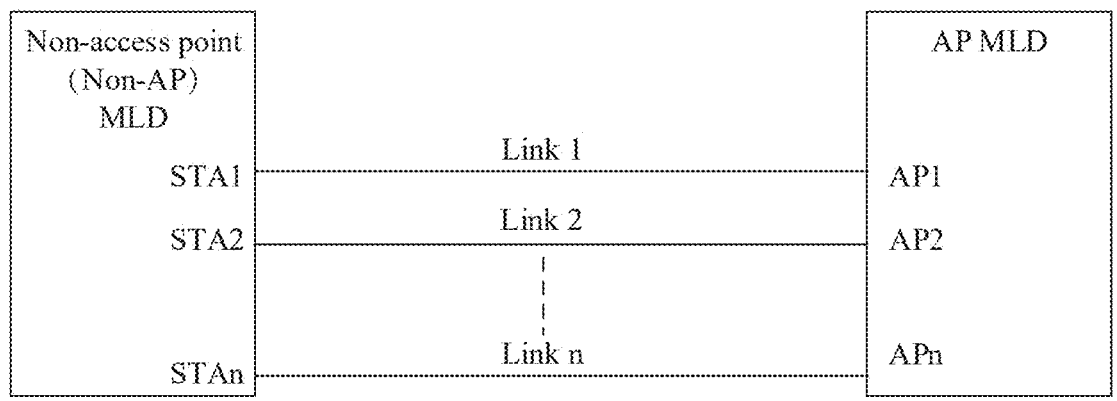
FIG. 2 is a schematic diagram of an application scenario according to an embodiment of the present disclosure.

As shown in FIG. 2, AP MLD may include AP1, AP2, etc. non-AP MLD includes STA1, STA2, etc., here link 1 is formed between AP1 and STA1, link 2 is formed between AP2 and STA2, etc. Data communication may be performed between AP1 and STA1 through link 1, and data communication may be performed between AP2 and STA2 through link 2.

In order to facilitate understanding of the technical solutions of embodiments of the present disclosure, the peer-to-peer (P2P) transmission involved in the present disclosure is explained below.

Wireless local area networks are widely applied in scenarios such as enterprises and homes due to their low cost, flexibility, and easy scalability, etc. Various P2P communication technologies applied in Wi-Fi networks have been designed and promoted by standardization organizations related to wireless local area networks and manufacturers, such as Wi-Fi direct connection and tunneled direct-link setup (TDLS), etc., which allow Wi-Fi devices to bypass AP for peer-to-peer communication, thereby reducing the occupation of wireless resources during a communication process and channel overhead.

In order to facilitate understanding of the technical solutions of embodiments of the present disclosure, the transmission opportunity (TXOP) sharing mechanism related to the present disclosure is explained below.

It is proposed by the 802.11be working group that, compared to STA devices directly competing for transmission opportunities and performing the P2P transmission, if AP devices are required to assist STAs in competing for channels for P2P transmission, the probability of AP devices successfully obtaining channel access rights is higher, which can enable the P2P transmission to start earlier and also facilitate AP devices in managing wireless medium (WM) within their basic service set (BSS).

In the 802.11be draft, a trigged TXOP sharing mechanism achieved using a multiple users request to send (MU-RTS) TXOP sharing (TXS) trigger frame is designed to support the P2P transmission with AP assistance.

Figure 3:
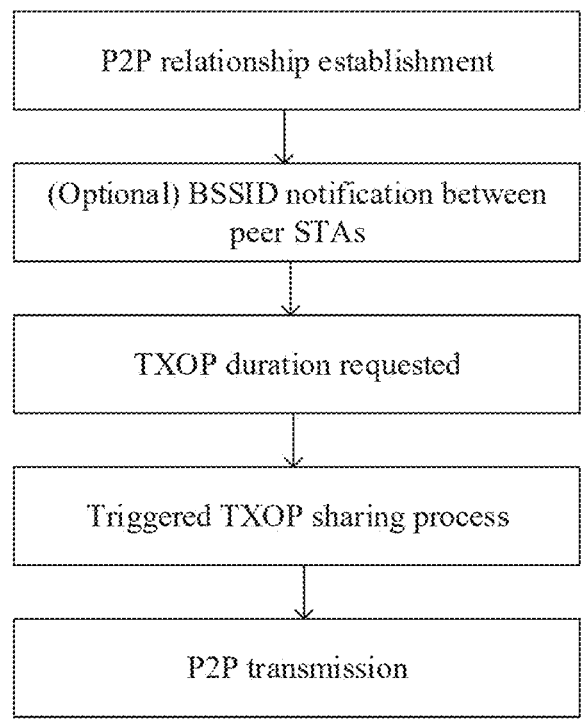
FIG. 3 is a schematic flowchart of P2P transmission based on a triggered TXOP sharing mechanism.

In some scenarios, after establishing a P2P relationship, triggered TXOP sharing may be performed based on the process illustrated in FIG. 3 to support the P2P transmission.

For example, a P2P relationship between non-AP STAs is firstly established, such as establishing a Wi-Fi direct connection or TDLS.

In a further example, BSSIDs of peer STAs are notified between non-AP STAs. That is, non-AP MLDs interact the BSSID corresponding to their respective BSS.

Then an initiator device for P2P transmission applies for a TXOP duration, and the AP executes a triggered TXOP sharing process to share the TXOP obtained by the AP with the initiator device for P2P transmission.

Furthermore, the initiator device for P2P transmission may initiate a P2P transmission based on the TXOP shared by the AP.

Figure 4:
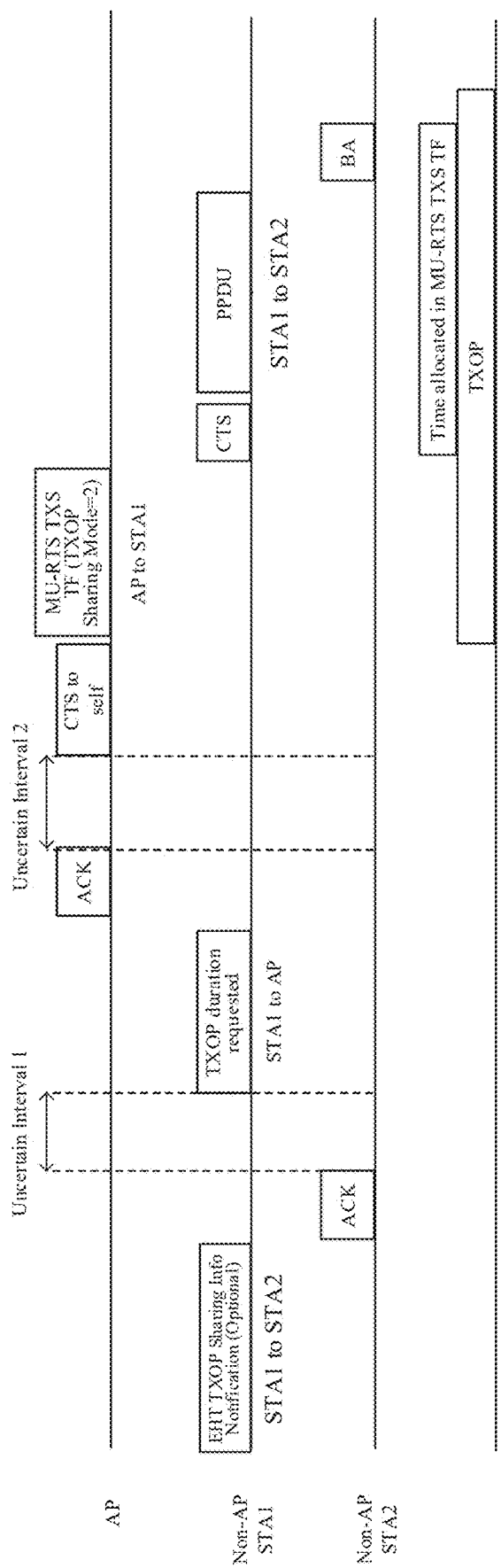
FIG. 4 is a schematic interaction diagram of P2P transmission based on a triggered TXOP sharing mechanism.

FIG. 4 is a schematic interaction diagram of P2P transmission based on a triggered TXOP sharing mechanism.

It should be understood that in the examples illustrated in FIG. 3 and FIG. 4, the specific manner or process for establishing a P2P relationship between non-AP STAs is not limited. Therefore, the relevant process for establishing the P2P relationship is omitted.

It should also be understood that the unknown intervals, i.e., an uncertain interval 1 and an uncertain interval 2 illustrated in FIG. 4 are not inter-frame intervals under the 802.11 standard. The specific time depends on the implementation of AP MLD and the specific channel state, which may range from tens of microseconds to hundreds of milliseconds.

As illustrated in FIG. 4, the non-AP STA1 is the initiator device for P2P transmission, and the non-AP STA2 is a receiver device for P2P transmission. The non-AP STA1 may send a TXOP duration request to the AP when the P2P transmission is needed. When receiving the TXOP duration request, the AP may achieve the trigged TXOP sharing mechanism through a MU-RTS TXS trigger frame, to share the TXOP obtained by the AP with the non-AP STA1, so that the non-AP STA1 may use the TXOP shared by the AP to send a physical layer protocol data unit (PPDU) to the non-AP STA2.

It is suggested in 802.11be to impose some restrictions on the transmission of some MLDs with restricted functions. For example, the MLDs with restricted functions may include MLDs that subject to non-simultaneous transmit and receive (NSTR) restrictions, or non-AP MLDs that work on NSTR link pairs.

Figure 5:
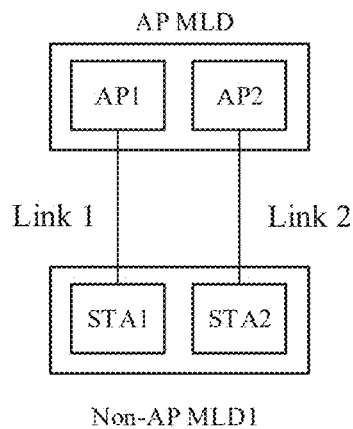
FIG. 5 is a schematic diagram of a NSTR link pair according to an embodiment of the present disclosure.

In some scenarios, operating multiple links simultaneously in MLD may actually lead to performance degradation, or operating multiple links simultaneously in MLD may lead to the performance not reaching the expected level. For example, for some link combinations operated by the MLD, due to the characteristics of the frequency resources used by the links and internal interference within the MLD (due to close internal distances within the device, the power leakage of other links during transmission causes excessive interference to the frequency resource of the link), it is not possible to simultaneous transmit and receive on these link combinations. These link combinations are referred to as NSTR link pairs. When the MLD works on NSTR link pairs, it is considered to be subject to NSTR restrictions. As illustrated in FIG. 5, for non-AP MLD1, link 1 and link 2 are an NSTR link pair. When the non-AP MLD1 receives data on one of link 1 and link 2, it should not send data on another link that forms an NSTR link pair with the link to prevent data reception failure.

Figure 6:
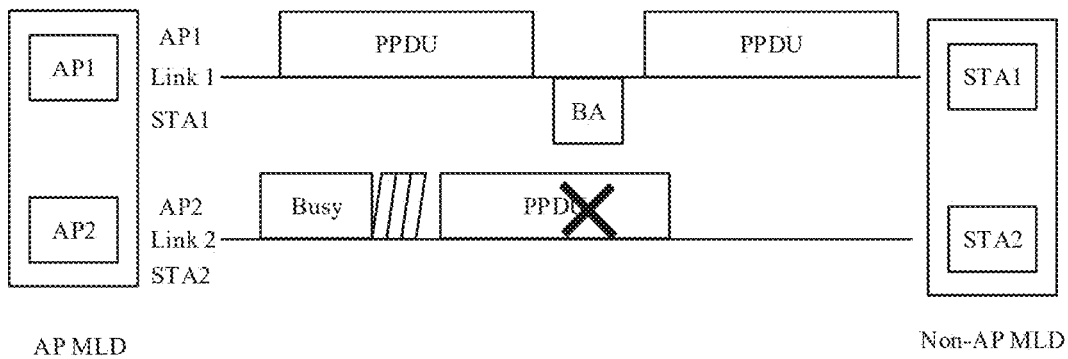
FIG. 6 is a schematic diagram of P2P transmission of an MLD restricted by NSTR.

In conjunction with FIG. 6, the possible transmission issues of MLD working on an NSTR link pair are explained.

As illustrated in FIG. 6, for non-AP MLD1, link 1 and link 2 are an NSTR link pair. If data sent to the non-AP MLD1 by other STAs requires an immediate response, transmission conflicts may occur due to NSTR restriction, resulting in unnecessary overhead.

For example, since non-AP MLD1 needs to feedback an acknowledgement frame (such as a block acknowledgement (BA) frame) to AP1 after completing receiving a physical layer protocol data unit (PPDU) sent by AP1 of the AP MLD on link 1, if at this time, the non-AP MLD1 is receiving other data on link 2, the transmission of the BA frame is likely to interfere with the reception of data on link 2 due to NSTR restrictions, resulting in failure to receive some PPDUs.

To reduce the above overhead, in some scenarios, it is recommended to use a synchronous transmission mechanism, also referred to as a synchronous PPDU mechanism, that is, the sent PPDUs are aligned in time, so that MLD may receive data and reply a response simultaneously on the working NSTR link pair, avoiding issues of data receiving failure or response failure caused by NSTR restrictions.

The above synchronous transmission mechanism is mainly aimed at non-P2P transmission (i.e., downlink transmission from the AP MLD to the non-AP MLD and uplink transmission from the non-AP MLD to AP MLD). For P2P transmission, how to perform data transmission to reduce unnecessary overhead is an urgent issue that needs to be solved.

In order to facilitate understanding of the technical solutions of embodiments of the present disclosure, the technical solutions of the present disclosure will be described in detail below by way of specific embodiments. As an optional solution, the above related technology may be arbitrarily combined with the technical solutions of embodiments of the present disclosure, and all of them belong to the protection scope of embodiments of the present disclosure. Embodiments of the present disclosure include at least some of the following.

Figure 7:
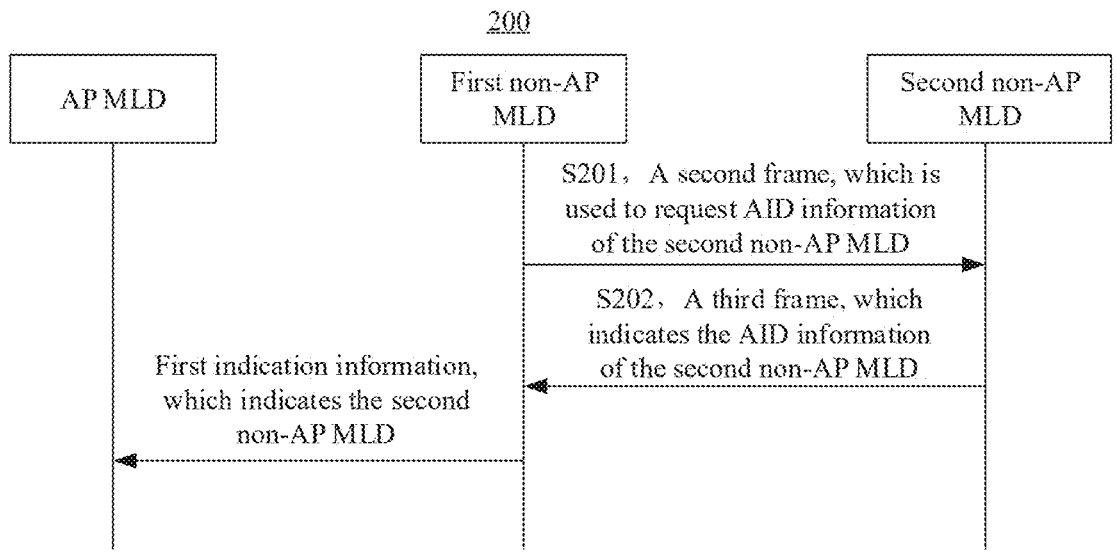
FIG. 7 is a schematic interactive diagram of a wireless communication method provided by an embodiment of the present disclosure.

FIG. 7 is a schematic interactive diagram of a wireless communication method 200 according to an embodiment of the present disclosure. As illustrated in FIG. 7, the method 200 including the following operation.

In S210, a first non-access point (non-AP) multi-link device (MLD) sends first indication information to an access point (AP) MLD, where first indication information indicates a second non-AP MLD, and the second non-AP MLD is a non-AP MLD that is to perform a peer-to-peer (P2P) transmission with the first non-AP MLD.

In some embodiments, the first non-AP MLD is an initiator device (or referred to as a sender device) for the P2P transmission, and the second non-AP MLD is a responder device (or referred to as a receiver device) for the P2P transmission.

In some embodiments, when the first non-AP MLD and the second non-AP MLD belong to the same BSS, the first non-AP MLD sends the first indication information to the AP MLD.

In some embodiments, the first non-AP MLD sends TXOP duration requested information to the AP MLD for P2P transmission.

That is, the P2P transmission between the first non-AP MLD and the second non-AP MLD may be a P2P transmission based on a triggered TXOP sharing mechanism.

For example, before initiating the P2P transmission, the first non-AP MLD sends TXOP duration requested information to the AP MLD to request a TXOP for P2P transmission. After receiving the TXOP duration requested information, the AP MLD may execute a triggered TXOP sharing process. Specifically, the AP MLD first sends a CTS to self frame, and further sends an MU-RTS TXS trigger frame to the first non-AP MLD, here a TXOP sharing mode in the MU-RTS TXS trigger frame is set to 2, which represents that this TXOP sharing can be used for P2P transmission.

In some embodiments, the first non-AP MLD is a functionally restricted (e.g., restricted by NSTR) MLD.

For example, the first non-AP MLD works on multiple links including at least one NSTR link pair, which includes two links that cannot simultaneously transmit and receive. That is, the first non-AP MLD cannot simultaneously transmit and receive data on the NSTR link pair.

In some embodiments, the second non-AP MLD is a functionally restricted (e.g., restricted by NSTR) MLD.

For example, the second non-AP MLD works on multiple links including at least one NSTR link pair, which includes two links that cannot simultaneously transmit and receive. That is, the second non-AP MLD cannot simultaneously transmit and receive data on the NSTR link pair.

In some embodiments, when the second non-AP MLD is a functionally restricted MLD and/or the first non-AP MLD is a functionally restricted MLD, the first non-AP MLD sends the first indication information to the AP MLD.

As mentioned above, for a functionally restricted MLD, operating multiple links simultaneously may lead to performance degradation, or operating multiple links simultaneously in MLD may lead to the performance not reaching the expected level. Therefore, when the first non-AP MLD and/or the second non-AP MLD are functionally restricted MLDs, the first non-AP MLD indicates the receiver device for P2P transmission to the AP MLD, which facilitates the AP MLD to better perform management and scheduling of link resources to achieve load balancing. Besides, it can also restrict transmission on links with interference or conflicts, which facilitates avoiding invalid transmission and retransmission caused by NSTR restrictions, increasing channel utilization, and reducing the energy consumption of the device.

In an example, when the second non-AP MLD is not a functionally restricted MLD, the first non-AP MLD does not send the first indication information to the AP MLD.

As an example rather than a limitation, the second non-AP MLD being not the functionally restricted MLD may include: the second non-AP MLD is a traditional/legacy device (such as a device that does not support an extremely high throughput (EHT)), a non-MLD (i.e., a device that does not support multi-link operation), a single RF MLD (such as an MLD that only supports transmission on one link at the same time), or an MLD where links established during the multi-link establishment phase do not constitute NSTR link pairs.

It should be noted that whether the first non-AP MLD indicates the receiver device for P2P transmission to the AP MLD may be determined according to the actual situation. For example, since the use of triggered TXOP sharing mechanism for P2P transmission is a feature introduced by 802.11be, legacy devices (such as devices that do not support EHT) will not initiate the P2P transmission through the triggered TXOP sharing mechanism, thus there will be no related compatibility issues. The primary purpose of the first non-AP MLD indicating the receiver device for P2P transmission to the AP MLD is for the AP MLD to restrict some of the transmissions of MLD and prevent reception failures caused by NSTR restrictions. Therefore, when the receiver device for P2P transmission is not an MLD restricted by NSTR, the first non-AP MLD may not indicate the receiver device for P2P transmission to the AP MLD.

In some embodiments, the first non-AP MLD may send the first indication information to the AP MLD before the P2P transmission.

For example, the first non-AP MLD sending the first indication information to the AP MLD may be executed when the first non-AP MLD sends a TXOP duration request to the AP MLD, that is, the two are executed in the same process, or the two may also be separate processes. For example, the first non-AP MLD sending the first indication information to the AP MLD and the first non-AP MLD sending the TXOP duration request to the AP MLD are executed in parallel, or executed successively. For example, the first non-AP MLD first sends the TXOP duration request to the AP MLD, and then sends the first indication information to the AP MLD. The present disclosure does not limit the specific sequence.

In some embodiments of the present disclosure, the first indication information may be identification information of the second non-AP MLD, such as AID information, MAC address information, or other identification information, as long as the AP MLD can uniquely determine the second non-AP MLD based on the identification information. The following explanations are made by taking the first indication information being the AID information or MAC address information of the second non-AP MLD as an example. When the identification information of the second non-AP MLD is other identification information, only corresponding replacement is required, which is not limited by the present disclosure.

In some embodiments of the present disclosure, before the P2P transmission, the first non-AP MLD may interact with the second non-AP MLD for their respective identification information.

In some embodiments, the first non-AP MLD may send the identification information of the first non-AP MLD (such as AID information or MAC address information of the first non-AP MLD) to the second non-AP MLD.

In some embodiments, the second non-AP MLD may send the identification information of the second non-AP MLD (such as AID information or MAC address information of the second non-AP MLD) to the first non-AP MLD.

In some embodiments, the second non-AP MLD may send the identification information of the second non-AP MLD to the first non-AP MLD based on a request from the first non-AP MLD, or autonomously. For example, when establishing a P2P relationship, the second non-AP MLD actively sends the AID information of the second non-AP MLD to the first non-AP MLD.

In some embodiments, the first non-AP MLD may send the identification information of the first non-AP MLD to the second non-AP MLD based on a request from the second non-AP MLD, or autonomously. For example, when establishing a P2P relationship, the first non-AP MLD actively sends the AID information of the first non-AP MLD to the second non-AP MLD.

In an example, the first non-AP MLD and the second non-AP MLD interacting their respective identification information may be performed using existing processes or through separate processes.

For example, the first non-AP MLD and the second non-AP MLD interacting their respective identification information may be performed when establishing the P2P relationship, that is, interacting their respective identification information during the process of establishing the P2P relationship. Alternatively, the first non-AP MLD and the second non-AP MLD interacting their respective identification information may be performed after the establishment of the P2P relationship, for example, being performed after establishing the P2P relationship and before sending the TXOP duration request to the AP MLD, which is not limited by the present disclosure.

In some embodiments, as illustrated in FIG. 7, the method 200 further includes the following operations.

In S201, the first non-AP MLD sends a second frame to the second non-AP MLD, where the second frame is used to request AID information of the second non-AP MLD and/or BSSID information of the second non-AP MLD.

In S202, the second non-AP MLD sends a third frame to the first non-AP MLD, where the third frame indicates the AID information of the second non-AP MLD and/or the BSSID information of the second non-AP MLD.

In some embodiments, the second non-AP MLD may send the third frame to the first non-AP MLD based on a request of the second frame, or may actively send the third frame.

In some embodiments, the second frame includes AID information of the first non-AP MLD and/or BSSID information of the first non-AP MLD.

That is, when requesting the AID information and/or the BSSID information of the second non-AP MLD, the first non-AP MLD simultaneously informs the second non-AP MLD of the AID information and/or the BSSID information of the first non-AP MLD.

Therefore, the second frame may have at least one of the following functions:
requesting AID information of Peer STA;
requesting BSSID information of Peer STA;
notifying AID information of Peer STA; or
notifying BSSID information of Peer STA.

In multi-link operation scenarios, Peer STA may be replaced with Peer MLD or other equivalent expressions, which is not limited by the present disclosure.

In an example, in multi-link operation scenarios, Peer STA may refer to any party of the P2P transmission, such as the sender device or the receiver device.

That is to say, the second frame may have at least one of the following functions:
requesting the AID information of the second non-AP MLD;
requesting the BSSID information of the second non-AP MLD;
notifying the AID information of the first non-AP MLD; or
notifying the BSSID information of the first non-AP MLD.

In some embodiments of the present disclosure, the second frame may be a management frame. That is, the functions of the second frame may be achieved through the management frame.

For example, the functions of the second frame are achieved by newly adding a type of management frame; alternatively, the functions of the second frame are achieved by utilizing an existing type of management frame.

In some embodiments, the second frame may be an Action frame. That is, the functions of the second frame may be achieved through the Action frame.

For example, the functions of the second frame are achieved by newly adding a type of Action frame; alternatively, the functions of the second frame are achieved by utilizing an existing type of Action frame.

In some embodiments, the second frame is an extremely high throughput (EHT) Action frame. That is, the functions of the second frame may be achieved by the EHT Action frame.

For example, a type of EHT Action frame is newly added to the Action frame to achieve the functions of the second frame, or an existing type of EHT Action frame is utilized to achieve the functions of the second frame.

In some embodiments of the present disclosure, the third frame may be implemented in a manner similar to the second frame.

That is to say, the third frame may have at least one of the following functions:
requesting the AID information of the first non-AP MLD;
requesting the BSSID information of the first non-AP MLD;
notifying the AID information of the second non-AP MLD; or
notifying the BSSID information of the second non-AP MLD.

In embodiments of the present disclosure, for ease of distinction and explanation, the EHT Action frame used to notify Peer STA information between non-AP MLDs is referred to as a Peer STA Information Notification (Peer STA Info Notification) frame, which is not limited by the present disclosure. That is, the second frame and the third frame may be a type of Peer STA Info Notification frame.

It should be noted that the naming of frames or fields in embodiments of the present disclosure is only for example or for ease of distinction and explanation, and should not constitute any limitation in the present disclosure. The function or meaning of frames or fields should be determined based on their content. For example, the Peer STA Info Notification frame may be used to notify Peer STA information and/or request Peer STA information. Here, the Peer STA information may include AID information and/or BSSID information of Peer MLD.

Combined with specific embodiments below, the frame format design for Peer STA Info Notification frame implemented through the EHT Action frame is explained.

In some embodiments, the EHT Action frame includes an AID requested field and/or an AID field, the AID requested field indicates whether to request AID information of Peer STA (such as Peer non-AP MLD), and the AID field indicates AID information of Peer STA (such as Peer non-AP MLD).

In other embodiments, the EHT Action frame may include at least one of the following fields:
a BSSID requested field, which indicates whether to request BSSID information of the Peer STA (such as Peer non-AP MLD);
a BSSID field, which indicates BSSID information of the Peer STA (such as Peer non-AP MLD);
an AID requested field, which indicates whether to request the AID information of the Peer STA (such as Peer non-AP MLD); or
an AID field, which indicates the AID information of the Peer STA (such as Peer non-AP MLD).

For the second frame send by the first non-AP MLD, the AID field indicates the AID information of the first non-AP MLD, and the BSSID field indicates the BSSID information of the first non-AP MLD.

For the third frame send by the second non-AP MLD, the AID field indicates the AID information of the second non-AP MLD, and the BSSID field indicates the BSSID information of the second non-AP MLD.

In some embodiments, the EHT Action frame includes a Peer STA Info Notification Control field, which indicates control information for notifying Peer STA information, or in other words, control information for notifying the Peer STA information to the Peer MLD.

In some embodiments, the EHT Action frame also includes a Category field and an EHT Action field. Here, the Category field indicates that the type of the Action frame is an EHT Action frame, and the EHT Action field indicates the specific EHT Action type.

For example, an EHT Action type may be newly added to notify the Peer STA information and/or request the Peer STA information.

In embodiments of the present disclosure, the above fields are carried in an Action field of the EHT Action frame.

Table 1 shows an Action field format of a Peer STA Info Notification frame. As shown in Table 1, the Action field of the Peer STA Info Notification frame may include a Category field, an EHT Action field, a Peer STA Info Notification Control field, and an AID field. Here, the Category field indicates that the type of the Action frame is an EHT Action frame, the EHT Action field indicates the specific EHT Action type, the Peer STA Info Notification Control field indicates the control information for notifying the Peer STA information, and the AID field indicates the AID information of the Peer MLD.

TABLE 1

Peer STA Info Notification Frame Action field values

| Value | Meaning |
| --- | --- |
| 1 | Category |
| 2 | EHT Action |

TABLE 1-continued

Peer STA Info Notification Frame Action field values

| Value | Meaning |
|---|---|
| 3 | Peer STA Info Notification Control |
| 4 | AID |

Table 2 shows another Action field format of the Peer STA Info Notification frame. As shown in Table 2, the Action field of the Peer STA Info Notification frame may include a Category field, an EHT Action field, a Peer STA Info Notification Control field, a BSSID field, and an AID field. Here, the Category field indicates that the type of the Action frame is an EHT Action frame, the EHT Action field indicates the specific EHT Action type, the Peer STA Info Notification Control field indicates the control information for notifying the Peer STA information, the BSSID field indicates the BSSID information of the Peer MLD, and the AID field indicates the AID information of the Peer MLD.

TABLE 2

Peer STA Info Notification Frame Action field values

| Value | Meaning |
|---|---|
| 1 | Category |
| 2 | EHT Action |
| 3 | Peer STA Info Notification Control |
| 4 | BSSID |
| 5 | AID |

In the frame formats shown in Tables 1 and 2, the value of the EHT Action field is set to a new action type value to indicate the functions of the EHT Action, i.e., used to notify the Peer STA information and/or request the Peer STA information.

Table 3 shows a correspondence between the value of the EHT Action field and the action type of the Peer STA Info Notification frame.

TABLE 3

| Value | Meaning |
|---|---|
| 0 | EHT compressed beamforming/channel quality indicator (CQI) |
| 1 | EML operation mode notification |
| x | Peer STA Info Notification |

Here, x is the newly added type value. When the value of the EHT Action field in the EHT Action frame is x, it represents that the EHT Action frame is used for notifying the Peer STA information and/or requesting the Peer STA information.

In some embodiments of the present disclosure, the Peer STA Info Notification Control field includes:
  an AID Requested field, which indicates whether to request the AID information of the Peer STA (such as Peer non-AP MLD); and
  an AID Presented field, which indicates whether the EHT Action frame includes the AID information of the Peer STA (such as Peer non-AP MLD), or whether the EHT Action frame includes the AID field.

For the second frame send by the first non-AP MLD, the AID Requested field indicates whether the first non-AP MLD requests the AID information of the second non-AP MLD, and the AID Presented field indicates whether the EHT Action frame includes the AID information of the first non-AP MLD.

For the third frame send by the second non-AP MLD, the AID Requested field indicates whether the second non-AP MLD requests the AID information of the first non-AP MLD, and the AID Presented field indicates whether the EHT Action frame includes the AID information of the second non-AP MLD.

Figure 8:
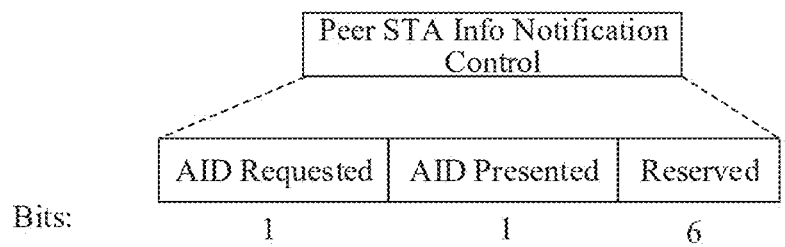
FIG. 8 is a schematic format diagram of a Peer STA Info Notification Control field according to an embodiment of the present disclosure.

FIG. 8 is a schematic format diagram of a Peer STA Info Notification Control field according to an embodiment of the present disclosure.

As illustrated in FIG. 8, the Peer STA Info Notification Control field may include the AID Requested field and the AID Presented field. In an example, a reserved field may also be included.

In an example, the length of the Peer STA Info Notification Control field is 8 bits, and the AID Requested field and the AID Presented field are 1 bit, respectively.

In some embodiments, the AID field may be a non-element field in the EHT Action frame, and is used to carry the AID information of the Peer MLD. For example, the AID field may be 12 bits, and the specific size may be determined based on the size of the AID information that needs to be carried.

In other embodiments of the present disclosure, the Peer STA Info Notification Control field includes:
  an AID Requested field, which indicates whether to request the AID information of the Peer STA (such as Peer non-AP MLD);
  an AID Presented field, which indicates whether the EHT Action frame includes the AID information of the Peer STA (such as Peer non-AP MLD);
  a BSSID Requested field, which indicates whether to request the BSSID information of the Peer STA (such as Peer non-AP MLD); and
  a BSSID Presented field, which indicates whether the EHT Action frame includes the BSSID information of the Peer STA (such as Peer non-AP MLD).

For example, for the second frame sent by the first non-AP MLD, the AID Requested field indicates whether the first non-AP MLD requests the AID information of the second non-AP MLD, the BSSID Requested field indicates whether the first non-AP MLD requests the BSSID information of the second non-AP MLD, the AID Presented field indicates whether the EHT Action frame includes the AID information of the first non-AP MLD, and the BSSID Presented field indicates whether the EHT Action frame includes the BSSID information of the first non-AP MLD.

For another example, for the third frame sent by the second non-AP MLD, the AID Requested field indicates whether the second non-AP MLD requests the AID information of the first non-AP MLD, the BSSID Requested field indicates whether the second non-AP MLD requests the BSSID information of the first non-AP MLD, the AID Presented field indicates whether the EHT Action frame includes the AID information of the second non-AP MLD, and the BSSID Presented field indicates whether the EHT Action frame includes the BSSID information of the second non-AP MLD.

Figure 9:
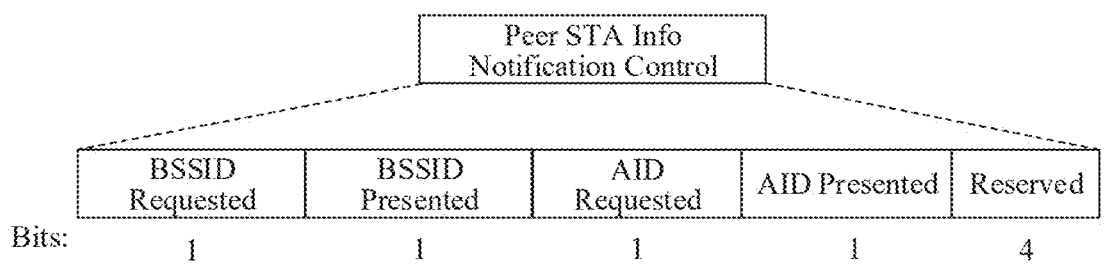
FIG. 9 is a schematic format diagram of another Peer STA Info Notification Control field according to an embodiment of the present disclosure.

FIG. 9 is a schematic format diagram of a Peer STA Info Notification Control field. As illustrated in FIG. 9, the Peer STA Info Notification Control field may include a BSSID Requested field, a BSSID Presented field, an AID Requested field, and an AID Presented field. In an example, a reserved field may also be included.

In an example, the length of the Peer STA Info Notification Control field is 8 bits, and the BSSID Requested field, the BSSID Presented field, the AID Requested field and the AID Presented field are 1 bit, respectively.

In some embodiments of the present disclosure, the BSSID field and the AID field may be non-element fields in the EHT Action frame, and are used to carry the BSSID information and the AID information of the Peer MLD, respectively.

In an example, the AID field may be 12 bits, and the specific size may be determined based on the size of the AID information that needs to be carried.

In an example, the BSSID field may be 48 bits, and the specific size may be determined based on the size of the BSSID information that needs to be carried.

It should be noted that the formats of the Peer STA Info Notification Control field illustrated in FIGS. 8 and 9 are only examples, and they can also be flexibly adjusted according to actual needs and the information to be carried, which is not limited by the present disclosure.

As a first example: when a value of the BSSID Requested field is set to 1, it represents that the receiving device of the EHT Action frame is requested to notify the sending device of the EHT Action frame of the BSSID information of the receiving device; when the value of the BSSID Requested field is set to 0, it represents that the receiving device of the EHT Action frame is not requested to notify the sending device of the EHT Action frame of the BSSID information of the receiving device.

As a second example: when a value of the BSSID Requested field is set to 0, it represents that the receiving device of the EHT Action frame is requested to notify the sending device of the EHT Action frame of the BSSID information of the receiving device; when the value of the BSSID Requested field is set to 1, it represents that the receiving device of the EHT Action frame is not requested to notify the sending device of the EHT Action frame of the BSSID information of the receiving device.

As a first example: when a value of the AID Requested field is set to 1, it represents that the receiving device of the EHT Action frame is requested to notify the sending device of the EHT Action frame of the AID information of the receiving device; when the value of the AID Requested field is set to 0, it represents that the receiving device of the EHT Action frame is not requested to notify the sending device of the EHT Action frame of the AID information of the receiving device.

As a second example: when a value of the AID Requested field is set to 0, it represents that the receiving device of the EHT Action frame is requested to notify the sending device of the EHT Action frame of the AID information of the receiving device; when the value of the AID Requested field is set to 1, it represents that the receiving device of the EHT Action frame is not requested to notify the sending device of the EHT Action frame of the AID information of the receiving device.

As a first example: when a value of the BSSID Presented field is set to 1, it represents that the EHT Action frame carries the BSSID information of the sending device of the EHT Action frame; when the value of the BSSID Presented field is set to 0, it represents that the EHT Action frame does not carry the BSSID information of the sending device of the EHT Action frame.

As a second example: when a value of the BSSID Presented field is set to 0, it represents that the EHT Action frame carries the BSSID information of the sending device of the EHT Action frame; when the value of the BSSID Presented field is set to 1, it represents that the EHT Action frame does not carry the BSSID information of the sending device of the EHT Action frame.

As a first example: when a value of the AID Presented field is set to 1, it represents that the EHT Action frame carries the AID information of the sending device of the EHT Action frame; when the value of the AID Presented field is set to 0, it represents that the EHT Action frame does not carry the AID information of the sending device of the EHT Action frame.

As a second example: when a value of the AID Presented field is set to 0, it represents that the EHT Action frame carries the AID information of the sending device of the EHT Action frame; when the value of the AID Presented field is set to 1, it represents that the EHT Action frame does not carry the AID information of the sending device of the EHT Action frame.

In the following embodiments, taking the indicating manner in the first example as an example to explain, but the present disclosure is not limited to this.

In some embodiments, the AID field is an optional field. For example, when the value of the AID Presented field is set to 0, the frame structure does not include the AID field, or the AID field is a mandatory field. For example, when the value of the AID Presented field is set to 0, the frame structure includes the AID field, but a value of the AID field is set to an invalid value (such as all zeros or all ones).

In some embodiments, the BSSID field is an optional field, for example, when the value of the BSSID Presented field is set to 0, the frame structure does not include the BSSID field, or the BSSID field is a mandatory field. For example, when the value of the BSSID Presented field is set to 0, the frame structure includes the BSSID field, but the value of the BSSID field is set to an invalid value (such as all zeros or all ones).

In some embodiments, the AID information of the Peer non-AP MLD requested by the non-AP MLD may be notified compulsively.

For example, when the first non-AP MLD requests the AID information of the second non-AP MLD, the second non-AP MLD must notify it of its AID information.

In other embodiments, the AID information of the Peer non-AP MLD requested by the non-AP MLD may be non-mandatory notified.

For example, when the first non-AP MLD requests the AID information of the second non-AP MLD, the second non-AP MLD may notify the first non-AP MLD of the AID information of the second non-AP MLD, or it may not notify the first non-AP MLD of the AID information of the second non-AP MLD. For example, the second non-AP MLD may not notify the first non-AP MLD of the AID information of the second non-AP MLD when the second non-AP MLD is not a functionally restricted device.

In some embodiments, the BSSID information of the Peer non-AP MLD requested by the non-AP MLD may be notified compulsively.

For example, when the first non-AP MLD requests the BSSID information of the second non-AP MLD, the second non-AP MLD must notify it of its BSSID information.

In other embodiments, the BSSID information of the Peer non-AP MLD requested by the non-AP MLD may be non-mandatory notified.

For example, when the first non-AP MLD requests the BSSID information of the second non-AP MLD, the second non-AP MLD may notify the first non-AP MLD of the BSSID information of the second non-AP MLD, or it may not notify the first non-AP MLD of the BSSID information of the second non-AP MLD. For example, the second non-AP MLD may not notify the first non-AP MLD of the BSSID information of the second non-AP MLD when the second non-AP MLD is not the functionally restricted device.

In an example, the second non-AP MLD being not the functionally restricted device may include: the second non-AP MLD is a traditional device (such as a device that does not support EHT), a non-MLD (i.e., a device that does not support multi-link operation), a single RF MLD (such as an MLD that only supports transmission on one link at the same time), or an MLD where links established during the multi-link establishment phase do not constitute NSTR link pairs.

Combined with specific embodiments below, the specific implementation of Peer non-AP MLDs interacting the AID information and/or BSSID information respectively is explained.

It should be understood that in the following examples, STA1 may refer to an attaching STA in the first non-AP MLD, STA2 may refer to an attaching STA in the second non-AP MLD, here the STA1 and STA2 correspond to the same link, the AID information of STA1 may refer to the AID information of the first non-AP MLD, the AID information of STA2 may refer to the AID information of the second non-AP MLD, the BSSID information of STA1 may refer to the BSSID information of the first non-AP MLD, and the BSSID information of STA2 may refer to the BSSID information of the second non-AP MLD.

Example 1: the Peer STA Info Notification frame includes AID related fields, excluding BSSID related fields, and the AID fields are mandatory fields.

In this case, the Peer STA Info Notification frame includes an AID Requested field, an AID Presented field, and an AID field.

Example 1-1

Figure 10:
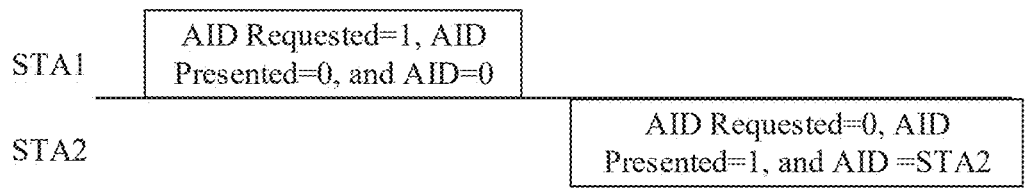
FIGS. 10 to 35 are schematic diagrams of Peer STA exchanging AID information and/or BSSID information according to embodiments of the present disclosure.

As illustrated in FIG. 10, STA1 sends a Peer STA Info Notification frame to STA2. Here, a value of the AID Requested field in the Peer STA Info Notification Control field in the Peer STA Info Notification frame is set to 1, which represents that STA1 requests the AID information of STA2. A value of the AID Presented field is set to 0, which represents that the Peer STA Info Notification frame does not carry the AID information of STA1. In this case, the AID field in the Peer STA Info Notification frame is set to all zeros.

After receiving the Peer STA Info Notification frame sent by STA1, STA2 uses a Peer STA Info Notification frame to feedback. Here, a value of the AID Requested field of the Peer STA Info Notification Control field in the Peer STA Info Notification frame is set to 0, and a value of the AID Presented field is set to 1, which represents that the Peer STA Info Notification frame carries the AID information of STA2. The AID field in the Peer STA Info Notification frame is set to be the AID information of STA2.

Example 1-2

Figure 11:
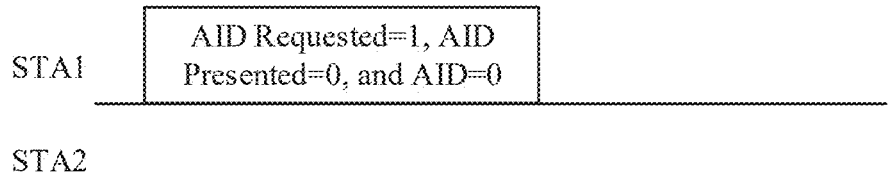

As illustrated in FIG. 11, STA1 sends a Peer STA Info Notification frame to STA2. Here, a value of the AID Requested field in the Peer STA Info Notification Control field in the Peer STA Info Notification frame is set to 1, which represents that STA1 requests the AID information of STA2. A value of the AID Presented field is set to 0, which represents that the Peer STA Info Notification frame does not carry the AID information of STA1. In this case, the AID field in the Peer STA Info Notification frame is set to all zeros.

After receiving the Peer STA Info Notification frame sent by STA1, STA2 may choose not to feedback the AID information of STA2 to STA1 due to its own reasons, such as being restricted by NSTR.

Example 1-3

Figure 12:
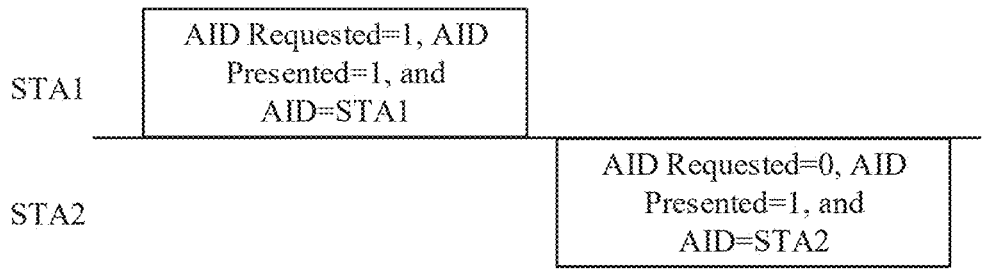

As illustrated in FIG. 12, STA1 sends a Peer STA Info Notification frame to STA2. Here, a value of the AID Requested field in the Peer STA Info Notification Control field in the Peer STA Info Notification frame is set to 1, which represents that STA1 requests the AID information of STA2. A value of the AID Presented field is set to 1, which represents that the Peer STA Info Notification frame carries the AID information of STA1. In this case, the AID field in the Peer STA Info Notification frame is set to be the AID information of STA1.

After receiving the Peer STA Info Notification frame sent by STA1, STA2 uses a Peer STA Info Notification frame to feedback. Here, a value of the AID Requested field of the Peer STA Info Notification Control field in the Peer STA Info Notification frame is set to 0, and a value of the AID Presented field is set to 1, which represents that the Peer STA Info Notification frame carries the AID information of STA2. The AID field in the Peer STA Info Notification frame is set to be the AID information of STA2.

Example 1-4

Figure 13:
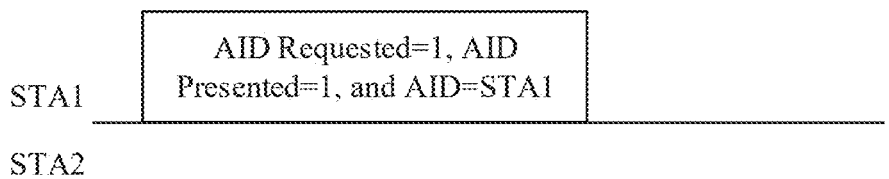

As illustrated in FIG. 13, STA1 sends a Peer STA Info Notification frame to STA2. Here, a value of the AID Requested field in the Peer STA Info Notification Control field in the Peer STA Info Notification frame is set to 1, which represents that STA1 requests the AID information of STA2. A value of the AID Presented field is set to 1, which represents that the Peer STA Info Notification frame carries the AID information of STA1. In this case, the AID field in the Peer STA Info Notification frame is set to be the AID information of STA1.

After receiving the Peer STA Info Notification frame sent by STA1, STA2 may choose not to feedback the AID information of STA2 to STA1 due to its own reasons, such as being restricted by NSTR.

Example 1-5

Figure 14:
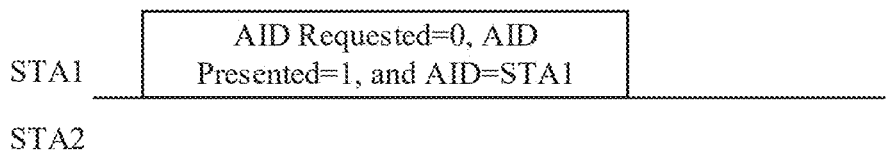

As illustrated in FIG. 14, STA1 sends a Peer STA Info Notification frame to STA2. Here, a value of the AID Requested field in the Peer STA Info Notification Control field in the Peer STA Info Notification frame is set to 0, which represents that STA1 does not request the AID information of STA2. A value of the AID Presented field is set to 1, which represents that the Peer STA Info Notification frame carries the AID information of STA1. In this case, the AID field in the Peer STA Info Notification frame is set to be the AID information of STA1.

After receiving the Peer STA Info Notification frame sent by STA1, STA2 does not need to feedback the AID information of STA2 to STA1.

Example 2: the Peer STA Info Notification frame includes AID related fields, excluding BSSID related fields, and the AID fields are optional fields.

In this case, the Peer STA Info Notification frame includes an AID Requested field, and an AID Presented field. Optionally, an AID field is included.

Example 2-1

Figure 15:
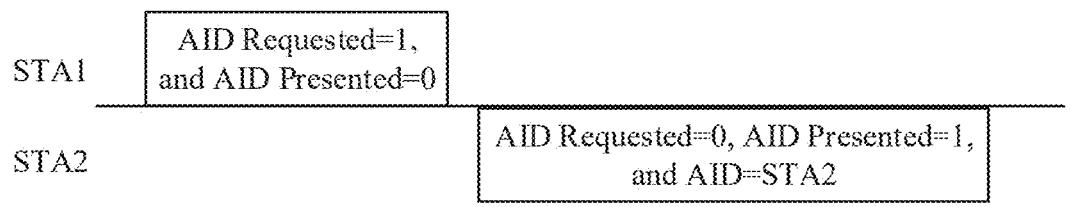

As illustrated in FIG. 15, STA1 sends a Peer STA Info Notification frame to STA2. Here, a value of the AID Requested field in the Peer STA Info Notification Control field in the Peer STA Info Notification frame is set to 1, which represents that STA1 requests the AID information of STA2. A value of the AID Presented field is set to 0, which represents that the Peer STA Info Notification frame does not carry the AID information of STA1. In this case, the Peer STA Info Notification frame does not include an AID field.

After receiving the Peer STA Info Notification frame sent by STA1, STA2 uses a Peer STA Info Notification frame to feedback. Here, a value of the AID Requested field of the Peer STA Info Notification Control field in the Peer STA Info Notification frame is set to 0, and a value of the AID Presented field is set to 1, which represents that the Peer STA Info Notification frame carries the AID information of STA2. The AID field in the Peer STA Info Notification frame is set to be the AID information of STA2.

Example 2-2

Figure 16:
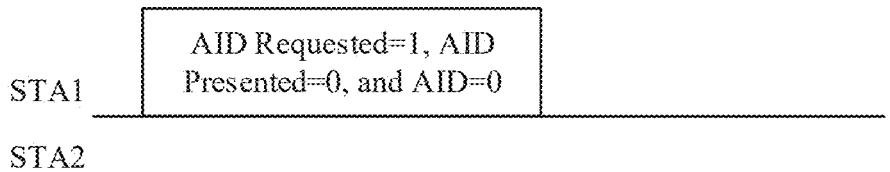

As illustrated in FIG. 16, STA1 sends a Peer STA Info Notification frame to STA2. Here, a value of the AID Requested field in the Peer STA Info Notification Control field in the Peer STA Info Notification frame is set to 1, which represents that STA1 requests the AID information of STA2. A value of the AID Presented field is set to 0, which represents that the Peer STA Info Notification frame does not carry the AID information of STA1. In this case, the AID field in the Peer STA Info Notification frame is set to all zeros.

After receiving the Peer STA Info Notification frame sent by STA1, STA2 may choose not to feedback the AID information of STA2 to STA1 due to its own reasons, such as being restricted by NSTR.

Example 3: the Peer STA Info Notification frame includes AID related fields and BSSID related fields, and the AID fields and the BSSID related fields are both mandatory fields.

In this case, the Peer STA Info Notification frame includes an AID Requested field, an AID Presented field, an AID field, a BSSID Requested field, a BSSID Presented field, and a BSSID field.

Example 3-1

Figure 17:
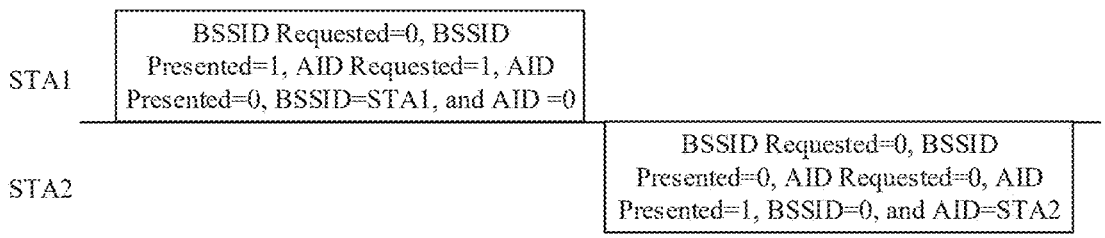

As illustrated in FIG. 17, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 1, which represents that the Peer STA Info Notification frame carries the BSSID information of STA1. A value of the AID Requested field is set to 1, which represents that STA1 requests the AID information of STA2. A value of the AID Presented field is set to 0, which represents that the Peer STA Info Notification frame does not carry the AID information of STA1. In this case, the BSSID field in the Peer STA Info Notification frame is set to be the BSSID information of STA1, and the AID field is set to be all zeros.

After receiving the Peer STA Info Notification frame sent by STA1, STA2 uses a Peer STA Info Notification frame to feedback. Here, a value of the BSSID Requested field in the Peer STA Info Notification Control field in the Peer STA Info Notification frame is set to 0, and a value of the BSSID Presented field is set to 0, which represents that the Peer STA Info Notification frame does not carry the BSSID information of STA2. A value of the AID Requested field is set to 0, and a value of AID Presented field is set to 1, which represents that the Peer STA Info Notification frame carries the AID information of STA2. In this case, the BSSID field in the Peer STA Info Notification frame is set to all zeros, and the AID field is set to be the AID information of STA2.

Example 3-2

Figure 18:
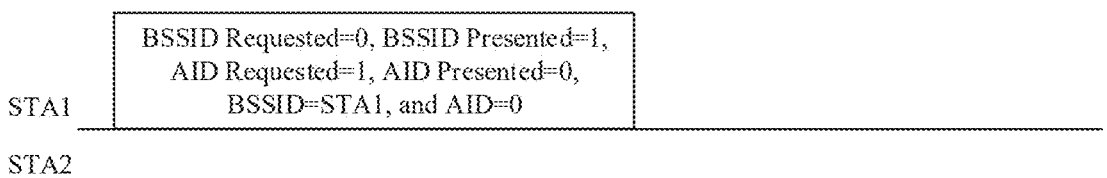

As illustrated in FIG. 18, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 1, which represents that the Peer STA Info Notification frame carries the BSSID information of STA1. A value of the AID Requested field is set to 1, which represents that STA1 requests the AID information of STA2. A value of the AID Presented field is set to 0, which represents that the Peer STA Info Notification frame does not carry the AID information of STA1. In this case, the BSSID field in the Peer STA Info Notification frame is set to be the BSSID information of STA1, and the AID field is set to be all zeros.

After receiving the Peer STA Info Notification frame sent by STA1, STA2 may choose not to feedback to STA2 due to its own reasons, such as being restricted by NSTR.

Example 3-3

Figure 19:
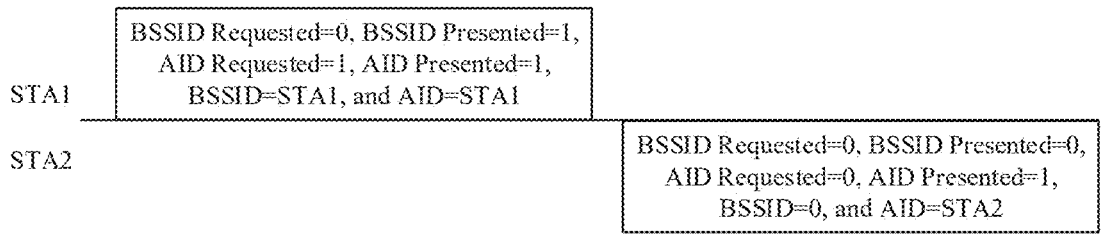

As illustrated in FIG. 19, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 1, which represents that the Peer STA Info Notification frame carries the BSSID information of STA1. A value of the AID Requested field is set to 1, which represents that STA1 requests the AID information of STA2. A value of the AID Presented field is set to 1, which represents that the Peer STA Info Notification frame carries the AID information of STA1. In this case, the BSSID field in the Peer STA Info Notification frame is set to be the BSSID information of STA1, and the AID field is set to be the AID information of STA1.

After receiving the Peer STA Info Notification frame sent by STA1, STA2 uses a Peer STA Info Notification frame to feedback. Here, a value of the BSSID Requested field in the Peer STA Info Notification Control field in the Peer STA Info Notification frame is set to 0, and a value of the BSSID Presented field is set to 0, which represents that the Peer STA Info Notification frame does not carry the BSSID information of STA2. A value of the AID Requested field is set to 0, and a value of the AID Presented field is set to 1, which represents that the Peer STA Info Notification frame carries the AID information of STA2. In this case, the BSSID field in the Peer STA Info Notification frame is set to all zeros, and the AID field is set to be the AID information of STA2.

Example 3-4

Figure 20:
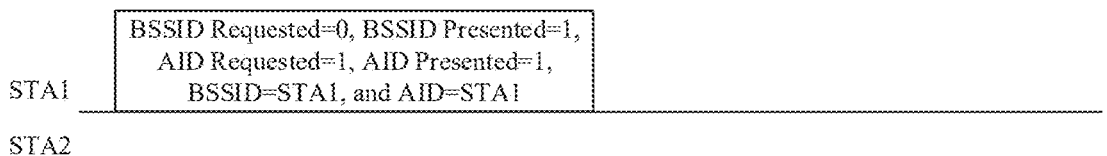

As illustrated in FIG. 20, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 1, which represents that the Peer STA Info Notification frame carries the BSSID information of STA1. A value of the AID Requested field is set to 1, which represents that STA1 requests the AID information of STA2. A value of the AID Presented field is set to 1, which represents that the Peer STA Info Notification frame carries the AID information of STA1. In this case, the BSSID field in the Peer STA Info Notification frame is set to be the BSSID information of STA1, and the AID field is set to be the AID information of STA1.

After receiving the Peer STA Info Notification frame sent by STA1, STA2 chooses not to feedback to STA2 due to its own reasons, such as being restricted by NSTR.

Example 3-5

Figure 21:
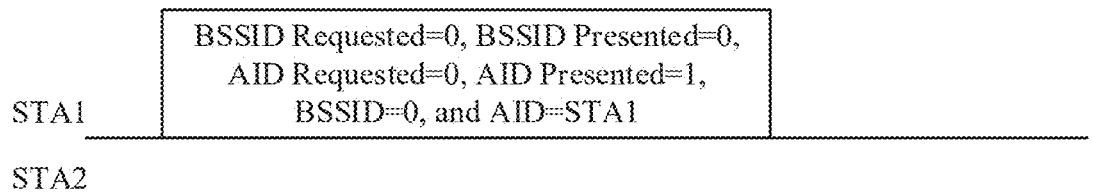

As illustrated in FIG. 21, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 0, which represents that the Peer STA Info Notification frame does not carry the BSSID information of STA1. A value of the AID Requested field is set to 0, which represents that STA1 does not request the AID information of STA2. A value of the AID Presented field is set to 1, which represents that the Peer STA Info Notification frame carries the AID information of STA1. In this case, the BSSID field in the Peer STA Info Notification frame is set to all zeros, and the AID field is set to be the AID information of STA1.

After receiving the Peer STA Info Notification frame sent by STA1, STA2 does not need to feedback to STA2.

Example 3-6

Figure 22:
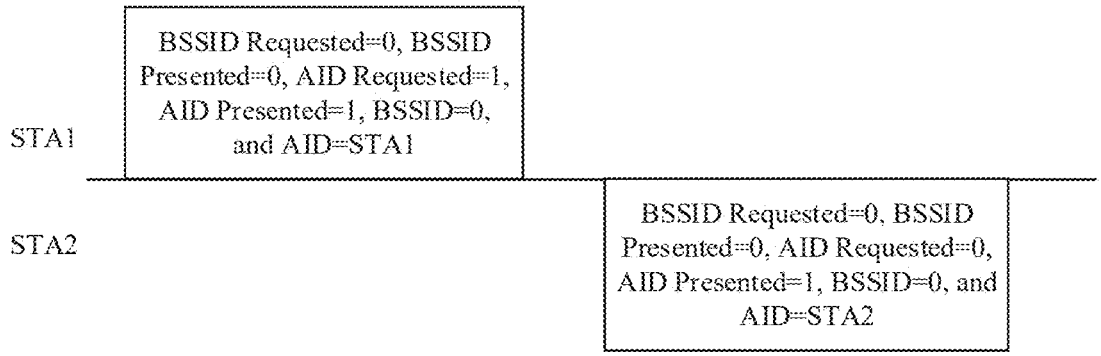

As illustrated in FIG. 22, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 0, which represents that the Peer STA Info Notification frame does not carry the BSSID information of STA1. A value of the AID Requested field is set to 1, which represents that STA1 requests the AID information of STA2. A value of the AID Presented field is set to 1, which represents that the Peer STA Info Notification frame carries the AID information of STA1. In this case, the BSSID field in the Peer STA Info Notification frame is set to all zeros, and the AID field is set to be the AID information of STA1.

After receiving the Peer STA Info Notification frame sent by STA1, STA2 uses a Peer STA Info Notification frame to feedback. Here, a value of the BSSID Requested field in the Peer STA Info Notification Control field in the Peer STA Info Notification frame is set to 0, and a value of the BSSID Presented field is set to 0, which represents that the Peer STA Info Notification frame does not carry the BSSID information of STA2. A value of the AID Requested field is set to 0, and a value of the AID Presented field is set to 1, which represents that the Peer STA Info Notification frame carries the AID information of STA2. In this case, the BSSID field in the Peer STA Info Notification frame is set to all zeros, and the AID field is set to be the AID information of STA2.

Example 3-7

Figure 23:
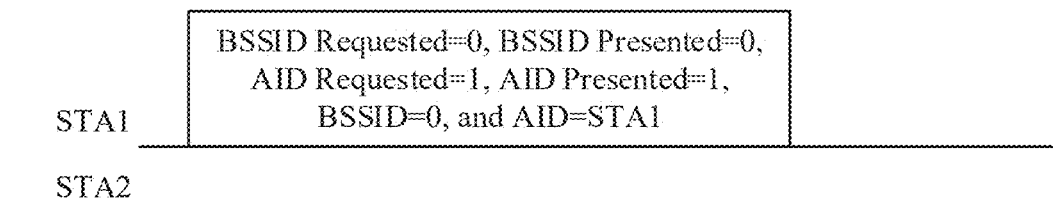

As illustrated in FIG. 23, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 0, which represents that the Peer STA Info Notification frame does not carry the BSSID information of STA1. A value of the AID Requested field is set to 1, which represents that STA1 requests the AID information of STA2. A value of the AID Presented field is set to 1, which represents that the Peer STA Info Notification frame carries the AID information of STA1. In this case, the BSSID field in the Peer STA Info Notification frame is set to all zeros, and the AID field is set to be the AID information of STA1.

After receiving the Peer STA Info Notification frame sent by STA1, STA2 chooses not to feedback to STA2 due to its own reasons, such as being restricted by NSTR.

Example 3-8

Figure 24:
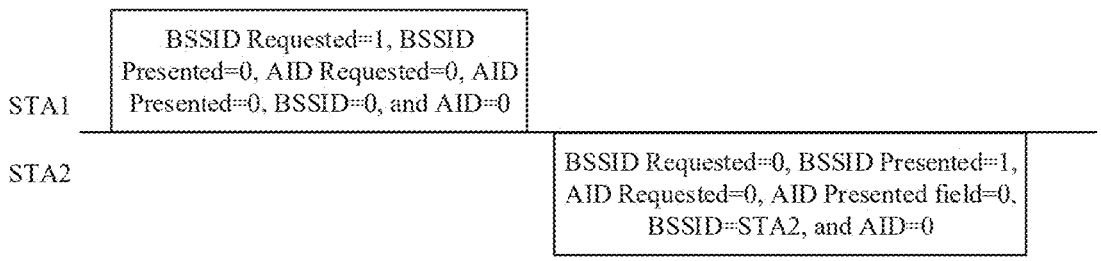

As illustrated in FIG. 24, STA1 sends a Peer STA Info Notification frame to STA2. Here, a value of the BSSID Requested field in the Peer STA Info Notification Control field in the Peer STA Info Notification frame is set to 1, which represents that STA1 requests the BSSID information of STA2. A value of the BSSID Presented field is set to 0, which represents that the Peer STA Info Notification frame does not carry the BSSID information of STA1. A value of the AID Requested field is set to 0, which represents that STA1 does not request the AID information of STA2. A value of the AID Presented field is set to 0, which represents that the Peer STA Info Notification frame does not carry the AID information of STA1. In this case, the BSSID field in the Peer STA Info Notification frame is set to all zeros, and the AID field is set to all zeros.

After receiving the Peer STA Info Notification frame sent by STA1, STA2 uses a Peer STA Info Notification frame to feedback. Here, a value of the BSSID Requested field in a Peer STA Info Notification Control field in the Peer STA Info Notification frame is set to 0, and a value of the BSSID Presented field is set to 1, which represents that the Peer STA Info Notification frame carries the BSSID information of STA2. A value of the AID Requested field is set to 0, and a value of the AID Presented field is set to 0, which represents that the Peer STA Info Notification frame does not carry the AID information of STA2. In this case, the BSSID field in the Peer STA Info Notification frame is set to be the BSSID information of STA2, and the AID field is set to be all zeros.

Example 3-9

Figure 25:
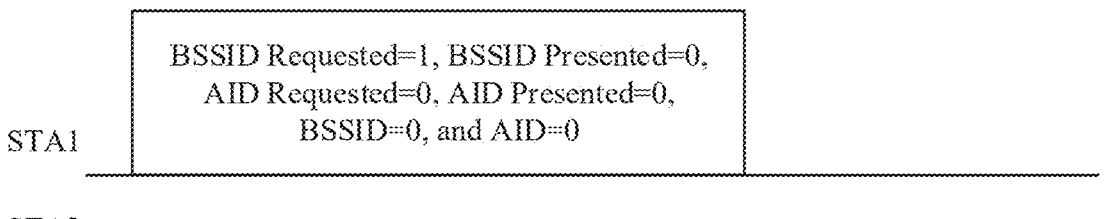

As illustrated in FIG. 25, STA1 sends a Peer STA Info Notification frame to STA2. Here, a value of the BSSID Requested field in the Peer STA Info Notification Control field in the Peer STA Info Notification frame is set to 1, which represents that STA1 requests the BSSID information of STA2. A value of the BSSID Presented field is set to 0, which represents that the Peer STA Info Notification frame does not carry the BSSID information of STA1. A value of the AID Requested field is set to 0, which represents that STA1 does not request the AID information of STA2. A value of the AID Presented field is set to 0, which represents that the Peer STA Info Notification frame does not carry the AID information of STA1. In this case, the BSSID field in the Peer STA Info Notification frame is set to all zeros, and the AID field is set to all zero.

After receiving the Peer STA Info Notification frame sent by STA1, STA2 chooses not to feedback to STA2 due to its own reasons, such as being restricted by NSTR.

Example 3-10

Figure 26:
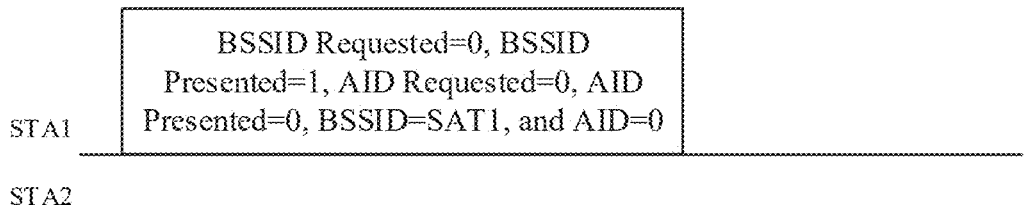

As illustrated in FIG. 26, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 1, which represents that the Peer STA Info Notification frame carries the BSSID information of STA1. A value of the AID Requested field is set to 0, which represents that STA1 does not request the AID information of STA2. A value of the AID Presented field is set to 0, which represents that the Peer STA Info Notification frame does not carry the AID information of STA1. In this case, the BSSID field in the Peer STA Info Notification frame is set to be the BSSID information of STA1, and the AID field is set to be all zeros.

After receiving the Peer STA Info Notification frame sent by STA1, STA2 does not need to feedback to STA2.

Example 4: the Peer STA Info Notification frame includes AID related fields and BSSID related fields, and the AID related fields and the BSSID related fields are both optional fields.

In this case, the Peer STA Info Notification frame includes an AID Requested field, an AID Presented field, a BSSID Requested field, and a BSSID Presented field. In an example, an AID field and/or a BSSID field is/are further included.

Example 4-1

Figure 27:
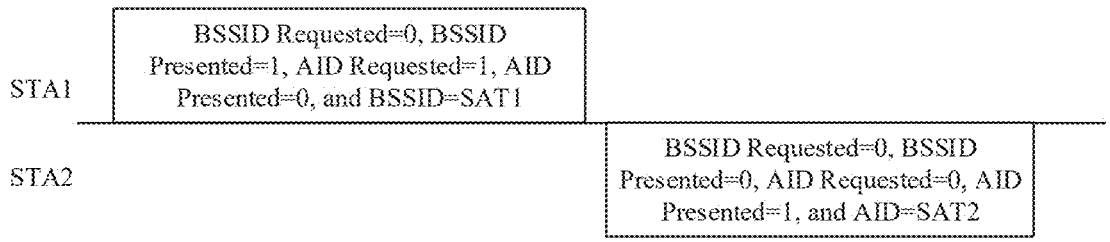

As illustrated in FIG. 27, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 1, which represents that the Peer STA Info Notification frame carries the BSSID information of STA1. A value of the AID Requested field is set to 1, which represents that STA1 requests the AID information of STA2. A value of the AID Presented field is set to 0, which represents that the Peer STA Info Notification frame does not carry the AID information of STA1. In this case, the Peer STA Info Notification frame includes the BSSID field, which is set to be the BSSID information of STA1, and the Peer STA Info Notification frame does not include the AID field.

After receiving the Peer STA Info Notification frame sent by STA1, STA2 uses a Peer STA Info Notification frame to feedback. Here, a value of the BSSID Requested field in the Peer STA Info Notification Control field in the Peer STA Info Notification frame is set to 0, and a value of the BSSID Presented field is set to 0, which represents that the Peer STA Info Notification frame does not carry the BSSID information of STA2. A value of the AID Requested field is set to 0, and a value of the AID Presented field is set to 1, which represents that the Peer STA Info Notification frame carries the AID information of STA2. In this case, the Peer STA Info Notification frame does not include the BSSID field but includes the AID field, and the AID field is set to be the AID information of STA2.

Example 4-2

Figure 28:
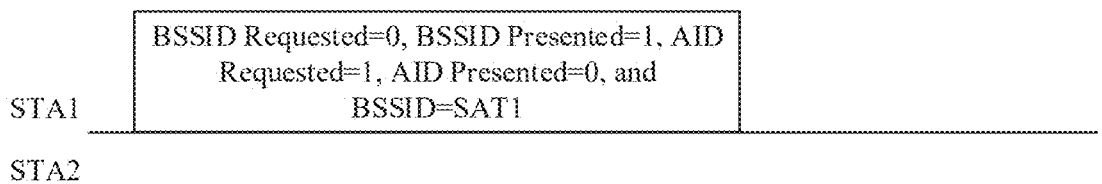

As illustrated in FIG. 28, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 1, which represents that the Peer STA Info Notification frame carries the BSSID information of STA1. A value of the AID Requested field is set to 1, which represents that STA1 requests the AID information of STA2. A value of the AID Presented field is set to 0, which represents that the Peer STA Info Notification frame does not carry the AID information of STA1. In this case, the Peer STA Info Notification frame includes the BSSID field, which is set to be the BSSID information of STA1, and the Peer STA Info Notification frame does not include the AID field.

After receiving the Peer STA Info Notification frame sent by STA1, STA2 chooses not to feedback to STA2 due to its own reasons, such as being restricted by NSTR.

Example 4-3

Figure 29:
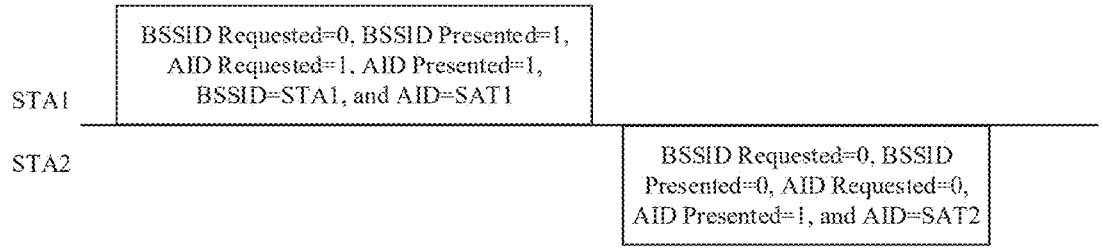

As illustrated in FIG. 29, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 1, which represents that the Peer STA Info Notification frame carries the BSSID information of STA1. A value of the AID Requested field is set to 1, which represents that STA1 requests the AID information of STA2. A value of the AID Presented field is set to 1, which represents that the Peer STA Info Notification frame carries the AID information of STA1. In this case, the Peer STA Info Notification frame includes the BSSID field and the AID field, here the BSSID field is set to be the BSSID information of STA1, and the AID field is set to be the AID information of STA1.

After receiving the Peer STA Info Notification frame sent by STA1, STA2 uses a Peer STA Info Notification frame to feedback. Here, a value of the BSSID Requested field in the Peer STA Info Notification Control field in the Peer STA Info Notification frame is set to 0, and a value of the BSSID Presented field is set to 0, which represent that the Peer STA Info Notification frame does not carry the BSSID information of STA2. A value of the AID Requested field is set to 0, and a value of the AID Presented field is set to 1, which represents that the Peer STA Info Notification frame carries the AID information of STA2. In this case, the Peer STA Info Notification frame does not include the BSSID field but includes the AID field, which is set to be the AID information of STA2.

Example 4-4

Figure 30:
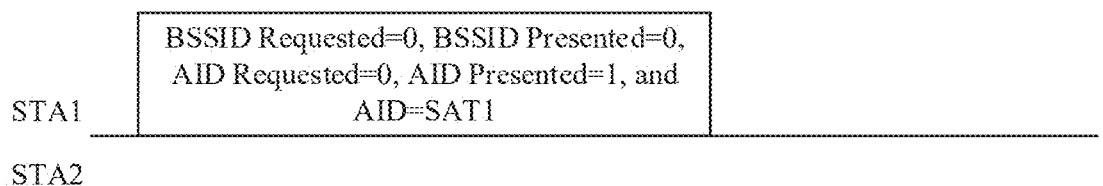

As illustrated in FIG. 30, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 0, which represents that the Peer STA Info Notification frame does not carry the BSSID information of STA1. A value of the AID Requested field is set to 0, which represents that STA1 does not request the AID information of STA2. A value of the AID Presented field is set to 1, which represents that the Peer STA Info Notification frame carries the AID information of STA1. In this case, the Peer STA Info Notification frame does not include the BSSID field but includes the AID field, which is set to be the AID information of STA1.

After receiving the Peer STA Info Notification frame sent by STA1, STA2 does not need to feedback to STA2.

Example 4-5

Figure 31:
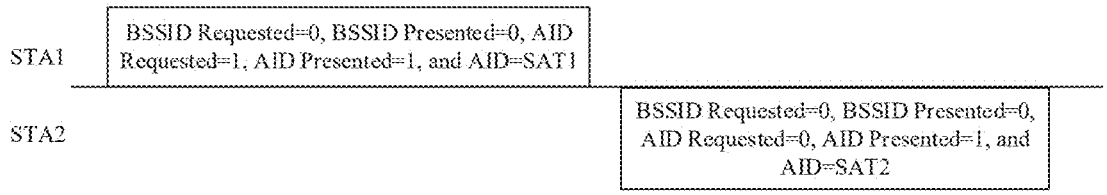

As illustrated in FIG. 31, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 0, which represents that the Peer STA Info Notification frame does not carry the BSSID information of STA1. A value of the AID Requested field is set to 1, which represents that STA1 requests the AID information of STA2. A value of the AID Presented field is set to 1, which represents that the Peer STA Info Notification frame carries the AID information of STA1. In this case, the Peer STA Info Notification frame does not include the BSSID field but includes the AID field, which is set to be the AID information of STA1.

After receiving the Peer STA Info Notification frame sent by STA1, STA2 uses a Peer STA Info Notification frame to feedback. Here, a value of the BSSID Requested field in the Peer STA Info Notification Control field in the Peer STA Info Notification frame is set to 0, and a value of the BSSID Presented field is set to 0, which represents that the Peer STA Info Notification frame does not carry the BSSID information of STA2. A value of the AID Requested field is set to 0, and a value of the AID Presented field is set to 1, which represents that the Peer STA Info Notification frame carries the AID information of STA2. In this case, the Peer STA Info Notification frame does not include the BSSID field but includes the AID field, which is set to be the AID information of STA2.

Example 4-6

Figure 32:
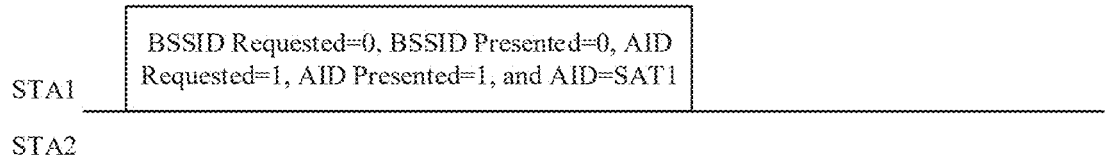

As illustrated in FIG. 32, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 0, which represents that the Peer STA Info Notification frame does not carry the BSSID information of STA1. A value of the AID Requested field is set to 1, which represents that STA1 requests the AID information of STA2. A value of the AID Presented field is set to 1, which represents that the Peer STA Info Notification frame carries the AID information of STA1. In this case, the Peer STA Info Notification frame does not include the BSSID field but includes the AID field, which is set to be the AID information of STA1.

After receiving the Peer STA Info Notification frame sent by STA1, STA2 chooses not to feedback to STA2 due to its own reasons, such as being restricted by NSTR.

Example 4-7

Figure 33:
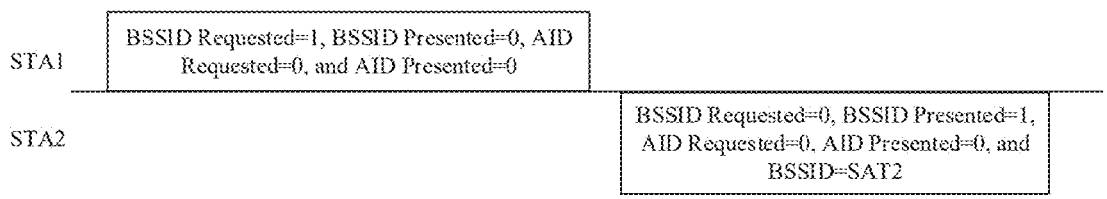

As illustrated in FIG. 33, STA1 sends a Peer STA Info Notification frame to STA2. Here, a value of the BSSID Requested field in the Peer STA Info Notification Control field in the Peer STA Info Notification frame is set to 1, which represents that STA1 requests the BSSID information of STA2. A value of the BSSID Presented field is set to 0, which represents that the Peer STA Info Notification frame does not carry the BSSID information of STA1. A value of the AID Requested field is set to 0, which represents that STA1 does not request the AID information of STA2. A value of the AID Presented field is set to 0, which represents that the Peer STA Info Notification frame does not carry the AID information of STA1. In this case, the Peer STA Info Notification frame does not include a BSSID field and an AID field.

After receiving the Peer STA Info Notification frame sent by STA1, STA2 uses a Peer STA Info Notification frame to feedback. Here, a value of the BSSID Requested field in the Peer STA Info Notification Control field in the Peer STA Info Notification frame is set to 0, and a value of the BSSID Presented field is set to 1, which represents that the Peer STA Info Notification frame carries the BSSID information of STA2. A value of the AID Requested field is set to 0, and a value of AID Presented field is set to 0, which represents that the Peer STA Info Notification frame does not carry the AID information of STA2. In this case, the Peer STA Info Notification frame includes the BSSID field, which is set to be the BSSID information of STA2, but does not include the AID field.

Example 4-8

Figure 34:
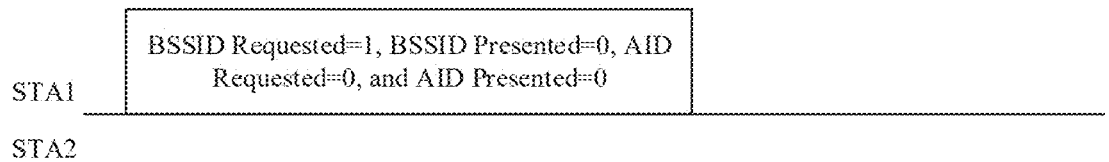

As illustrated in FIG. 34, STA1 sends a Peer STA Info Notification frame to STA2. Here, a value of the BSSID Requested field in the Peer STA Info Notification Control field in the Peer STA Info Notification frame is set to 1, which represents that STA1 requests the BSSID information of STA2. A value of the BSSID Presented field is set to 0, which represents that the Peer STA Info Notification frame does not carry the BSSID information of STA1. A value of the AID Requested field is set to 0, which represents that STA1 does not request the AID information of STA2. A value of the AID Presented field is set to 0, which represents that the Peer STA Info Notification frame does not carry the AID information of STA1. In this case, the Peer STA Info Notification frame does not include a BSSID field and an AID field.

After receiving the Peer STA Info Notification frame sent by STA1, STA2 chooses not to feedback to STA2 due to its own reasons, such as being restricted by NSTR.

Example 4-9

Figure 35:
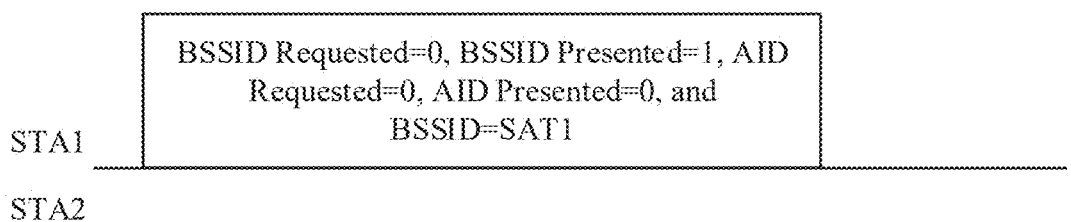

As illustrated in FIG. 35, STA1 sends a Peer STA Info Notification frame to STA2. Here, a value of the BSSID Requested field in the Peer STA Info Notification Control field in the Peer STA Info Notification frame is set to 0, which represents that STA1 does not request the BSSID information of STA2. A value of the BSSID Presented field is set to 1, which represents that the Peer STA Info Notification frame carries the BSSID information of STA1. A value of the AID Requested field is set to 0, which represents that STA1 does not request the AID information of STA2. A value of the AID Presented field is set to 0, which represents that the Peer STA Info Notification frame does not carry the AID information of STA1. In this case, the Peer STA Info Notification frame includes a BSSID field, which is set to be the BSSID information of STA1, but does not include an AID field.

After receiving the Peer STA Info Notification frame sent by STA1, STA2 does not need to feedback to STA2.

In summary, based on the aforementioned embodiments, the first non-AP MLD may obtain the identification information of the second non-AP MLD, such as the AID information or the MAC address information. Further, the first non-AP MLD may send the first indication information to the AP MLD for indicating the identification information of the second non-AP MLD, such as the AID information or the MAC address information.

The transmission mode of the first indication information is specifically explained below in combination with two cases: the first indication information indicates the AID information of the second non-AP MLD, and the first indication information indicates the MAC address information of the second non-AP MLD.

The first case: the first indication information indicates the AID information of the second non-AP MLD.

Mode 1: the AID information of the second non-AP MLD is carried through an aggregation control (A-Control) field.

For example, the first non-AP MLD uses an A-Control field in a high throughput (HT) field of an MAC frame header to indicate the AID information of the Peer STA. It should be understood that in embodiments of the present disclosure, the Peer STA may refer to any party of the P2P transmission, such as the sender device or the receiver device.

In some embodiments, the A-Control field includes a Control ID field and a control information field. For example, control types may be newly added for Peer STA information indication.

As an example, when a value of the Control ID field is defined as a first value (such as a reserved value), a corresponding control information field indicates the Peer STA information, such as the AID information of the second non-AP MLD.

That is to say, when the value of the Control ID field is the first value, the corresponding control information field is the Peer STA AID field.

In some embodiments, the Control ID field may be 4 bits, and the Peer STA AID field may be 12 bits.

Figure 36:
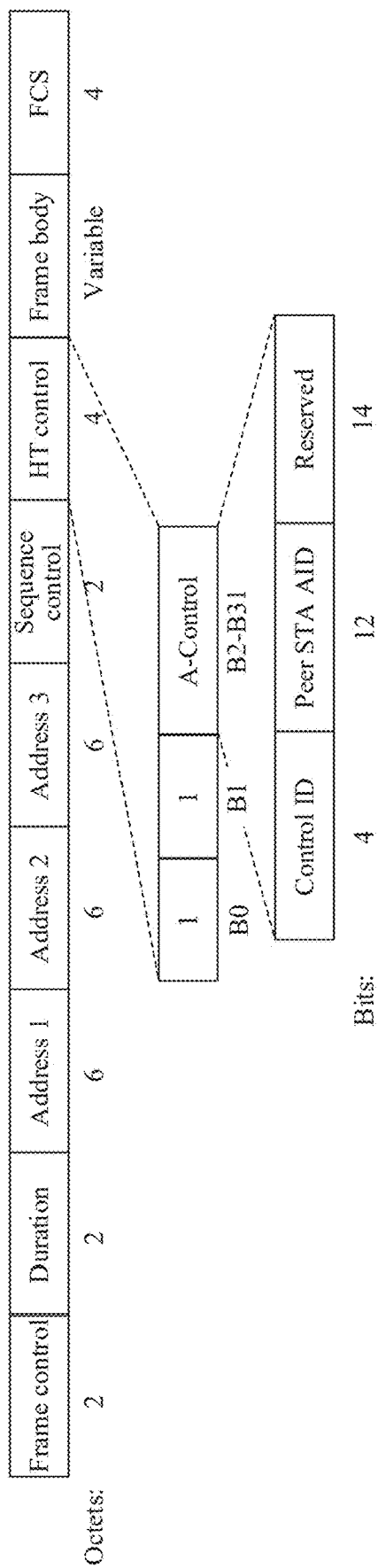
FIG. 36 is a schematic format diagram of an aggregation control (A-Control) field according to an embodiment of the present disclosure.

FIG. 36 is a schematic format diagram of an A-Control field according to an embodiment of the present disclosure. As illustrated in FIG. 36, the A-Control field may include a Control ID field and a Peer STA AID field. The value of the Control ID field is a first value, and the Peer STA AID field indicates the AID information of the second non-AP MLD.

When the AID information of the second non-AP MLD is carried by the A-Control field, the first non-AP MLD may send the AID information of the second non-AP MLD through any frame including the A-Control field.

For example, the first non-AP MLD sends the AID information of the second non-AP MLD through a first frame. As an example rather than a limitation, the first frame may be a quality of service null data (QoS-Null-Data) frame, or a quality of service data (QOS Data) frame, or a control frame wrapped using a control wrapper frame.

In some embodiments, the first frame further includes transmission opportunity (TXOP) duration requested information. The TXOP duration requested information is used to request for a TXOP from the AP MLD.

That is, the first non-AP MLD sends the TXOP duration requested information and the AID information of the second non-AP MLD to the AP MLD through the same frame. Alternatively, the TXOP duration request and the notification of the AID information of the Peer MLD may be executed in the same process.

For example, when the first non-AP MLD carries the TXOP duration requested information through the QoS Control field in the QoS-Null-Data frame, it simultaneously carries the AID information of the second non-AP MLD through the A-Control field in the QoS-Null-Data frame.

Mode 2: the AID information of the second non-AP MLD is carried through a management frame.

For example, the function of indicating (or notifying) the AID information of the Peer MLD is achieved by newly adding a type of management frame, or the function of indicating (or notifying) the AID information of the Peer MLD is achieved by utilizing an existing type of management frame. That is, the first frame may be a type of management frame.

It should be understood that in embodiments of the present disclosure, the Peer MLD may refer to any party of the P2P transmission, such as the sender device or the receiver device, and the Peer STA and the Peer MLD may be replaced with each other (i.e., interchangeable).

In some embodiments, the function of indicating (or notifying) the AID information of the Peer MLD may be achieved by an Action frame, or the function of indicating (or notifying) the AID information of the Peer MLD is achieved by utilizing an existing type of Action frame. That is, the first frame may be a type of Action frame.

In some embodiments, the function of indicating (or notifying) the AID information of the Peer MLD may be achieved by an EHT Action frame, or the function of indicating (or notifying) the AID information of the Peer MLD is achieved by utilizing an existing type of EHT Action frame. That is, the first frame may be a type of EHT Action frame.

In embodiments of the present disclosure, for ease of distinction and explanation, the EHT Action frame through which the non-AP MLD indicates the AID information of the Peer MLD to the AP MLD is referred to as a Peer MLD Info Notification frame, which is not limited by the present disclosure. That is, the first frame may be a type of Peer MLD Info Notification frame.

Mode 2-1: the function of indicating the AID information of the Peer MLD is achieved by newly adding a subtype of Action frame.

That is, a type of EHT Action frame is newly added to indicate the AID information of the Peer MLD.

In some embodiments, the EHT Action frame includes a Category field, an EHT Action field, and an AID field. Here, the Category field indicates that the type of the Action frame is an EHT Action frame, the EHT Action field indicates the specific action type of the EHT Action frame, i.e., indicates (or notifies) the AID information of the Peer MLD, and the AID field indicates the AID information of the Peer MLD (such as the second non-AP MLD).

In embodiments of the present disclosure, the above fields are carried in an Action field of the EHT Action frame.

Table 4 shows a format of an Action field of a Peer MLD Info Notification frame. As shown in Table 4, the Action field of the Peer MLD Info Notification frame may include a Category field, an EHT Action field, and an AID field. Here, the Category field indicates that the type of the Action frame is an EHT Action frame, the EHT Action field indicates the specific action type of the EHT Action frame, and the AID field indicates the AID information of the Peer MLD.

TABLE 4

Peer MLD Info Notification Frame Action field values

| Value | Meaning |
|---|---|
| 1 | Category |
| 2 | EHT Action |
| 3 | AID |

Here, the value of the EHT Action field is set to a new action type value to indicate the function of the EHT Action, i.e., indicates (or notifies) the AID information of the Peer MLD.

Table 5 shows a correspondence between values of the EHT Action field and action types of the Peer MLD Info Notification frame.

TABLE 5

| Value | Meaning |
|---|---|
| 0 | EHT Compressed Beamforming/CQI |
| 1 | EML operation mode notification |
| y | Peer MLD Info Notification |

Here, y is the newly added action type value. When the value of the EHT Action field in the EHT Action frame is y, it represents that the EHT Action frame indicates (or notifies) the AID information of the Peer MLD.

Mode 2-2: the indications of the AID information of the Peer MLD and other information utilize one action type.

Taking the AID information of the Peer MLD and the TXOP duration requested information using one action type as an example, and of course, the AID information of the Peer MLD may also use one action type with other information, and the specific design mode is similar, which will not be repeated here.

In some embodiments, the EHT Action frame includes a Category field, an EHT Action field, and at least one Peer MLD detail information (Peer MLD Info Details, or referred to as peer non-AP MLD detail information) field. The Category field indicates that the type of the Action frame is an EHT Action frame, the EHT Action field indicates that the EHT Action frame indicates (or notifies) the information of the Peer MLD, and the Peer MLD Info Details field indicates the AID information of the Peer MLD and the TXOP duration requested information.

Table 6 shows a format of an Action field of a Peer MLD Info Notification frame. As shown in Table 6, the Action field of the Peer MLD Info Notification frame may include a Category field, an EHT Action field, and a Peer MLD Info Details field. The meaning of each field refers to the description above.

TABLE 6

Peer MLD Info Notification Frame Action field values

| Value | Meaning |
|---|---|
| 1 | Category |
| 2 | EHT Action |
| 3 | Peer MLD Info Details |

In some embodiments, the EHT Action frame includes a Peer MLD detail information (Peer MLD Info Details) field that indicates a non-AP MLD to perform the P2P transmission with the first non-AP MLD.

Figure 37:
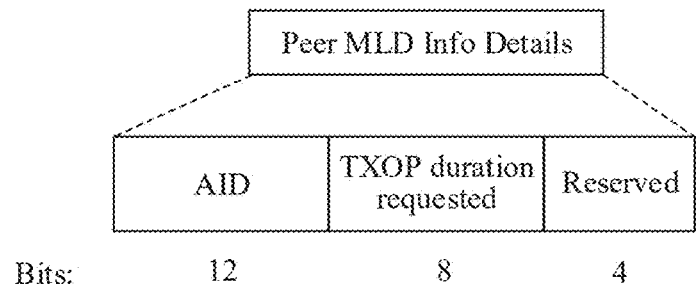
FIG. 37 is a schematic diagram of a format for a Peer MLD Info Details according to an embodiment of the present disclosure.

FIG. 37 is a schematic diagram of a format for a Peer MLD Info Details according to an embodiment of the present disclosure.

As illustrated in FIG. 37, the Peer MLD Info Details field includes an AID field and a TXOP duration requested field. The AID field indicates the AID information of the Peer MLD (such as the second non-AP MLD), and the TXOP duration requested field indicates the TXOP duration requested information.

Therefore, based on the format illustrated in FIG. 37, the first non-AP MLD can indicate a non-AP MLD that is to perform the P2P transmission with the first non-AP MLD.

In other embodiments, the EHT Action frame includes one or more Peer MLD Info Details fields that indicate one or more non-AP MLDs that are to perform the P2P transmission with the first non-AP MLD.

Figure 38:
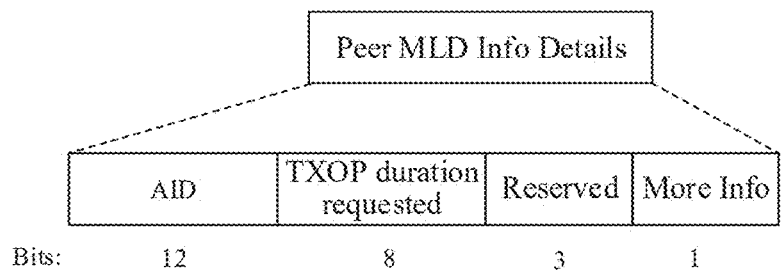
FIG. 38 is a schematic diagram of another format for a Peer MLD Info Details according to an embodiment of the present disclosure.

FIG. 38 is a schematic diagram of another format for Peer MLD Info Details according to an embodiment of the present disclosure.

As illustrated in FIG. 38, the EHT Action frame includes one or more Peer MLD Info Details fields. The Peer MLD Info Details field includes an AID field, a TXOP duration requested field, and a more information (More Info) field. The AID field indicates the AID information of the Peer MLD (such as the second non-AP MLD), the TXOP duration requested field indicates the TXOP duration requested information, and the More Info field indicates whether the EHT Action frame further includes another one or more non-AP MLD detail information fields.

For example, if a value of the More Info field is set to 1, it represents that the EHT Action frame further includes a Peer MLD Info Details field. If the value of the More Info field is set to 0, it represents that the Peer MLD Info Details field is already the last Peer MLD Info Details field in the EHT Action frame.

It should be understood that in embodiments of the present disclosure, when the EHT Action frame includes multiple Peer MLD Info Details fields, the cumulative sum of TXOP durations requested in the multiple Peer MLD Info Details fields does not exceed a TXOP limit.

In some embodiments of the present disclosure, the length of the TXOP duration requested field is 8 bits, indicating an 8-bit unsigned integer, i.e., 0~255, with a time unit of 32 microseconds. That is to say, the time information requested by the TXOP duration requested field is 8-bit unsigned integer time units. That is, the time length from 0 microsecond to 8160 microseconds.

Mode 3: The Peer MLD Info Notification frame is designed using the frame format of the aforementioned Peer STA Info Notification frame.

For example, the first non-AP MLD may indicate the AID information of the second non-AP MLD to the AP MLD based on the EHT Action frame in the above Table 1. In this case, the AID field in the EHT Action frame indicates the AID information of the second non-AP MLD. In an example, in this case, the EHT Action frame may not include the AID requested field.

The second case: the first indication information indicates the MAC address information of the second non-AP MLD.

In some embodiments, the MAC address information of the second non-AP MLD is carried by a management frame.

For example, the function of indicating the MAC address information of the Peer MLD is achieved by newly adding a type of management frame, or the function of indicating the MAC address information of the Peer MLD is achieved by utilizing an existing type of management frame.

In some embodiments, the function of indicating the MAC address information of the Peer MLD is achieved by an Action frame.

For example, the function of indicating the MAC address information of the Peer MLD is achieved by newly adding a type of Action frame, or the function of indicating the MAC address information of the Peer MLD is achieved by utilizing an existing type of Action frame.

In some embodiments, the function of indicating the MAC address information of the Peer MLD is achieved by an EHT Action frame.

For example, the function of indicating the MAC address information of the Peer MLD is achieved by newly adding a type of EHT Action frame, or the function of indicating the MAC address information of the Peer MLD is achieved by utilizing an existing type of EHT Action frame.

In embodiments of the present disclosure, the EHT Action frame through which the non-AP MLD indicates the MAC address information of the Peer MLD to the AP MLD is also referred to as a Peer MLD Info Notification frame.

Mode 1: the indications of the MAC address information of the Peer MLD and other information utilize one action type.

Taking the MAC address information of the Peer MLD and the TXOP duration requested information using one action type as an example, and of course, the MAC address information of the Peer MLD may also use one action type with other information, and the specific design mode is similar, which will not be repeated here.

In some embodiments, the EHT Action frame includes a Category field, an EHT Action field, and at least one Peer MLD detail information (Peer MLD Info Details, or referred to as peer non-AP MLD detail information) field. The Category field indicates that the type of the Action frame is an EHT Action frame, the EHT Action field indicates that the EHT Action frame indicates (or notifies) the information of the Peer MLD, and the Peer MLD Info Details field indicates the MAC address information of the Peer MLD (such as the second non-AP MLD) and the TXOP duration requested information.

In some embodiments, the above fields are carried in an Action field of the EHT Action frame.

Table 7 shows a format of an Action field of a Peer MLD Info Notification frame. As shown in Table 7, the Action field of the Peer MLD Info Notification frame may include a Category field, an EHT Action field, and a Peer MLD Info Details field. The meanings of these fields refer to the description above.

TABLE 7

Peer MLD Info Notification Frame Action field values

| Value | Meaning |
| --- | --- |
| 1 | Category |
| 2 | EHT Action |
| 3 | Peer MLD Info Details |

In some embodiments, the EHT Action frame includes a Peer MLD Info Details field that may indicate a non-AP MLD to perform the P2P transmission with the first non-AP MLD.

Figure 39:
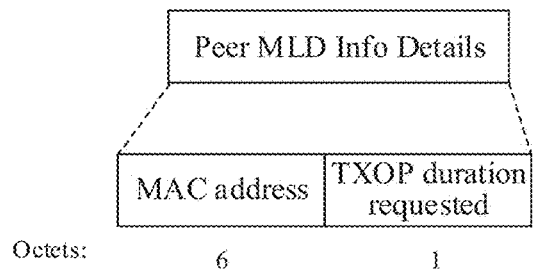
FIG. 39 is a schematic diagram of still another format for Peer MLD Info Details according to an embodiment of the present disclosure.

FIG. 39 is a schematic diagram of a format for a Peer MLD Info Details according to an embodiment of the present disclosure.

As illustrated in FIG. 39, the EHT Action frame includes a Peer MLD Info Details field. The Peer MLD Info Details field includes an MAC address field and a TXOP duration requested field. The MAC address field indicates the MAC address information of the Peer MLD (such as the second non-AP MLD), and the TXOP duration requested field indicates the TXOP duration requested information.

Therefore, based on the format illustrated in FIG. 39, the first non-AP MLD may indicate a non-AP MLD that is to perform the P2P transmission with the first non-AP MLD.

In some embodiments, the EHT Action frame includes one or more Peer MLD Info Details fields that may indicate one or more non-AP MLDs to perform the P2P transmission with the first non-AP MLD.

In an example, the Peer MLD Info Details field includes an MAC address field, a TXOP duration requested field, and a more information (More Info) field. The MAC address field indicates the MAC address information of the Peer MLD (such as the second non-AP MLD), the TXOP duration requested field indicates the TXOP duration requested information, and the More Info field indicates whether the EHT Action frame further includes another one or more non-AP MLD detail information fields.

For example, if a value of the More Info field is set to 1, it represents that the EHT Action frame further includes a Peer MLD Info Details field. If the value of the More Info field is set to 0, it represents that the Peer MLD Info Details field is already the last Peer MLD Info Details field in the EHT Action frame.

It should be understood that in embodiments of the present disclosure, when the EHT Action frame includes multiple Peer MLD Info Details fields, the cumulative sum of TXOP durations requested in the multiple Peer MLD Info Details fields does not exceed a TXOP limit.

In some embodiments of the present disclosure, the length of the TXOP duration requested field is 8 bits, indicating an 8-bit unsigned integer, i.e., 0~255, with a time unit of 32 microseconds. That is to say, the time information requested by the TXOP duration requested field is 8-bit unsigned integer time units. That is, the time length from 0 microsecond to 8160 microseconds.

Mode 2: an existing field in the newly added EHT action frame is utilized to indicate the MAC address information of the second non-AP MLD.

For example, the link identifier field in the newly added EHT Action frame is utilized to indicate the MAC address information of the Peer MLD (such as the second non-AP MLD).

Specifically, an EHT Action type may be newly added to notify the MAC address information of the Peer MLD through the existing field of the newly added of the EHT Action type.

Table 8 shows a format of an Action field of a Peer MLD Info Notification frame. As shown in Table 8, the Action field of the Peer MLD Info Notification frame may include a Category field, an EHT Action field, and a link identifier field.

TABLE 8

Peer MLD Info Notification Frame Action field values

| Value | Meaning |
| --- | --- |
| 1 | Category |
| 2 | EHT Action |
| 3 | Link Identifier |

Here, a value of the EHT Action field is a newly added type value, such as z. When the value of the EHT Action field in the EHT Action frame is z, it represents that the EHT Action frame is used for indicating the MAC address information of the Peer MLD.

Here, the link identifier field indicates the MAC address information of the second non-AP MLD and the MAC address information of the first non-AP MLD. That is, the link identifier field indicates the MAC address information of the initiator device and receiver device in the P2P transmission.

In some embodiments, the link identifier field is an element field in the management frame.

Figure 40:
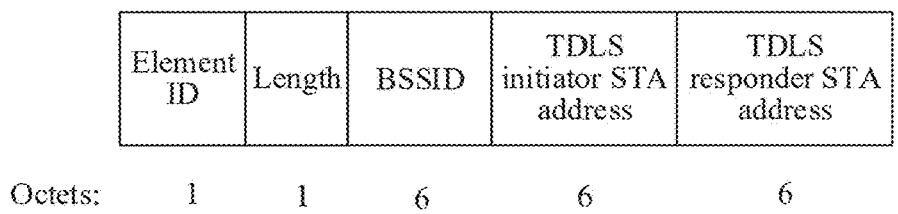
FIG. 40 is a schematic diagram of a format for a link identifier field according to an embodiment of the present disclosure.

As illustrated in FIG. 40, the link identifier field may include an element ID field, a length field, a BSSID field, a TDLS initiator STA address field, and a TDLS responder STA address field. Here, the TDLS initiator STA address field indicates the MAC address information of the initiator device for P2P transmission (such as the first non-AP MLD), and the TDLS responder STA address field indicates the MAC address information of the receiver device for P2P transmission (such as the second non-AP MLD). Therefore, when the AP MLD receives the EHT Action frame, if the value of the EHT Action field in the EHT Action frame is z, it represents that the link identifier field in the EHT Action frame is used to carry the MAC address information of the initiator device and receiver device for P2P transmission. Furthermore, when the AP MLD interprets/parses the TDLS initiator STA address field and the TDLS responder STA address field in the link identifier field, the two fields can be interpreted as the MAC address information of the initiator device for P2P transmission and the MAC address information of the receiver device for P2P transmission, respectively.

Mode 3: an existing field in the management frame is utilized to indicate the MAC address information of the second non-AP MLD.

In some embodiments, the existing field in the Action frame is utilized to indicate the MAC address information of the second non-AP MLD, here the Action frame is a type of the management frame.

In some embodiments, an existing field in a wireless network management (WNM) Action frame is utilized to indicate the MAC address information of the second non-AP MLD, here the WNM Action frame is a type of Action frame.

For example, an existing field in an event report frame is utilized to indicate the MAC address information of the second non-AP MLD, here the event report frame is a type of WNM Action frame.

Specifically, for example, an existing field in a P2P link event report frame is utilized to indicate the MAC address information of the second non-AP MLD, here the P2P link event report frame is a peer-to-peer link event subtype of the event report frame.

As an example, the event report frame includes a Peer STA/BSSID address field, and the MAC address information of the second non-AP MLD is indicated through the Peer STA/BSSID Address field.

Figure 41:
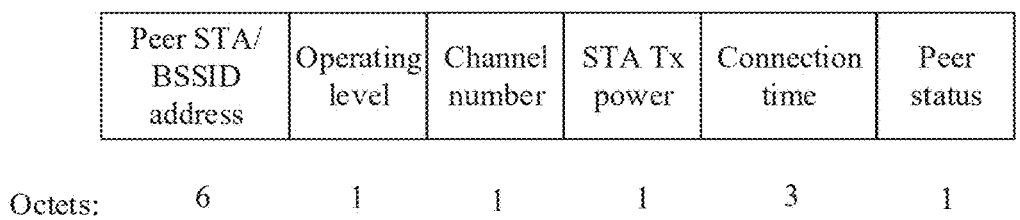
FIG. 41 is a schematic diagram of a format for an event report frame of a peer-to-peer link event subtype according to an embodiment of the present disclosure.

FIG. 41 shows a schematic diagram of a format of an event report frame of a peer-to-peer link event subtype according to an embodiment of the present disclosure. The event report frame includes a Peer STA/BSSID Address field, and the MAC address information of the second non-AP MLD is indicated through the Peer STA/BSSID Address field.

Figure 42:
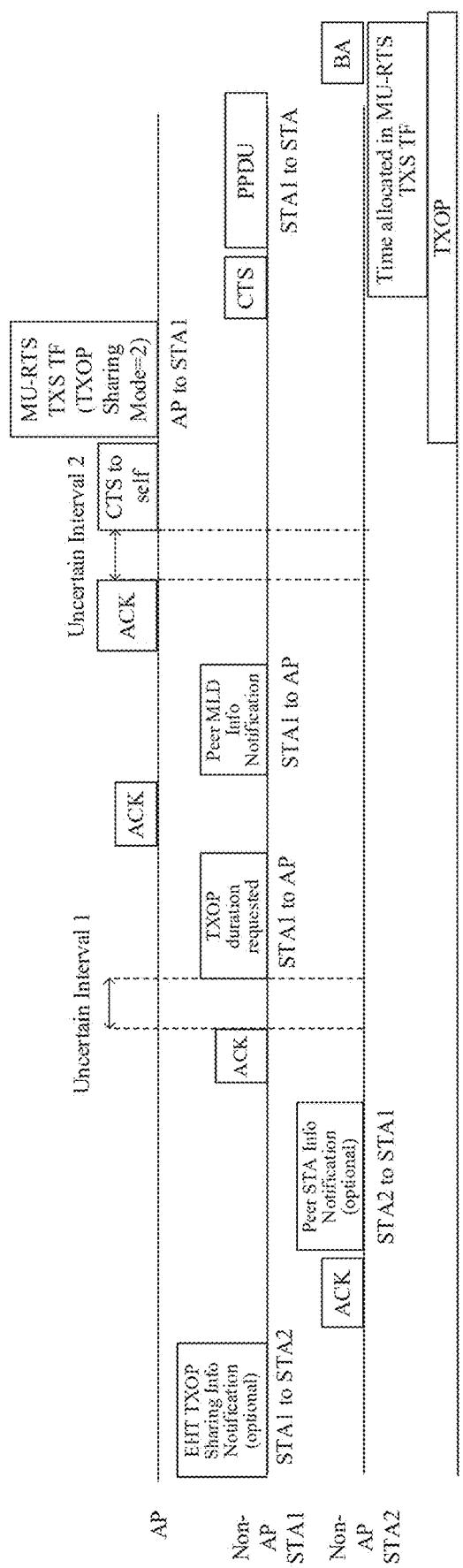
FIG. 42 is a schematic interaction flowchart of a wireless communication method according to a specific embodiment of the present disclosure.
Figure 43:
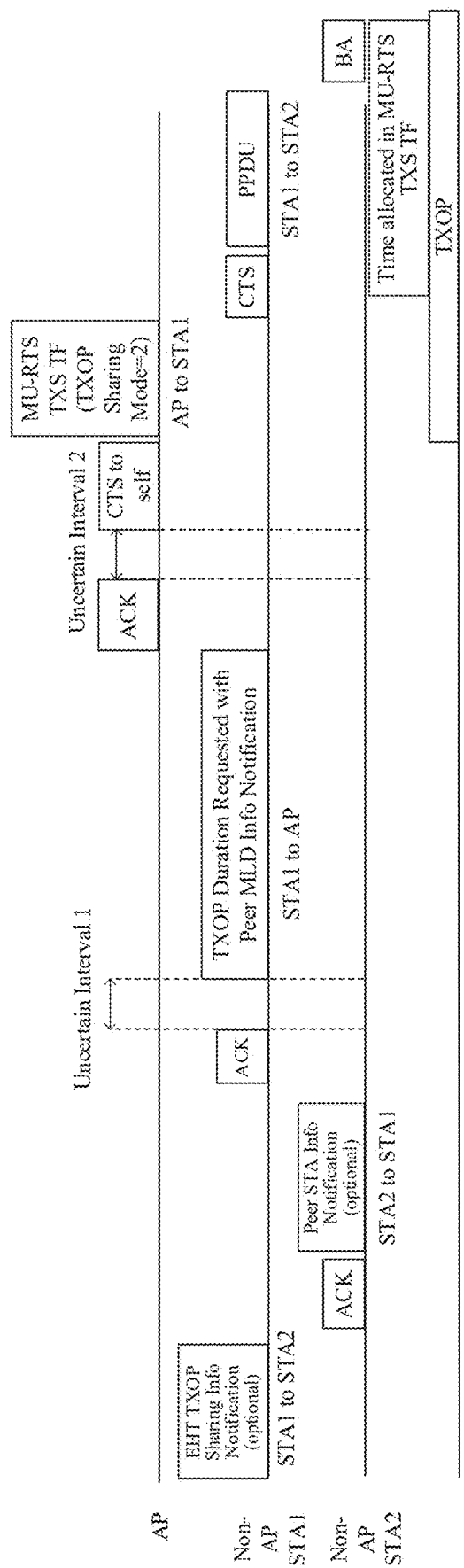
FIG. 43 is a schematic interaction flowchart of another wireless communication method according to another specific embodiment of the present disclosure.

FIG. 42 and FIG. 43 are schematic interaction flowcharts of a wireless communication method according to a specific embodiment of the present disclosure.

As illustrated in FIG. 42, the TXOP duration request and Peer MLD information notification are executed through separate processes (such as different PPDUs), for example, sent separately at an inter-frame interval. The present disclosure does not limit the sequence of these two processes.

As illustrated in FIG. 43, the TXOP duration request and Peer MLD information notification are executed in the same process, for example, sent through the same PPDU.

It should be understood that in FIGS. 42 and 43, a AP may refer to an attaching AP in the AP MLD, a non-AP STA1 may refer to an attaching STA in the first non-AP MLD, a non-AP STA2 may refer to an attaching STA in the second non-AP MLD, here the AP and the non-AP STA1 correspond to the same link, and the non-AP STA1 and non-AP STA2 correspond to the same link.

As illustrated in FIGS. 42 and 43, the first non-AP MLD and the second non-AP MLD interact with Peer STA information through their respective attaching STAs first, for example, the non-AP STA2 sends the AID information of the second non-AP MLD to the non-AP STA1.

Furthermore, as illustrated in FIG. 42, the attaching STA of the first non-AP MLD (i.e., the non-AP STA1) sends a TXOP duration request to the attaching AP of the AP MLD to request a TXOP for P2P transmission. Then, the first non-AP MLD performs the Peer MLD information notification, that is, the attaching STA of the first non-AP MLD (i.e., the non-AP STA1) sends information of the Peer MLD for P2P transmission with the first non-AP MLD (such as the AID information or MAC address information of the second non-AP MLD) to the attaching AP of the AP MLD.

Alternatively, as illustrated in FIG. 43, the first non-AP MLD performs a TXOP duration request and Peer MLD information notification, that is, the attaching STA of the first non-AP MLD (i.e., the non-AP STA1) sends, to the attaching AP of the AP MLD, a TXOP duration request as well as information of the Peer MLD for P2P transmission with the first non-AP MLD, such as the AID information or MAC address information of the second non-AP MLD.

After receiving the TXOP duration request, the AP MLD triggers a TXOP sharing process. Specifically, the attaching AP of the AP MLD first sends a CTS to self frame, and further sends an MU-RTS TXS trigger frame to the attaching STA of the first non-AP MLD (i.e., the non-AP STA1), here a value of TXOP sharing mode in the MU-RTS TXS trigger frame is set to 2, which represents that this TXOP sharing may be used for P2P transmission.

After receiving the MU-RTS TXS trigger frame, the attaching STA of the first non-AP MLD (i.e., the non-AP STA1) sends a CTS frame, and then performs the P2P transmission based on the TXOP shared by the AP MLD, such as sending a PPDU to the attaching STA of the second non-AP MLD (i.e., the non-AP STA2). After receiving the PPDU, the attaching STA in the second non-AP MLD (i.e., the non-AP STA2) responds with a BA to the attaching STA of the first non-AP MLD.

Therefore, in embodiments of the present disclosure, MLDs for P2P transmission may interact their respective identification information, such as the AID information or MAC address information. Further, the sender MLD for P2P transmission may indicate the receiver device for P2P transmission to the AP MLD, for example, when the receiver device for P2P transmission is restricted by NSTR, the sender MLD for P2P transmission may indicate the receiver device for P2P transmission to the AP MLD, which facilitates the AP MLD to better perform management and scheduling of link resources to achieve load balancing. It can also restrict transmission on links with interference or conflicts, which facilitates avoiding invalid transmission and retransmission caused by NSTR restrictions, increasing channel utilization, and reducing the energy consumption of the device.

The above text, combined with FIGS. 7 to 43, provides a detailed description of the wireless communication method according to an embodiment of the present disclosure from the perspective of the non-AP MLD. The following text, combined with FIGS. 44 to 51, provides a detailed description of the wireless communication method according to another embodiment of the present disclosure from the perspective of the AP MLD. It should be understood that the description on the AP MLD side corresponds to the description on the non-AP MLD side. Similar descriptions may be found in the above text, which will not be repeated here to avoid repetition.

Figures 44, 45:
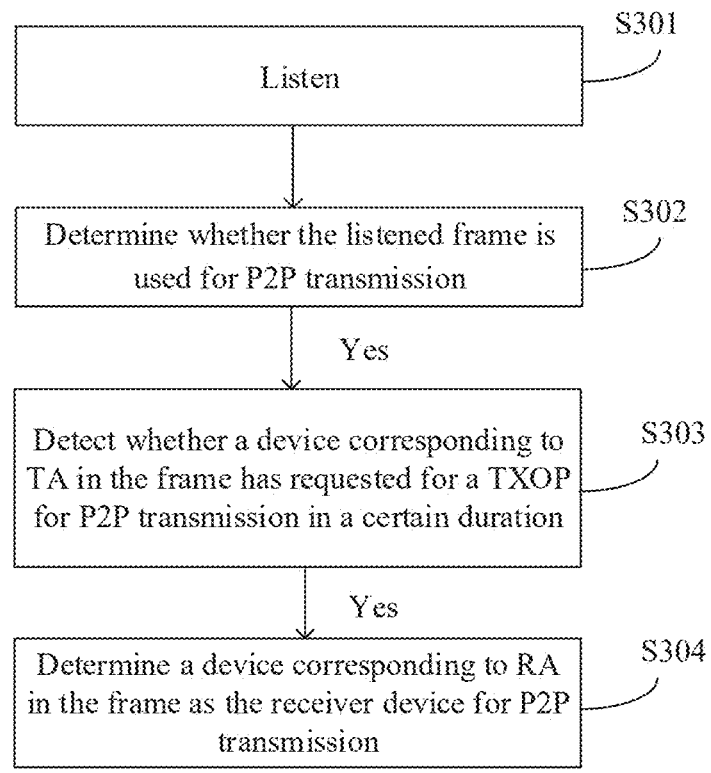
FIG. 44 is a schematic interactive diagram of a wireless communication method provided by an embodiment of the present disclosure.
FIG. 45 is a schematic flowchart for an AP MLD determining a receiver device for P2P transmission through listening.

FIG. 44 is a schematic flowchart of a wireless communication method 300 according to another embodiment of the present disclosure. As illustrated in FIG. 44, the method 300 includes the following operation.

In S310, an access point multi-link device (AP MLD) determines a receiver device for point-to-point (P2P) transmission.

In embodiments of the present disclosure, the receiver device for P2P transmission is designated as a second non-AP MLD, and the sender device for P2P transmission is designated as a first non-AP MLD.

In some embodiments, the first non-AP MLD is a functionally restricted (e.g., restricted by NSTR) MLD.

For example, the first non-AP MLD works on multiple links including at least one NSTR link pair, which includes two links that cannot simultaneously transmit and receive. That is, the first non-AP MLD cannot simultaneously transmit and receive data on the NSTR link pair.

In some embodiments, the second non-AP MLD is a functionally restricted (e.g., restricted by NSTR) MLD.

For example, the second non-AP MLD works on multiple links including at least one NSTR link pair, which includes two links that cannot simultaneously transmit and receive. That is, the second non-AP MLD cannot simultaneously transmit and receive data on the NSTR link pair.

In some embodiments, the first non-AP MLD sends TXOP duration requested information to the AP MLD for P2P transmission. That is, the P2P transmission between the first non-AP MLD and the second non-AP MLD may be a P2P transmission based on a triggered TXOP sharing mechanism.

In some embodiments of the present disclosure, S310 may include the following actions.

The AP MLD receives first indication information sent by the first non-AP MLD, where the first indication information indicates the second non-AP MLD; and the AP MLD determines the receiver device for P2P transmission based on the first indication information.

That is, the receiver device for P2P transmission is determined based on the first indication information sent by the sender device for P2P transmission.

Therefore, the AP MLD may determine the receiver device and sender device for P2P transmission based on the first indication information.

Through the above technical solution, the sender device for P2P transmission, i.e., the first non-AP MLD, indicates the receiver device for P2P transmission to the AP MLD, which facilitates the AP MLD to better perform management and scheduling of link resources to achieve load balancing. It can also restrict transmission on links with interference or conflicts, which facilitates avoiding invalid transmission and retransmission caused by NSTR restrictions, thereby increasing channel utilization, reducing the energy consumption of the device, and improving the performance of the P2P transmission.

In some embodiments, when the first non-AP MLD and the second non-AP MLD belong to the same BSS, the first non-AP MLD sends the first indication information to the AP MLD.

In some embodiments of the present disclosure, the first indication information may be identification information of the second non-AP MLD, such as AID information, MAC address information, or other identification information, as long as the AP MLD can uniquely determine the second non-AP MLD based on the identification information. Taking the first indication information being the AID information or MAC address information of the second non-AP MLD as an example below, and when the identification information of the second non-AP MLD is other identification information, only needs the corresponding replacement, which is not limited in the present disclosure.

In some embodiments of the present disclosure, the AID information of the second non-AP MLD is carried through an aggregation control (A-Control) field.

For example, the first non-AP MLD may send the AID information of the second non-AP MLD to the AP MLD through a first frame carrying the A-Control field.

As an example rather than a limitation, the first frame includes at least one of the following:

a QoS-Null-Data frame, a QoS Data frame, or a control frame wrapped using a control wrapper frame.

In some embodiments of the present disclosure, the A-Control field includes a Control ID field and a Peer STA AID field. A value of the Control ID field is a reserved value, and the Peer STA AID field indicates the AID information of the second non-AP MLD.

In some embodiments of the present disclosure, the first frame further includes transmission opportunity (TXOP) duration requested information.

That is, the first non-AP MLD sends the TXOP duration requested information and the AID information of the second non-AP MLD to the AP MLD through the same frame.

In some embodiments of the present disclosure, the AID information of the second non-AP MLD is carried by a management frame.

For example, the function of indicating (or notifying) the AID information of the Peer MLD is achieved by newly adding a type of management frame, or the function of indicating (or notifying) the AID information of the Peer MLD is achieved by utilizing an existing type of management frame. That is, the first frame may be a type of management frame.

In some embodiments of the present disclosure, the AID information of the second non-AP MLD is carried by an Action frame.

In some embodiments, the function of indicating (or notifying) the AID information of the Peer MLD may be achieved by an Action frame, or the function of indicating (or notifying) the AID information of the Peer MLD is achieved by utilizing an existing type of Action frame. That is, the first frame may be a type of Action frame.

In some embodiments of the present disclosure, the AID information of the second non-AP MLD is carried by an EHT Action frame.

In some embodiments, the function of indicating (or notifying) the AID information of the Peer MLD may be achieved by a newly added type of EHT Action frame, or the function of indicating (or notifying) the AID information of the Peer MLD is achieved by utilizing an existing type of EHT Action frame. That is, the first frame may be a type of EHT Action frame.

As an example, the EHT Action frame includes a Category field, an EHT Action field, and an AID field. The Category field indicates that the type of the Action frame is the EHT Action frame, the EHT Action field indicates that the EHT Action frame is used to notify AID information of a peer non-AP MLD, and the AID field indicates the AID information of the second non-AP MLD.

As another example, the EHT Action frame includes a Category field, an EHT Action field, and at least one peer non-AP MLD detail information field. The Category field indicates that the type of the Action frame is the EHT Action frame, the EHT Action field indicates that the EHT Action frame is used to notify information of the peer non-AP MLD, and the peer non-AP MLD detail information field indicates the AID information of the second non-AP MLD and TXOP duration requested information.

In some cases, the EHT Action frame includes a peer non-AP MLD detail information field. The peer non-AP MLD detail information field includes an AID field and a TXOP duration requested field. The AID field indicates the AID information of the second non-AP MLD, and the TXOP duration requested field indicates the TXOP duration requested information.

In another case, the EHT Action frame includes one or more peer non-AP MLD detail information fields. The peer non-AP MLD detail information field includes an AID field, a TXOP duration requested field, and a more information (More Info) field. The AID field indicates the AID information of the second non-AP MLD, the TXOP duration requested field indicates the TXOP duration requested information, and the more information field indicates whether the EHT Action frame further includes another one or more non-AP MLD detail information fields.

In other embodiments of the present disclosure, the first indication information indicates the medium access control (MAC) address information of the second non-AP MLD.

In some embodiments, the MAC address information of the second non-AP MLD is carried by a management frame.

For example, the function of indicating the MAC address information of the Peer MLD is achieved by newly adding a type of management frame, or the function of indicating the MAC address information of the Peer MLD is achieved by utilizing an existing type of management frame.

In some embodiments, the MAC address information of the second non-AP MLD is carried by an Action frame.

For example, the function of indicating the MAC address information of the Peer MLD is achieved by newly adding a type of Action frame, or the function of indicating the MAC address information of the Peer MLD is achieved by utilizing an existing type of Action frame.

In some embodiments, the MAC address information of the second non-AP MLD is carried by an EHT Action frame among Action frames.

For example, the function of indicating the MAC address information of the Peer MLD is achieved by newly adding a type of EHT Action frame, or the function of indicating the MAC address information of the Peer MLD is achieved by utilizing an existing type of EHT Action frame.

As an example, the EHT Action frame includes a Category field, an EHT Action field, and at least one peer non-AP MLD detail information field. The Category field indicates that the type of the Action frame is the EHT Action frame, the EHT Action field indicates that the EHT Action frame is used to notify information of the peer non-AP MLD, and the peer non-AP MLD detail information field indicates the MAC address information of the second non-AP MLD and TXOP duration requested information.

In some cases, the EHT Action frame includes a peer non-AP MLD detail information field, in this case, the peer non-AP MLD detail information field may include an MAC address field and a TXOP duration requested field. The MAC address field indicates the MAC address information of the second non-AP MLD, and the TXOP duration requested field indicates the TXOP duration requested information.

In other cases, the EHT Action frame includes one or more peer non-AP MLD detail information fields. In this case, the peer non-AP MLD detail information field may include an MAC address field, a TXOP duration requested field, and a more information (More Info) field. The MAC address field indicates the MAC address information of the second non-AP MLD, the TXOP duration requested field indicates the TXOP duration requested information, and the more information field indicates whether the EHT Action frame further includes another one or more non-AP MLD detail information fields.

As another example, the EHT Action frame includes a Category field, an EHT Action field, and a link identifier field. The Category field indicates that the type of the Action frame is the EHT Action frame, the EHT Action field indicates that the EHT Action frame is used to notify information of a peer non-AP MLD, and the link identifier field indicates the MAC address information of the second non-AP MLD and the MAC address information of the first non-AP MLD.

In other embodiments, the MAC address information of the second non-AP MLD is carried by a WNM Action frame among the Action frames.

For example, the MAC address information of the second non-AP MLD is carried by an event report frame in the WNM Action frame.

As a specific example, the MAC address information of the second non-AP MLD is carried by the event report frame of the peer-to-peer link event subtype.

For example, the event report frame includes a Peer STA/BSSID address field, which indicates the MAC address information of the first non-AP MLD through the Peer STA/BSSID Address field.

In other embodiments of the present disclosure, the AP MLD may determine the receiver device for P2P transmission through listening.

In some embodiments, the AP MLD performs listening to determine whether the listened frame is used for P2P transmission. In response to determining that the listened frame is used for P2P transmission, the AP MLD further determines whether the sender device for P2P transmission has requested for TXOP for this P2P transmission. If so, it represents that this P2P transmission is a P2P transmission based on triggered TXOP sharing, and then the AP MLD may determine a device corresponding to the receive address (RA) in this frame as the receiver device for P2P transmission.

For example, the AP MLD listens to a fourth frame and further determines whether the fourth frame is used for P2P transmission based on values of a target distribution system (DS) (to DS) field and a source DS (from DS) field in the frame control field of the fourth frame.

In an example, when the value of the to DS field is 0 and the value of the from DS field is 0, the AP MLD determines that the fourth frame is used for P2P transmission.

The specific implementation process for the AP MLD to determine the receiver device for P2P transmission by listening is explained combining FIG. 45.

As illustrated in FIG. 45, the following operations are included.

In S301, AP MLD performs listening during a triggered TXOP.

In S302, the AP MLD determines whether the listened frame is used for P2P transmission.

If the AP MLD determines that the listened frame is used for P2P transmission, operation 303 is executed; otherwise, the process is ended.

For example, if the AP MLD listens to the fourth frame, the AP MLD determines whether the fourth frame is used for P2P transmission based on the values of the to DS field and the from DS field in the frame control field of the fourth frame.

For example, when the value of the to DS field is 0 and the value of the from DS field is 0, the AP MLD determines that the fourth frame is used for P2P transmission.

In S303, the AP MLD determines whether the device corresponding to the transmit address (TA) in the frame has requested for TXOP for P2P transmission.

That is to say, it is determined whether the device corresponding to the transmit address will initiate the P2P transmission based on triggered TXOP sharing.

If yes, operation S304 is executed; otherwise, the process is ended.

For example, when the TXOP duration requested information sent by the device corresponding to the TA is received within a first period of time before listening to the fourth frame, and the TXOP duration request is used for P2P transmission (i.e., the TXOP duration request sent within the first period of time is used for this P2P transmission), it is determined that the device corresponding to the TA will initiate the P2P transmission based on trigger based TXOP sharing.

In S304, a device corresponding to a receive address of the fourth frame is determined as the receiver device for P2P transmission.

That is to say, AP MLD may determine that the device corresponding to the receive address of a listened frame is the receiver device for P2P transmission when the listened frame is used for P2P transmission, and the device corresponding to the transmit address of the listened frame has requested for TXOP for P2P transmission within a certain period of time.

In summary, AP MLD may determine the receiver device for P2P transmission based on the first indication information, or determine the receiver device for P2P transmission by listening, and may also obtain the sender device for P2P transmission. For example, the device that sends the first indication information is determined as the sender device for P2P transmission, or the device corresponding to TA in the fourth frame is determined as the sender device for P2P transmission.

In some embodiments of the present disclosure, the method 300 may further include the following operation.

The AP MLD restricts a relevant transmission of the first transmission in a TXOP duration shared by the AP MLD to the first non-AP MLD, herein the first transmission is a transmission to be performed in the TXOP duration shared by the AP MLD to the first non-AP MLD, or a transmission being performed in the TXOP duration shared by the AP MLD to the first non-AP MLD.

Here, the first transmission is a transmission on a first link, and the first link and a second link form an NSTR link pair.

In some embodiments, the relevant transmission of the first transmission may refer to a transmission that may be affected by the interference of the first transmission.

the First Mode:

In some embodiments of the present disclosure, the relevant transmission of the first transmission may include at least one of the following:

a downlink transmission initiated by the AP MLD to the initiator device for P2P transmission;

a downlink transmission initiated by the AP MLD to the receiver device for P2P transmission;

another P2P transmission initiated using the triggered TXOP sharing mechanism to the initiator device for P2P transmission; or another P2P transmission initiated using the triggered TXOP sharing mechanism to the receiver device for P2P transmission.

That is, after obtaining the initiator device and receiver device for P2P transmission, the AP MLD may restrict the downlink transmission sent to the initiator device and receiver device, as well as the P2P transmission performed using the triggered TXOP sharing mechanism, which facilitates avoiding unnecessary overhead caused by NSTR restrictions.

As an example rather than a limitation, the first transmission is a transmission between a first attaching STA in the first non-AP MLD and a first attaching STA in the second non-AP MLD, and the relevant transmission of the first transmission includes at least one of the following:

a downlink transmission initiated by an attaching AP in the AP MLD to another attaching STA other than the first attaching STA in the first non-AP MLD;

a downlink transmission initiated by the attaching AP in the AP MLD to another attaching STA other than the first attaching STA in the second non-AP MLD;

a P2P transmission initiated by an attaching STA in a third non-AP MLD to another attaching STA other than the first attaching STA in the first non-AP MLD using the TXOP sharing mechanism; or a P2P transmission initiated by the attaching STA in the third non-AP MLD to another attaching STA other than the first attaching STA in the second non-AP MLD using the TXOP sharing mechanism.

Herein the third non-AP MLD is another non-AP MLD other than the first non-AP MLD and the second non-AP MLD.

the Second Mode:

In some embodiments of the present disclosure, the relevant transmission of the first transmission may include at least one of the following:

a downlink transmission initiated by the AP MLD to the initiator device for P2P transmission; or another P2P transmission initiated using the triggered TXOP sharing mechanism to the initiator device for P2P transmission.

That is, after obtaining the initiator device and receiver device for P2P transmission, the AP MLD may restrict the downlink transmission sent to the initiator device, as well as the P2P transmission performed using the triggered TXOP sharing mechanism, which facilitates avoiding unnecessary overhead caused by NSTR restrictions.

As an example rather than a limitation, the first transmission is a transmission between the first attaching STA in the first non-AP MLD and the first attaching STA in the second non-AP MLD, and the relevant transmission of the first transmission includes at least one of the following:

a downlink transmission initiated by an attaching AP in the AP MLD to another attaching STA other than the first attaching STA in the first non-AP MLD; or a P2P transmission initiated by an attaching STA in the third non-AP MLD to another attaching STA other than the first attaching STA in the first non-AP MLD using a TXOP sharing mechanism, where the third non-AP MLD is another non-AP MLD other than the first non-AP MLD and the second non-AP MLD.

In some embodiments, AP MLD may not restrict the following transmissions when the following transmissions are ensured to be synchronized with the first transmission:

a downlink transmission initiated by the AP MLD to the receiver device for P2P transmission; and another P2P transmission initiated using the triggered TXOP sharing mechanism to the receiver device for P2P transmission.

In other embodiments, the AP MLD may need to restrict the following transmissions when the following transmissions are not ensured to be synchronized with the first transmission:

a downlink transmission initiated by the AP MLD to the receiver device for P2P transmission; and another P2P transmission initiated using the triggered TXOP sharing mechanism to the receiver device for P2P transmission.

Figure 46:
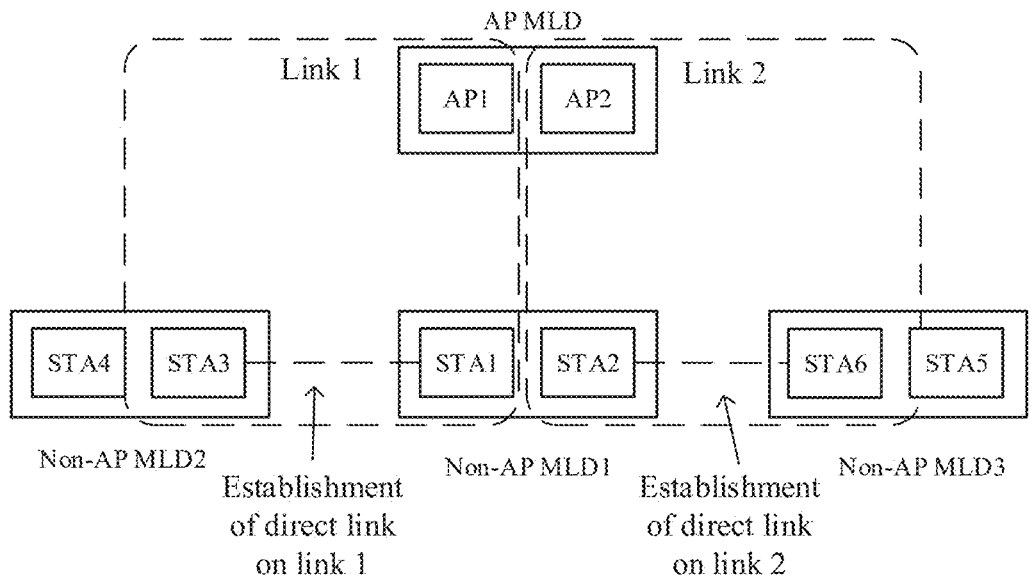
FIG. 46 is a schematic diagram of an application scenario of an embodiment of the present disclosure.

It is explained combined with the specific scenario illustrated in FIG. 46.

Here, AP MLD is associated with non-AP MLD1, non-AP MLD2, and non-AP MLD3. STA1 and STA2 are attached to the non-AP MLD1, STA3 and STA4 are attached to the non-AP MLD2, and STA5 and STA6 are attached to the non-AP MLD3. Here, AP1, STA1, STA3, and STA4 work on link 1, while AP2, STA2, STA5, and STA6 work on link 2. For the non-AP MLD1, the non-AP MLD2, and the non-AP MLD3, link 1 and link 2 form an NSTR link pair, and their attaching STAs cannot simultaneously transmit and receive data on these two links. Moreover, P2P transmission between the STA1 and STA3 and P2P transmission between the STA2 and STA6 have been established through a certain mechanism (such as Wi-Fi Direct, TDLS, etc., which is not limited in the present disclosure).

STA3, which is attached to the non-AP MLD2, is using the TXOP shared by AP1 attached to the AP MLD on link 1 for P2P transmission with STA1, which is attached to the non-AP MLD1. During the duration of TXOP shared by the attaching AP1, the AP MLD may restrict relevant transmissions.

Figure 47:
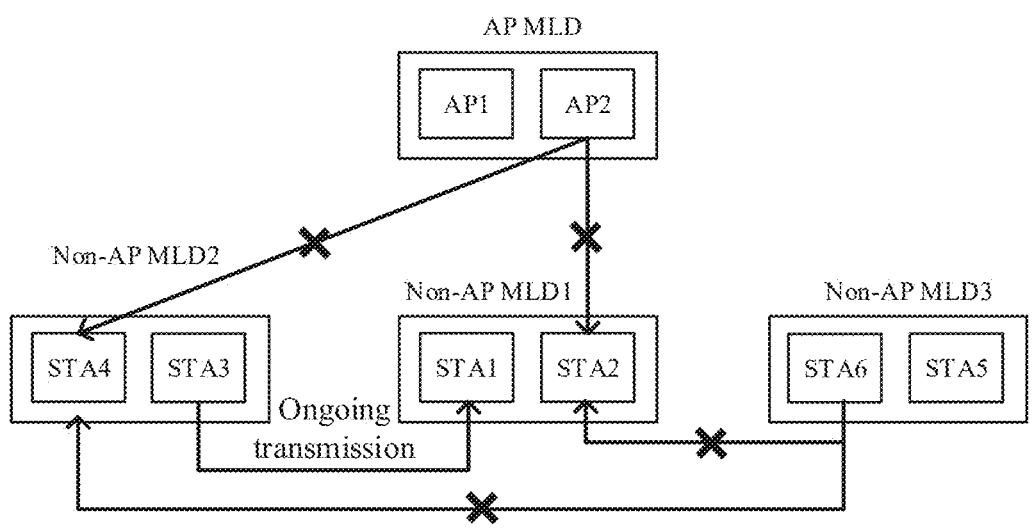
FIG. 47 is a schematic diagram of restricted transmission based on the application scenario illustrated in FIG. 46.

For example, as illustrated in FIG. 47, the AP MLD may restrict the following transmissions:
1. a downlink transmission initiated by the AP MLD on link 2 from AP2 to STA4;
2. a downlink transmission initiated by the AP MLD on link 2 from AP2 to STA2;
3. a P2P transmission initiated by the non-AP MLD3 from STA6 to STA4 on link 2 by requesting the AP MLD for TXOP using the triggered TXOP sharing mechanism; and
4. a P2P transmission initiated by the non-AP MLD3 from STA6 to STA2 on link 2 by requesting the AP MLD for TXOP using the triggered TXOP sharing mechanism.

It should be noted that in embodiments of the present disclosure, the above-mentioned transmission refers to the transmission that requires immediate response, that is, it needs to be received and feedback within the specified time after sending.

It should also be noted that the above restrictions only apply to AP MLD and the triggered TXOP sharing mechanism. For example, if in the aforementioned cases 3 and 4, STA6 initiates the P2P transmission directly to STA2 or STA4 without the triggered TXOP sharing mechanism, then the AP MLD may not restrict it.

It should be understood that embodiments of the present disclosure do not impose any constraints on the "direction" of the P2P transmission being performed (such as P2P transmission between STA1 and STA3), allowing the use of a reverse direction (RD) mechanism to achieve the interaction of P2P data between both parties, rather than only allowing one party to send and the other party to feedback a receive response.

Figure 48:
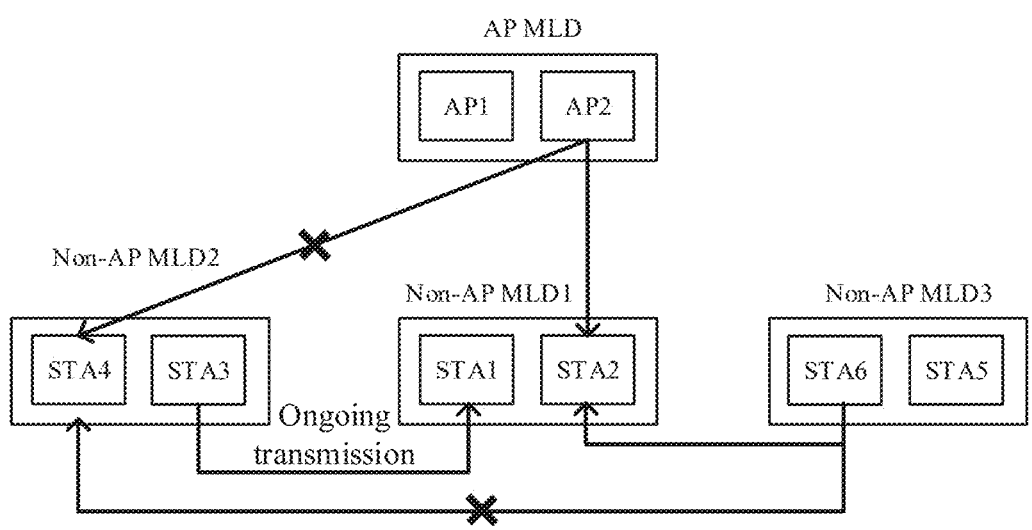
FIG. 48 is a schematic diagram of restricted transmission based on the application scenario illustrated in FIG. 46.

For example, as illustrated in FIG. 48, the AP MLD may restrict the following transmissions:
1. A downlink transmission initiated by the AP MLD on link 2 from AP2 to STA4
2. A P2P transmission initiated by the non-AP MLD3 on link 2 from STA6 to STA4 by requesting the AP MLD for TXOP using the triggered TXOP sharing mechanism.

It should be noted that in the aforementioned modes 1 and 2, taking the downlink transmission initiated by AP MLD as an example, the restricted transmission may be understood as: when the AP MLD obtains channel access rights in a certain sending queue of an attaching AP on a certain link, and a target receiver device indicated by data in the header of the sending queue is a receiver device (such as STA4 in FIG. 46) of a transmission restricted within the shared TXOP duration, then the AP MLD temporarily does not send the data and should choose other data in the sending queue for transmission. If there is no other data in the sending queue, the AP MLD resets the backoff counter and re-competes for the channel (other sending queues may also backoff to 0 during this period, and this rule should also be followed to restrict corresponding transmissions).

It should also be noted that the above restrictions are advisory restrictions for AP MLD. Specifically, these restrictions are aimed at AP MLD strategies, such as "downlink transmission should not be initiated" and "triggered TXOP sharing processes should not be performed on other links to provide services for P2P transmission" during the TXOP duration. These restrictions do not need interaction with other devices, but are achieved independently by AP MLD. Due to the existing rules followed by the non-AP MLD, its transmission has already been restricted under NSTR restrictions, so there is no need for additional restrictions or instructions on it. On the other hand, executing restricted transmissions may lead to efficiency degradation and waste of resources. Therefore, it is recommended that AP MLD not initiate these transmissions, rather than imposing mandatory requirements on AP MLD.

Figure 49:
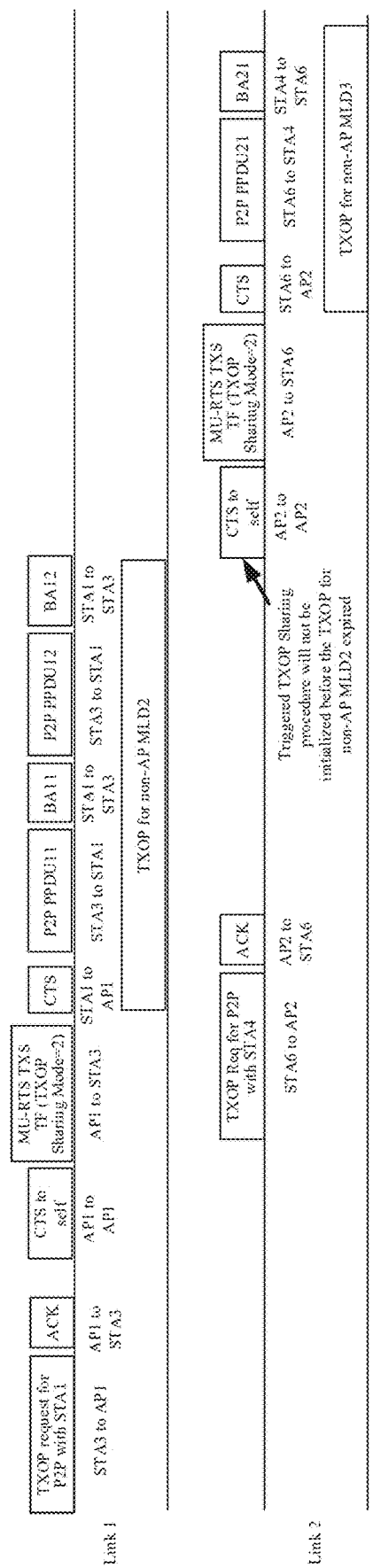
FIG. 49 is a schematic frame interaction diagram for restricting a transmission a receiver device of which being an initiator device of P2P transmission that is being performed or is about to be performed.

Based on the scenario illustrated in FIG. 46 and in combination with FIG. 49, a frame interaction process for restricting a transmission is described, where a receiver device of the transmission is an initiator device of the P2P transmission that is being performed or is about to be performed.

As illustrated in FIG. 49, the attaching STA3 of the non-AP MLD 2 requests the attaching AP1 of the AP MLD for a TXOP on link 1 to perform P2P communication with the attaching STA1 of the non-AP MLD1.

After receiving the TXOP duration request, the AP MLD responds with an ACK to the STA3, further triggering the TXOP sharing process. Specifically, the AP MLD first sends a CTS to self frame, and further sends an MU-RTS TXS trigger frame to the STA3. Here, a TXOP sharing mode in the MU-RTS TXS trigger frame is set to 2, which represents that this TXOP sharing may be used for P2P transmission.

Then the STA3 performs P2P transmission using the TXOP shared by the AP1. For example, the STA3 sends P2P PPDU11 to STA1, the STA1 responds with BA11 to the STA3, the STA3 sends P2P PPDU12 to the STA1, and the STA1 responds with BA12 to the STA3.

At the same time, the attaching STA6 of the non-AP MLD3 requests AP MLD for TXOP on link 2 to perform P2P communication with the attaching STA4 of the non-AP MLD2. In the previous interaction, the AP MLD has obtained that both STA3 and STA4 are attached to the non-AP MLD2, and their working links 1 and 2 are an NSTR link pair. At this time, the P2P transmission that is being performed or is about to be performed on link 1 will interfere with the transmission on link 2. Therefore, AP MLD may restrict the transmission (i.e., a transmission a receiver device of which is the initiator device of the P2P transmission that is being performed or is about to be performed). Furthermore, after the shared TXOP on link 1 is ended, the AP MLD executes the triggered TXOP sharing process, requests for TXOP on link 2, and shares it with the attaching STA6 of the non-AP MLD3. Then, the attaching STA6 of the non-AP MLD3 utilizes the TXOP shared by AP2 to perform P2P transmission with the attaching STA4 of the non-AP MLD2.

Figure 50:
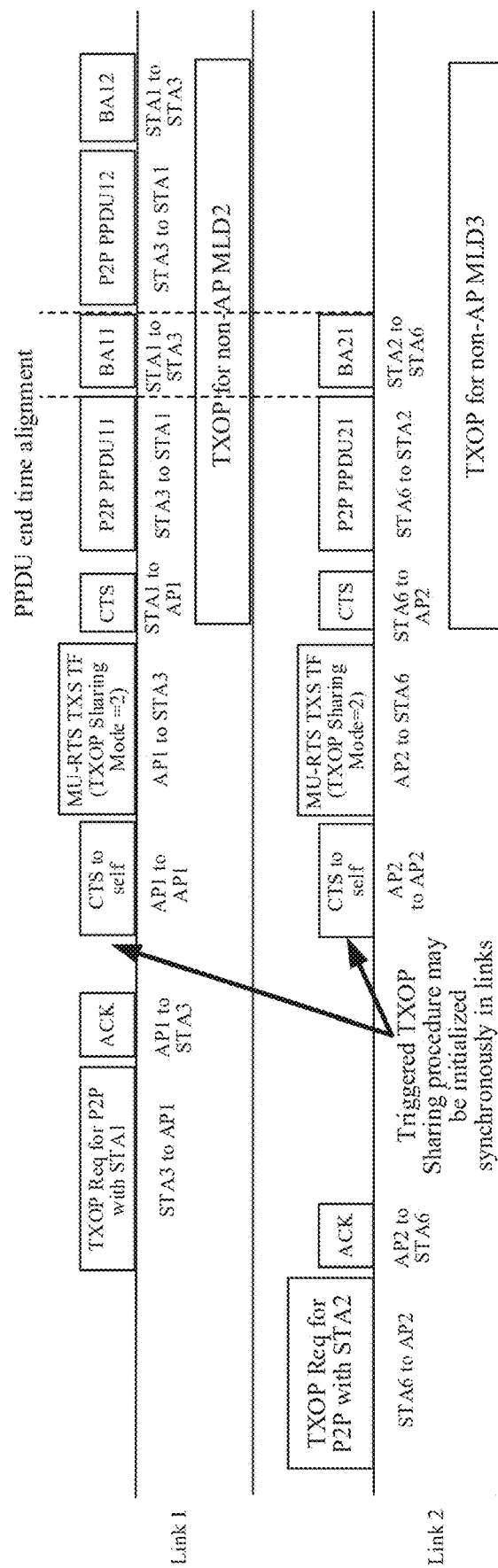
FIG. 50 is a schematic frame interaction diagram for restricting a transmission a receiver device of which being a receiver device of P2P transmission that is being performed or is about to be performed.

Based on the scenario illustrated in FIG. 46 and in combination with FIG. 50, a frame interaction process for restricting a transmission is described, where a receiver device of the transmission is a receiver device of P2P transmission that is being performed or is about to be performed.

As illustrated in FIG. 50, the attaching STA6 of the non-AP MLD 3 requests the attaching AP2 of the AP MLD for a TXOP on link 2 to perform P2P communication with the attaching STA2 of the non-AP MLD1.

At the same time, the attaching STA3 of the non-AP MLD 2 requests the attaching AP1 of the AP MLD for a TXOP on link 1 to perform P2P communication with the attaching STA1 of the non-AP MLD1. The present disclosure does not limit the order of requesting for the two TXOP durations.

In the previous interaction, the AP MLD has obtained that both the STA1 and STA2 are attached to the non-AP MLD1, and their working links 1 and 2 are an NSTR link pair. At this time, the P2P transmission on link 1 will interfere with the transmission on link 2. Therefore, the AP MLD may restrict the transmission (i.e., a transmission a receiver device of which is the receiver device of the P2P transmission that is being performed or is about to be performed).

Since the receiver devices of the P2P transmissions to which the TXOPs requested on the two links are applied are the same non-AP MLD, the AP MLD may execute the triggered TXOP sharing processes on the two links simultaneously while ensuring synchronization, and ensure subsequent P2P PPDU alignment.

Figure 51:
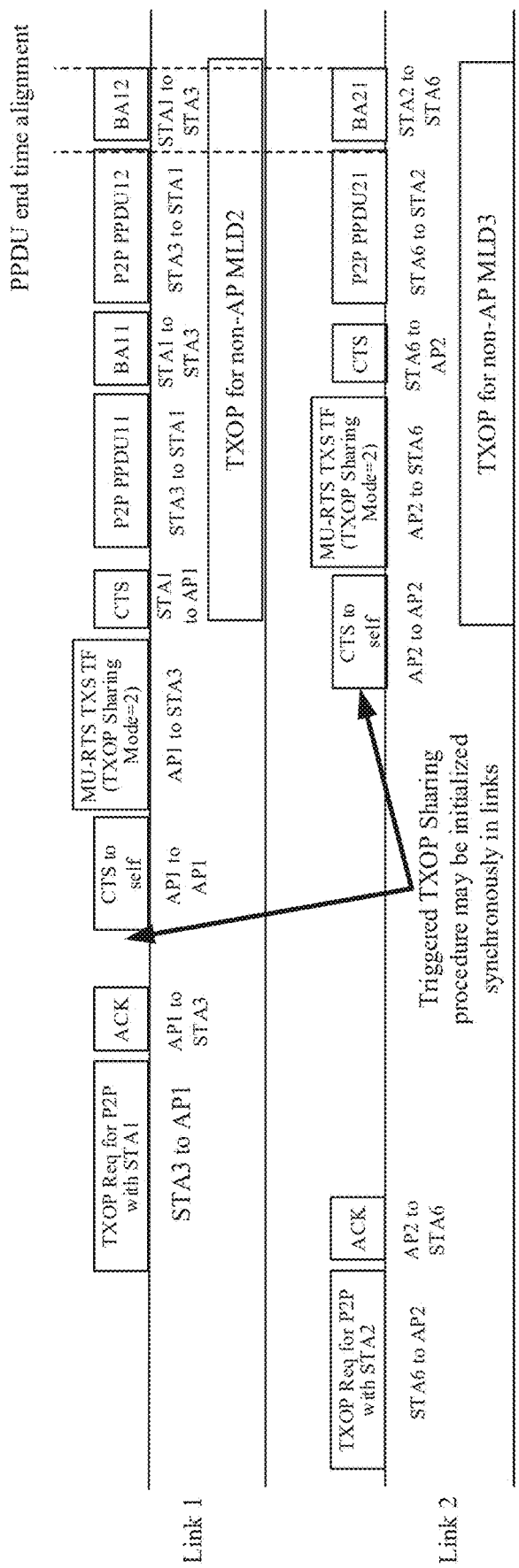
FIG. 51 is another schematic frame interaction diagram for restricting a transmission a receiver device of which being a receiver device of P2P transmission that is being performed or is about to be performed.

Based on the scenario illustrated in FIG. 46 and in combination with FIG. 51, another frame interaction process for restricting a transmission is described, where a receiver device of the transmission is a receiver device of the P2P transmission that is being performed or is about to be performed.

As illustrated in FIG. 51, the attaching STA6 of the non-AP MLD 3 requests the attaching AP2 of the AP MLD for a TXOP on link 2 to perform the P2P communication with the attaching STA2 of the non-AP MLD1. At the same time, the attaching STA3 of the non-AP MLD2 requests the attaching AP1 of the AP MLD for a TXOP on link 1 to perform the P2P communication with the attaching STA1 of the non-AP MLD1. The present disclosure does not limit the order of requesting for the two TXOP durations.

In the previous interaction, the AP MLD has obtained that both the STA1 and STA2 are attached to the non-AP MLD1, and their working links 1 and 2 are an NSTR link pair. At this time, the P2P transmission on link 1 will interfere with the transmission on link 2. Therefore, the AP MLD may restrict the transmission (i.e., a transmission a receiver device of which is the receiver device of the P2P transmission that is being performed or is about to be performed.

Since the receiver devices of the P2P transmissions to which the TXOPs requested on the two links are applied are the same non-AP MLD, the AP MLD may execute the triggered TXOP sharing processes on the two links simultaneously while ensuring synchronization, and ensure subsequent P2P PPDU alignment. In summary, when the AP MLD obtains the sender device and receiver device for P2P transmission, and the sender device and receiver device work on an NSTR link pair, the AP MLD may restrict a transmission that conflicts with the P2P transmission, such as restricting a transmission a receiver device of which is the sender device for P2P transmission, and/or restricting a transmission a receiver device of which is the receiver device for P2P transmission, which facilitates avoiding invalid transmission and retransmission caused by NSTR restrictions, increasing channel utilization, and reducing the energy consumption of the device.

The method embodiments of the present disclosure are described in detail above in conjunction with FIGS. 7 to 51, and apparatus embodiments of the present disclosure are described in detail below in conjunction with FIGS. 52 to 56. It should be understood that the apparatus embodiments and the method embodiments correspond to each other, and similar descriptions may refer to the method embodiments.

Figure 52:
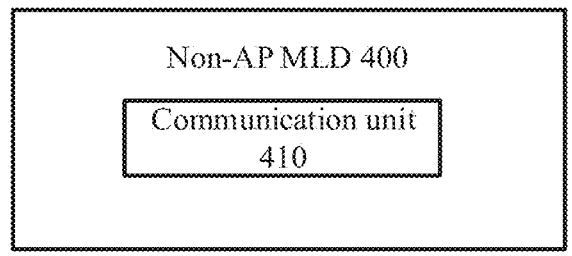
FIG. 52 is a schematic block diagram of a non-access point multi-link device (non-AP MLD) provided by an embodiment of the present disclosure.

FIG. 52 illustrates a schematic block diagram of a non-access point multi-link device (non-AP MLD) 400 according to an embodiment of the present disclosure. As illustrated in FIG. 52, the non-AP MLD 400 includes a communication unit 410.

The communication unit 410 is configured to send first indication information to an access point (AP MLD), where the first indication information indicates a second non-AP MLD, and the second non-AP MLD is to perform a peer-to-peer P2P transmission with the non-AP MLD.

In some embodiments, the first indication information indicates association identifier AID information of the second non-AP MLD.

In some embodiments, the AID information of the second non-AP MLD is carried by an aggregation control (A-Control) field.

In some embodiments, the A-Control field includes a control identifier (Control ID) field and a peer station (STA) AID field, here a value of the Control ID field is a reserved value, and the peer STA AID field indicates the AID information of the second non-AP MLD.

In some embodiments, the AID information of the second non-AP MLD is carried by an A-Control field in a first frame.

The first frame includes at least one of the following:
a quality of service null data (QoS-Null-Data) frame, a quality of service data (QOS Data) frame, or a control frame wrapped using a control wrapper frame.

In some embodiments, the first frame further includes transmission opportunity TXOP duration requested information.

In some embodiments, the AID information of the second non-AP MLD is carried by a management frame.

In some embodiments, the AID information of the second non-AP MLD is carried by an Action frame.

In some embodiments, the AID information of the second non-AP MLD is carried by an extremely high throughput (EHT) Action frame.

In some embodiments, the EHT Action frame includes a category field, an EHT Action field, and an AID field The category field indicates that the type of the Action frame is the EHT Action frame, the EHT Action field indicates that the EHT Action frame is used to notify AID information of a peer non-AP MLD, and the AID field indicates the AID information of the second non-AP MLD.

In some embodiments, the EHT Action frame includes a category field, an EHT Action field, and at least one peer non-AP MLD detail information field, herein the category field indicates that the type of the Action frame is the EHT Action frame, the EHT Action field indicates that the EHT Action frame is used to notify information of the peer non-AP MLD, and the peer non-AP MLD detail information field indicates the AID information of the second non-AP MLD and TXOP duration requested information.

In some embodiments, the EHT Action frame includes a peer non-AP MLD detail information field, herein the peer non-AP MLD detail information field includes an AID field and a TXOP duration requested field, the AID field indicates the AID information of the second non-AP MLD, and the TXOP duration requested field indicates the TXOP duration requested information.

In some embodiments, the EHT Action frame includes one or more peer non-AP MLD detail information fields. The peer non-AP MLD detail information field includes an AID field, a TXOP duration requested field, and a more information field, the AID field indicates the AID information of the second non-AP MLD, the TXOP duration requested field indicates the TXOP duration requested information, and the more information field indicates whether the EHT Action frame further includes another one or more non-AP MLD detail information fields.

In some embodiments, the first indication information indicates medium access control MAC address information of the second non-AP MLD.

In some embodiments, the MAC address information of the second non-AP MLD is carried by a management frame.

In some embodiments, the MAC address information of the second non-AP MLD is carried by an Action frame.

In some embodiments, the MAC address information of the second non-AP MLD is carried by an EHT Action frame.

In some embodiments, the EHT Action frame includes a category field, an EHT Action field, and at least one peer non-AP MLD detail information field, herein the category field indicates that the type of the Action frame is the EHT Action frame, the EHT Action field indicates that the EHT Action frame is used to notify information of the peer non-AP MLD, and the peer non-AP MLD detail information field indicates the MAC address information of the second non-AP MLD and TXOP duration requested information.

In some embodiments, the EHT Action frame includes a peer non-AP MLD detail information field, herein the peer non-AP MLD detail information field includes an MAC address field and a TXOP duration requested field, the MAC address field indicates the MAC address information of the second non-AP MLD, and the TXOP duration requested field indicates the TXOP duration requested information.

In some embodiments, the EHT Action frame includes one or more peer non-AP MLD detail information fields. The peer non-AP MLD detail information field includes an MAC address field, a TXOP duration requested field, and a more information field, the MAC address field indicates the MAC address information of the second non-AP MLD, the TXOP duration requested field indicates the TXOP duration requested information, and the more information field indicates whether the EHT Action frame further includes another one or more non-AP MLD detail information fields.

In some embodiments, the EHT Action frame includes a category field, an EHT Action field, and a link identifier field, herein the category field indicates that the type of the Action frame is the EHT Action frame, the EHT Action field indicates that the EHT Action frame is used to notify information of a peer non-AP MLD, and the link identifier field indicates the MAC address information of the second non-AP MLD and MAC address information of the non-AP MLD.

In some embodiments, the MAC address information of the second non-AP MLD is carried by a WNM Action frame.

In some embodiments, the MAC address information of the second non-AP MLD is carried by an event report frame.

In some embodiments, the MAC address information of the second non-AP MLD is carried by the event report frame of the peer-to-peer link event subtype.

In some embodiments, the event report frame includes a peer station (STA)/basic service set identifier (BSSID) address field indicating the MAC address information of the second non-AP MLD.

In some embodiments, the communication unit 410 is further configured to:
send a second frame to the second non-AP MLD, where the second frame is used to request the AID information of the second non-AP MLD.

In some embodiments, the second frame is further used to request BSSID information of the second non-AP MLD.

In some embodiments, the second frame further includes AID information of the non-AP MLD and/or BSSID information of the non-AP MLD.

In some embodiments, the second frame is an EHT Action frame.

In some embodiments, the EHT Action frame includes a category field, an EHT Action field, and a peer STA information notification control field, herein the category field indicates that the type of the Action frame is the EHT Action frame, the EHT Action field indicates that the EHT Action frame is used to notify information to a peer non-AP MLD, and the peer STA information notification control field indicates control information for notifying the information to the peer non-AP MLD.

In some embodiments, the EHT Action frame further includes an AID field and/or a BSSID field, herein the AID field indicates the AID information of the non-AP MLD, and the BSSID field indicates the BSSID information of the non-AP MLD.

In some embodiments, the peer STA information notification control field includes:
- an AID requested field, which indicates whether to request AID information of the peer non-AP MLD; and
- an AID presented field, which indicates whether the EHT Action frame includes the AID information of the non-AP MLD.

In some embodiments, the peer STA information notification control field includes:
- an AID requested field, which indicates whether to request AID information of the peer non-AP MLD;
- an AID presented field, which indicates whether the EHT Action frame includes the AID information of the non-AP MLD;
- a BSSID requested field, which indicates whether to request BSSID information of the peer non-AP MLD; and
- a BSSID presented field, which indicates whether the EHT Action frame includes BSSID information of the non-AP MLD.

In some embodiments, the communication unit 410 is further configured to receive a third frame sent by the second non-AP MLD, where the third frame indicates the AID information of the second non-AP MLD.

In some embodiments, the third frame further indicates the BSSID information of the second non-AP MLD.

In some embodiments, the third frame is an EHT Action frame.

In some embodiments, the EHT Action frame includes a category field, an EHT Action field, and a peer STA information notification control field, herein the category field indicates that the type of the Action frame is the EHT Action frame, the EHT Action field indicates that the EHT Action frame is used to notify information to a peer non-AP MLD, and the peer STA information notification control field indicates control information for notifying the information to the peer non-AP MLD.

In some embodiments, the EHT Action frame further includes an AID field and/or a BSSID field, herein the AID field indicates the AID information of the second non-AP MLD, and the BSSID field indicates the BSSID information of the second non-AP MLD.

In some embodiments, the peer STA information notification control field includes:
- an AID requested field, which indicates whether to request AID information of the peer non-AP MLD; and
- an AID presented field, which indicates whether the EHT Action frame includes the AID information of the second non-AP MLD.

In some embodiments, the peer STA information notification control field includes:
- an AID requested field, which indicates whether to request AID information of the peer non-AP MLD;
- an AID presented field, which indicates whether the EHT Action frame includes the AID information of the second non-AP MLD;
- a BSSID requested field, which indicates whether to request BSSID information of the peer non-AP MLD; and
- a BSSID presented field, which indicates whether the EHT Action frame includes BSSID information of the second non-AP MLD.

In some embodiments, the non-AP MLD works on multiple links, which include at least one non-simultaneous transmit and receive (NSTR) link pair including two links that cannot simultaneously transmit and receive.

In some embodiments, the second non-AP MLD works on multiple links, which include at least one NSTR link pair including two links that cannot simultaneously transmit and receive.

In some embodiments, the P2P transmission between the non-AP MLD and the second non-AP MLD is based on the TXOP shared by the AP MLD.

In an example, in some embodiments, the above communication unit may be a communication interface, a transceiver, or an input-output interface of a communication chip or a system-on-chip. The above processing unit may be one or more processors.

It should be understood that the non-AP MLD 400 according to embodiments of the present disclosure may correspond to the first non-AP MLD in the method embodiments of the present disclosure, and the above and other operations and/or functions of respective units in the non-AP MLD 400 are used to implement the corresponding flows of the first non-AP MLD in the method 200 shown in FIGS. 7 to 43, and will not be repeated here for the sake of brevity.

Figure 53:
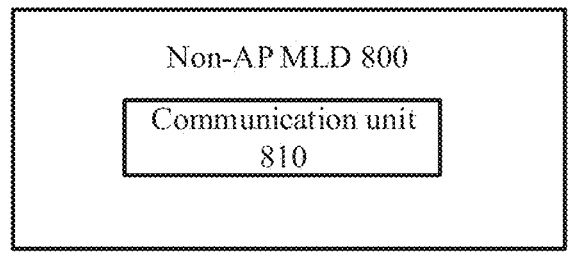
FIG. 53 is a schematic block diagram of another non-access point multi-link device (non-AP MLD) provided by an embodiment of the present disclosure.

FIG. 53 illustrates a schematic block diagram of a non-access point multi-link device (non-AP MLD) 800 according to an embodiment of the present disclosure. As illustrated in FIG. 53, the non-AP MLD 800 includes a communication unit 810.

The communication unit 810 is configured to send a third frame to a first non-AP MLD, the third frame indicates AID information of the non-AP MLD, and the first non-AP MLD is a sender device that is to perform a peer-to-peer (P2P) transmission with the non-AP MLD.

In some embodiments, the third frame further indicates BSSID information of the non-AP MLD.

In some embodiments, the third frame is a management frame.

In some embodiments, the third frame is an EHT Action frame.

In some embodiments, the EHT Action frame includes a category field, an EHT Action field, and a peer STA information notification control field, herein the category field indicates that the type of the Action frame is the EHT Action frame, the EHT Action field indicates that the EHT Action frame is used to notify information to a peer non-AP MLD, and the peer STA information notification control field indicates control information for notifying the information to the peer non-AP MLD.

In some embodiments, the EHT Action frame further includes an AID field and/or a BSSID field, herein the AID field indicates the AID information of the non-AP MLD, and the BSSID field indicates the BSSID information of the non-AP MLD.

In some embodiments, the peer non-AP information notification control field includes at least one of the following:
- an AID requested field, which indicates whether to request AID information of the peer non-AP MLD; or
- an AID presented field, which indicates whether the EHT Action frame includes the AID information of the non-AP MLD.

In some embodiments, the peer non-AP information notification control field includes at least one of the following:
- an AID requested field, which indicates whether to request AID information of the peer non-AP MLD;

an AID presented field, which indicates whether the EHT Action frame includes the AID information of the non-AP MLD;

a BSSID requested field, which indicates whether to request BSSID information of the peer non-AP MLD; or a BSSID presented field, which indicates whether the EHT Action frame includes BSSID information of the non-AP MLD.

In some embodiments, the communication unit 810 is further used to:

receive a second frame sent by the first non-AP MLD, where the second frame is used to request AID information of the non-AP MLD.

In some embodiments, the second frame is further used to request BSSID information of the non-AP MLD.

In some embodiments, the second frame further includes AID information of the first non-AP MLD and/or BSSID information of the first non-AP MLD.

In some embodiments, the second frame is a management frame.

In some embodiments, the second frame is an Action frame.

In some embodiments, the second frame is an EHT Action frame.

In some embodiments, the EHT Action frame includes a category field, an EHT Action field, and a peer STA information notification control field, herein the category field indicates that the type of the Action frame is the EHT Action frame, the EHT Action field indicates that the EHT Action frame is used to notify information to a peer non-AP MLD, and the peer STA information notification control field indicates control information for notifying the information to the peer non-AP MLD.

In some embodiments, the EHT Action frame further includes an AID field and/or a BSSID field, herein the AID field indicates the AID information of the first non-AP MLD, and the BSSID field indicates the BSSID information of the first non-AP MLD.

In some embodiments, the peer STA information notification control field includes:

an AID requested field, which indicates whether to request AID information of the peer non-AP MLD; and an AID presented field, which indicates whether the EHT Action frame includes AID information of the first non-AP MLD.

In some embodiments, the peer STA information notification control field includes:

an AID requested field, which indicates whether to request AID information of the peer non-AP MLD;

an AID presented field, which indicates whether the EHT Action frame includes AID information of the first non-AP MLD;

a BSSID requested field, which indicates whether to request BSSID information of the peer non-AP MLD; and a BSSID presented field, which indicates whether the EHT Action frame includes BSSID information of the first non-AP MLD.

In some embodiments, the first non-AP MLD works on multiple links, which include at least one non-simultaneous transmit and receive (NSTR) link pair including two links that cannot simultaneously transmit and receive.

In some embodiments, the non-AP MLD works on multiple links, which include at least one NSTR link pair including two links that cannot simultaneously transmit and receive.

In some embodiments, the P2P transmission between the first non-AP MLD and the non-AP MLD is based on the TXOP shared by the AP MLD.

In an example, in some embodiments, the above communication unit may be a communication interface, a transceiver, or an input-output interface of a communication chip or a system-on-chip. The above processing unit may be one or more processors.

It should be understood that the non-AP MLD 800 according to embodiments of the present disclosure may correspond to the second non-AP MLD in the method embodiments of the present disclosure, and the above and other operations and/or functions of respective units in the non-AP MLD 800 are used to implement the corresponding flows of the second non-AP MLD in the method 200 illustrated in FIGS. 7 to 43, and will not be repeated here for the sake of brevity.

Figure 54:
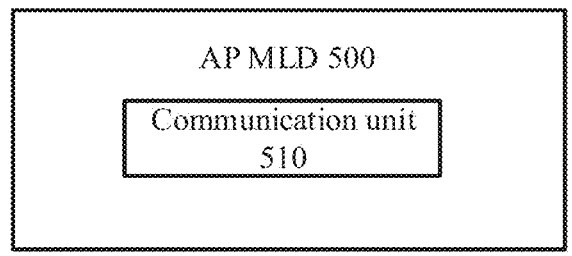
FIG. 54 is a schematic block diagram of an access point multi-link device (AP MLD) provided by an embodiment of the present disclosure.

FIG. 54 is a schematic block diagram of a network device according to an embodiment of the present disclosure. The network device 500 of FIG. 54 includes:

A processing unit 510, which is configured to determine a second non-access point (non-AP) multi-link device (MLD), herein the second non-AP MLD is a receiver device that is to perform a peer-to-peer (P2P) transmission with a first non-AP MLD.

In some embodiments, the second non-AP MLD is determined based on first indication information send by the first non-AP MLD.

In some embodiments, the first indication information indicates association identifier (AID) information of the second non-AP MLD.

In some embodiments, the AID information of the second non-AP MLD is carried by an aggregation control (A-Control) field.

In some embodiments, the A-Control field includes a control identifier (Control ID) field and a peer station (STA) AID field, here a value of the Control ID field is a reserved value, and the peer STA AID field indicates the AID information of the second non-AP MLD.

In some embodiments, the AID information of the second non-AP MLD is carried by an A-Control field in a first frame, herein the first frame includes at least one of the following:

a quality of service null data (QoS-Null-Data) frame, a quality of service data (QOS Data) frame, or a control frame wrapped using a control wrapper frame.

In some embodiments, the first frame further includes transmission opportunity (TXOP) duration requested information.

In some embodiments, the AID information of the second non-AP MLD is carried by a management frame.

In some embodiments, the AID information of the second non-AP MLD is carried by an extremely high throughput (EHT) Action frame.

In some embodiments, the EHT Action frame includes a category field, an EHT Action field, and an AID field, herein the category field indicates that the type of the Action frame is the EHT Action frame, the EHT Action field indicates that the EHT Action frame is used to notify AID information of a peer non-AP MLD, and the AID field indicates the AID information of the second non-AP MLD.

In some embodiments, the EHT Action frame includes a category field, an EHT Action field, and at least one peer non-AP MLD detail information field, herein the category field indicates that the type of the Action frame is the EHT Action frame, the EHT Action field indicates that the EHT Action frame is used to notify information of the peer non-AP MLD, and the peer non-AP MLD detail information field indicates the AID information of the second non-AP MLD and TXOP duration requested information.

In some embodiments, the EHT Action frame includes a peer non-AP MLD detail information field, herein the peer non-AP MLD detail information field includes an AID field and a TXOP duration requested field, the AID field indicates the AID information of the second non-AP MLD, and the TXOP duration requested field indicates the TXOP duration requested information.

In some embodiments, the EHT Action frame includes one or more peer non-AP MLD detail information fields. The peer non-AP MLD detail information field includes an AID field, a TXOP duration requested field, and a more information field. The AID field indicates the AID information of the second non-AP MLD, the TXOP duration requested field indicates the TXOP duration requested information, and the more information field indicates whether the EHT Action frame further includes another one or more non-AP MLD detail information fields.

In some embodiments, the first indication information indicates medium access control (MAC) address information of the second non-AP MLD.

In some embodiments, the MAC address information of the second non-AP MLD is carried by a management frame.

In some embodiments, the MAC address information of the second non-AP MLD is carried by an EHT Action frame.

In some embodiments, the EHT Action frame includes a category field, an EHT Action field, and at least one peer non-AP MLD detail information field, herein the category field indicates that the type of the Action frame is the EHT Action frame, the EHT Action field indicates that the EHT Action frame is used to notify information of the peer non-AP MLD, and the peer non-AP MLD detail information field indicates the MAC address information of the second non-AP MLD and TXOP duration requested information.

In some embodiments, the EHT Action frame includes a peer non-AP MLD detail information field, herein the peer non-AP MLD detail information field includes an MAC address field and a TXOP duration requested field, the MAC address field indicates the MAC address information of the second non-AP MLD, and the TXOP duration requested field indicates the TXOP duration requested information.

In some embodiments, the EHT Action frame includes one or more peer non-AP MLD detail information fields. The peer non-AP MLD detail information field includes an MAC address field, a TXOP duration requested field, and a more information field, the MAC address field indicates the MAC address information of the second non-AP MLD, the TXOP duration requested field indicates the TXOP duration requested information, and the more information field indicates whether the EHT Action frame further includes another one or more non-AP MLD detail information fields.

In some embodiments, the EHT Action frame includes a category field, an EHT Action field, and a link identifier field. The category field indicates that the type of the Action frame is the EHT Action frame, the EHT Action field indicates that the EHT Action frame is used to notify information of a peer non-AP MLD, and the link identifier field indicates the MAC address information of the second non-AP MLD and MAC address information of the first non-AP MLD.

In some embodiments, the MAC address information of the second non-AP MLD is carried by an event report frame.

In some embodiments, the event report frame includes a peer station (STA)/basic service set identifier (BSSID) address field indicating the MAC address information of the second non-AP MLD.

In some embodiments, the AP MLD further includes: a communication unit, which is configured to listen to a fourth frame sent by the first non-AP MLD.

The processing unit 510 is specifically configured to: determine a device corresponding to a receive address of the fourth frame as the second non-AP MLD when the fourth frame is used for P2P transmission and a device corresponding to a transmit address of the fourth frame has requested the AP MLD for a TXOP for P2P transmission in a first duration before receiving the fourth frame.

In some embodiments, the processing unit 510 is further configured to:
  determine that the fourth frame is used for P2P transmission when a value of a target distribution system (DS) field in a frame control field of the fourth frame is 0 and when a value of a source DS field in the frame control field is 0.

In some embodiments, the processing unit 510 is further configured to:
  restrict a relevant transmission of a first transmission in a TXOP duration shared by the AP MLD to the first non-AP MLD, herein the first transmission is a transmission to be performed in the TXOP duration shared by the AP MLD to the first non-AP MLD, or a transmission being performed in the TXOP duration shared by the AP MLD to the first non-AP MLD.

In some embodiments, the first transmission is a transmission between a first attaching STA in the first non-AP MLD and a first attaching STA in the second non-AP MLD, herein the relevant transmission of the first transmission includes at least one of the following:
  a downlink transmission initiated by an attaching AP in the AP MLD to another attaching STA other than the first attaching STA in the first non-AP MLD;
  a downlink transmission initiated by the attaching AP in the AP MLD to another attaching STA other than the first attaching STA in the second non-AP MLD;
  a P2P transmission initiated by an attaching STA in a third non-AP MLD to the another attaching STA other than the first attaching STA in the first non-AP MLD using a TXOP sharing mechanism; or
  a P2P transmission initiated by the attaching STA in the third non-AP MLD to the another attaching STA other than the first attaching STA in the second non-AP MLD using the TXOP sharing mechanism,
  herein the third non-AP MLD is another non-AP MLD other than the first non-AP MLD and the second non-AP MLD.

In some embodiments, the first transmission is a transmission between the first attaching STA in the first non-AP MLD and the first attaching STA in the second non-AP MLD, herein the relevant transmission of the first transmission includes at least one of the following:
  a downlink transmission initiated by the attaching AP in the AP MLD to another attaching STA other than the first attaching STA in the first non-AP MLD; or
  a P2P transmission initiated by the attaching STA in the third non-AP MLD to the another attaching STA other than the first attaching STA in the first non-AP MLD using a TXOP sharing mechanism,
  herein the third non-AP MLD is another non-AP MLD other than the first non-AP MLD and the second non-AP MLD.

In some embodiments, the first non-AP MLD works on multiple links, which include at least one non-simultaneous transmit and receive (NSTR) link pair including two links that cannot simultaneously transmit and receive.

In some embodiments, the second non-AP MLD works on multiple links, which include at least one NSTR link pair including two links that cannot simultaneously transmit and receive.

In some embodiments, the P2P transmission between the first non-AP MLD and the second non-AP MLD is based on the TXOP shared by the AP MLD.

In an example, in some embodiments, the above communication unit may be a communication interface, a transceiver, or an input-output interface of a communication chip or a system-on-chip. The above processing unit may be one or more processors.

It should be understood that the AP MLD 500 according to embodiments of the present disclosure may correspond to the AP MLD in the method embodiments of the present disclosure, and the above and other operations and/or functions of respective units in the AP MLD 500 are used to implement the corresponding flows of the AP MLD in the method 300 illustrated in FIGS. 44 to 51, and will not be repeated here for the sake of brevity.

Figure 55:
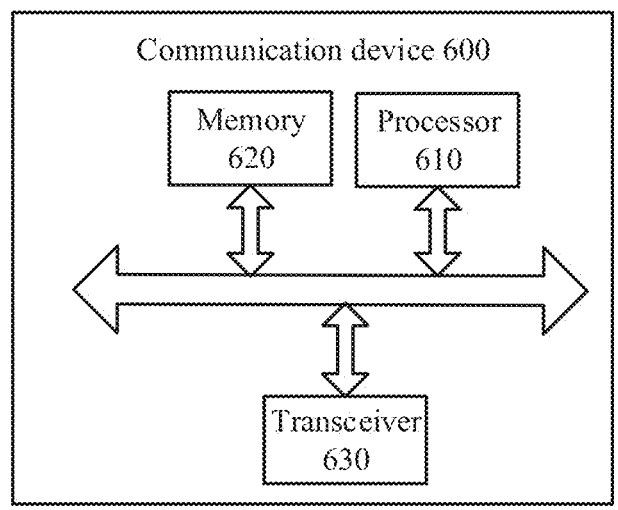
FIG. 55 is a schematic block diagram of a communication device provided by an embodiment of the present disclosure.

FIG. 55 is a schematic structural diagram of a communication device 600 provided by an embodiment of the present disclosure. The communication device 600 illustrated in FIG. 55 includes a processor 610, and the processor 610 may invoke and run a computer program from a memory to implement the method in embodiments of the present disclosure.

In an example, as illustrated in FIG. 55, the communication device 600 may further include a memory 620. Herein, the processor 610 may invoke and run a computer program from the memory 620 to implement the method in embodiments of the present disclosure.

Herein, the memory 620 may be a separate device independent of the processor 610, or may be integrated into the processor 610.

In an example, as illustrated in FIG. 55, the communication device 600 may further include a transceiver 630, the processor 610 may control the transceiver 630 to communicate with other devices, and in particular, may send information or data to other devices, or receive information or data sent from other devices.

Herein, the transceiver 630 may include a transmitter and a receiver. The transceiver 630 may further include one or more antennas.

In an example, the communication device 600 may specifically be the first non-AP MLD of embodiments of the present disclosure, and the communication device 600 may implement the corresponding flows implemented by the first non-AP MLD in various methods of embodiments of the present disclosure, and will not be repeated here for the sake of brevity.

In an example, the communication device 600 may specifically be the second non-AP MLD of embodiments of the present disclosure, and the communication device 600 may implement the corresponding flows implemented by the second non-AP MLD in various methods of embodiments of the present disclosure, and will not be repeated here for the sake of brevity.

In an example, the communication device 600 may specifically be the AP MLD of embodiments of the present disclosure, and the communication device 600 may implement the corresponding flows implemented by the AP MLD in various methods of embodiments of the present disclosure, and will not be repeated here for the sake of brevity.

Figure 56:
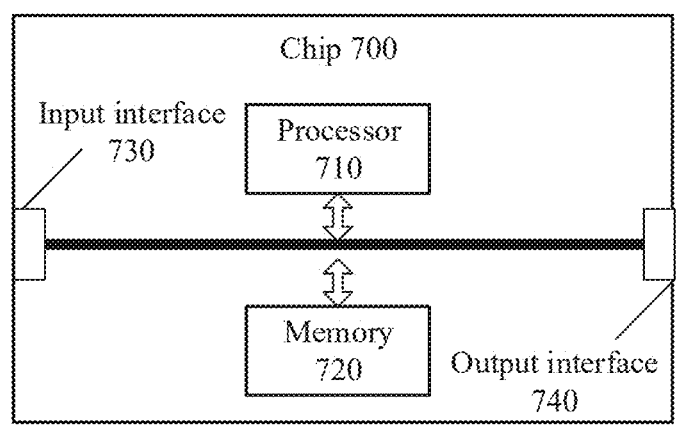
FIG. 56 is a schematic block diagram of a chip provided by an embodiment of the present disclosure.

FIG. 56 is a schematic structural diagram of a chip of an embodiment of the present disclosure. The chip 700 illustrated in FIG. 56 includes a processor 710, and the processor 710 may invoke and run a computer program from a memory to implement the method in embodiments of the present disclosure.

In an example, as illustrated in FIG. 56, the chip 700 may further include a memory 720. Herein, the processor 710 may invoke and run a computer program from the memory 720 to implement the method in embodiments of the present disclosure.

Herein, the memory 720 may be a separate device independent of the processor 710, or may be integrated into the processor 710.

In an example, the chip 700 may further include an input interface 730. Herein, the processor 710 may control the input interface 730 to communicate with other devices or chips, and in particular, may acquire information or data sent from other devices or chips.

In an example, the chip 700 may further include an output interface 740. Herein, the processor 710 may control the output interface 740 to communicate with other devices or chips, and in particular, may output information or data to other devices or chips.

In an example, the chip may be applied to the AP MLD of embodiments of the present disclosure, and the chip may implement the corresponding flows implemented by the AP MLD in various methods of embodiments of the present disclosure, and will not repeated herein for the sake of brevity.

In an example, the chip may be applied to the first non-AP MLD of embodiments of the present disclosure, and the chip may implement the corresponding flows implemented by the first non-AP MLD in various methods of embodiments of the present disclosure, and will not repeated herein for the sake of brevity.

In an example, the chip may be applied to the second non-AP MLD of embodiments of the present disclosure, and the chip may implement the corresponding flows implemented by the second non-AP MLD in various methods of embodiments of the present disclosure, and will not repeated herein for the sake of brevity.

It should be understood that the chip referred to in embodiments of the present disclosure may also be referred to as a system level chip, a system on chip, a chip system, or a system on a chip, etc.

It should be understood that the processor of embodiments of the present disclosure may be an integrated circuit chip with signal processing capability. In implementation, the respective operations of the above method embodiments may be accomplished by integrated logic circuits of hardware in the processor or by instructions in the form of software. The above processor may be a general purpose processor, a digital signal processor (DSP), an application specific integrated circuit (ASIC), a field programmable gate array (FPGA) or other programmable logic devices, a discrete gate or a transistor logic device, a discrete hardware component. The various methods, operations and logic diagrams disclosed in embodiments of the present disclosure may be implemented or performed. The general purpose processor may be a microprocessor, or the processor may be any conventional processor or the like. The operations of the method disclosed in combination with embodiments of the present disclosure may be directly embodied as being performed by a hardware decoding processor or a combination of the hardware and software modules in the decoding processor. The software module may be located in random access memory (RAM), flash memory, read-only memory (ROM), programmable ROM (PROM), or electrically erasable programmable memory, registers and other storage medium mature in the art. The storage medium is located in the memory, and the processor reads the information in the memory and completes the operations in the above methods in conjunction with its hardware.

It can be understood that the memory in embodiments of the present disclosure may be volatile memory or nonvolatile memory or may include both volatile and nonvolatile memory. Herein, the nonvolatile memory may be ROM, PROM, erasable PROM (EPROM), electrically EPROM (EEPROM), or flash memory. The volatile memory may be a RAM which serves as an external cache. By way of illustration, but not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and direct rambus RAM (DR RAM). It should be noted that the memory of the system and method described in the present disclosure is intended to include but not to limit these and any other suitable types of memory.

It should be understood that the memory described above is exemplary, but not limiting. For example, the memory in embodiments of the present disclosure may also be SRAM, DRAM, SDRAM, DDR SDRAM, ESDRAM, SLDRAM, and DR RAM, etc. That is to say, the memory in embodiments of the present disclosure is intended to include but not to limit these and any other suitable types of memory.

Embodiments of the present disclosure also provide a computer-readable storage medium for storing computer programs.

In an example, the computer-readable storage medium may be applied to the AP MLD in embodiments of the present disclosure, and the computer program causes a computer to perform the corresponding flows implemented by the AP MLD in various methods of embodiments of the present disclosure, and will not repeated herein for the sake of brevity.

In an example, the computer-readable storage medium may be applied to the first non-AP MLD in embodiments of the present disclosure, and the computer program causes a computer to perform the corresponding flows implemented by the first non-AP MLD in various methods of embodiments of the present disclosure, and will not repeated herein for the sake of brevity.

In an example, the computer-readable storage medium may be applied to the second non-AP MLD in embodiments of the present disclosure, and the computer program causes a computer to perform the corresponding flows implemented by the second non-AP MLD in various methods of embodiments of the present disclosure, and will not repeated herein for the sake of brevity.

Embodiments of the present disclosure further provide a computer program product, which includes computer program instructions.

In an example, the computer program product may be applied to the AP MLD in embodiments of the present disclosure, and the computer program instructions cause a computer to perform the corresponding flows implemented by the AP MLD in various methods of embodiments of the present disclosure, and will not repeated herein for the sake of brevity.

In an example, the computer program product may be applied to the first non-AP MLD in embodiments of the present disclosure, and the computer program instructions cause a computer to perform the corresponding flows implemented by the first non-AP MLD in various methods of embodiments of the present disclosure, and will not repeated herein for the sake of brevity.

In an example, the computer program product may be applied to the second non-AP MLD in embodiments of the present disclosure, and the computer program instructions cause a computer to perform the corresponding flows implemented by the second non-AP MLD in various methods of embodiments of the present disclosure, and will not repeated herein for the sake of brevity.

Embodiments of the present disclosure further provide a computer program.

In an example, the computer program may be applied to the AP MLD in embodiments of the present disclosure, and when running on the computer, the computer program causes the computer to perform the corresponding flows implemented by the AP MLD in various methods of embodiments of the present disclosure, and will not repeated herein for the sake of brevity.

In an example, the computer program may be applied to the first non-AP MLD in embodiments of the present disclosure, and when running on the computer, the computer program causes the computer to perform the corresponding flows implemented by the first non-AP MLD in various methods of embodiments of the present disclosure, and will not repeated herein for the sake of brevity.

In an example, the computer program may be applied to the second non-AP MLD in embodiments of the present disclosure, and when running on the computer, the computer program causes the computer to perform the corresponding flows implemented by the second non-AP MLD in various methods of embodiments of the present disclosure, and will not repeated herein for the sake of brevity.

Those skilled in the art will appreciate that the various example units and algorithm operations described in conjunction with embodiments disclosed in the present disclosure can be implemented in electronic hardware or a combination of computer software and electronic hardware. Whether these functions are performed in the hardware or software form depends on the specific application and design constraints of the technical solution. Those skilled in the art may use different methods for each particular application to implement the described function, but such implementation should not be considered beyond the scope of the present disclosure.

Those skilled in the art will clearly appreciate that, for convenience and brevity of description, specific working processes of the above-described systems, apparatuses, and units may refer to corresponding processes in the foregoing method embodiments, and will not be repeated herein.

In several embodiments provided by the present disclosure, it should be understood that the disclosed systems, apparatuses and methods may be implemented in other ways. For example, the above-described apparatus embodiments are only exemplary. For example, the partition of units is only a logical functional partition, which may be implemented in another way, for example, multiple units or components may be combined or integrated into another system, or some features may be ignored or not performed. On the other hand, the coupling, direct coupling or communication connection between each other shown or discussed above may be indirect coupling or communication connection through some interfaces, devices or units, and may be electrical, mechanical or other form.

The units illustrated as separate components may or may not be physically separated, and components displayed as units may or may not be physical units, i.e. may be located in one place, or may be distributed over multiple network units. Some or all of the units may be selected according to actual needs to achieve the object of embodiments of the present disclosure.

In addition, each functional unit in each embodiment of the present disclosure may be integrated in one processing unit, each unit may exist physically alone, or two or more units may be integrated in one unit.

The functions may be stored in a computer readable storage medium if implemented in the form of software functional units and sold or used as independent products. Based on such understanding, the technical solution of the present disclosure, in essence or a part contributing to the prior art, or a part of the technical solution, may be embodied in the form of a software product. The computer program product is stored in a storage medium and includes several instructions for causing a computer device (which may be a personal computer, server, or network device, etc.) to perform all or part of the operations of the method of respective embodiments of the present disclosure. The aforementioned storage medium includes various mediums capable of storing program codes such as U disk, mobile hard disk, ROM, RAM, magnetic disk or optical disk.

The above-mentioned is only the specific implementation of the present disclosure, but the scope of protection of the present disclosure is not limited thereto. Any changes or substitutions may be easily think of by those skilled familiar with the art within the technical scope disclosed by the present disclosure, should be covered within the scope of protection of the present disclosure. Therefore, the scope of protection of the present disclosure shall be subject to the scope of protection of the claims.

What is claimed is:

1. A method for wireless communication, comprising:
    determining, by an access point multi-link device (AP MLD), a second non-access point (non-AP) multi-link device (MLD), wherein the second non-AP MLD is a non-AP MLD that is to perform a peer-to-peer (P2P) transmission with a first non-AP MLD,
    wherein the P2P transmission between the first non-AP MLD and the second non-AP MLD is based on a transmission opportunity (TXOP) duration, shared by the AP MLD, during which a relevant transmission of a first transmission is restricted,
    wherein the first transmission is a transmission to be performed in the TXOP duration shared by the AP MLD to the first non-AP MLD, or a transmission being performed in the TXOP duration shared by the AP MLD to the first non-AP MLD,
    wherein the first non-AP MLD and the second non-AP MLD are non-AP MLDs that work on non-simultaneous transmit and receive (NSTR) link pairs, and each NSTR link pair comprises two links that cannot simultaneously transmit and receive.

2. The method of claim 1, wherein the second non-AP MLD is determined based on first indication information sent by the first non-AP MLD.

3. The method of claim 1, wherein the first indication information indicates medium access control (MAC) address information of the second non-AP MLD.

4. The method of claim 1, wherein the first transmission is a transmission between a first attaching STA in the first non-AP MLD and a first attaching STA in the second non-AP MLD; and wherein the relevant transmission of the first transmission comprises at least one of the following:
    a downlink transmission initiated by an attaching AP in the AP MLD to another attaching STA other than the first attaching STA in the first non-AP MLD;
    a downlink transmission initiated by the attaching AP in the AP MLD to another attaching STA other than the first attaching STA in the second non-AP MLD;
    a P2P transmission initiated by an attaching STA in a third non-AP MLD to the another attaching STA other than the first attaching STA in the first non-AP MLD using a TXOP sharing mechanism; or
    a P2P transmission initiated by the attaching STA in the third non-AP MLD to the another attaching STA other than the first attaching STA in the second non-AP MLD using the TXOP sharing mechanism,
    wherein the third non-AP MLD is another non-AP MLD other than the first non-AP MLD and the second non-AP MLD.

5. The method of claim 1, wherein the first transmission is a transmission between a first attaching STA in the first non-AP MLD and a first attaching STA in the second non-AP MLD; and wherein the relevant transmission of the first transmission comprises at least one of the following:
    a downlink transmission initiated by an attaching AP in the AP MLD to another attaching STA other than the first attaching STA in the first non-AP MLD; or
    a P2P transmission initiated by an attaching STA in a third non-AP MLD to the another attaching STA other than the first attaching STA in the first non-AP MLD using a TXOP sharing mechanism,
    wherein the third non-AP MLD is another non-AP MLD other than the first non-AP MLD and the second non-AP MLD.

6. The method of claim 1, wherein the P2P transmission between the first non-AP MLD and the second non-AP MLD is based on a TXOP shared by the AP MLD.

7. A non-access point multi-link device (non-AP MLD), comprising:
    a memory, configured to store a computer program; and
    a processor, configured to invoke and run the computer program stored in the memory to perform operations comprising:
    performing a peer-to-peer (P2P) transmission with a second non-AP MLD determined by an access point multi-link device (AP MLD),
    wherein the P2P transmission between the first non-AP MLD and the second non-AP MLD is based on a transmission opportunity (TXOP) duration, shared by the AP MLD, during which a relevant transmission of a first transmission is restricted,
    wherein the first transmission is a transmission to be performed in the TXOP duration shared by the AP MLD to the first non-AP MLD, or a transmission being performed in the TXOP duration shared by the AP MLD to the first non-AP MLD,
    wherein the first non-AP MLD and the second non-AP MLD are non-AP MLDs that work on non-simultaneous transmit and receive (NSTR) link pairs, and each NSTR link pair comprises two links that cannot simultaneously transmit and receive.

8. The non-AP MLD of claim 7, further comprising:
    sending, by the first non-AP MLD to the second non-AP MLD, a second frame used to request AID information of the second non-AP MLD.

9. The non-AP MLD of claim 8, wherein the second frame is further used to request basic service set identifier (BSSID) information of the second non-AP MLD.

10. The non-AP MLD of claim 8, wherein the second frame further comprises at least one of:
   association identifier (AID) information of the first non-AP MLD; or
   BSSID information of the first non-AP MLD.

11. The non-AP MLD of claim 8, wherein the second frame is an extremely high throughput (EHT) Action frame.

12. The non-AP MLD of claim 11, wherein the EHT Action frame comprises a category field, an EHT Action field, and a peer STA information notification control field,
   wherein the category field indicates that a type of an Action frame is the EHT Action frame, the EHT Action field indicates that the EHT Action frame is used to notify information to a peer non-AP MLD, and the peer STA information notification control field indicates control information for notifying the information to the peer non-AP MLD.

13. The non-AP MLD of claim 11, wherein the EHT Action frame further comprises at least one of an AID field or a BSSID field,
   wherein the AID field indicates AID information of the first non-AP MLD, and the BSSID field indicates BSSID information of the first non-AP MLD.

14. An access point multi-link device (AP MLD), comprising:
   a memory, configured to store a computer program; and
   a processor, configured to invoke and run the computer program stored in the memory to perform operations comprising:
   determining a second non-access point (non-AP) multi-link device (MLD), wherein the second non-AP MLD is a non-AP MLD that is to perform a peer-to-peer (P2P) transmission with a first non-AP MLD,
   wherein the P2P transmission between the first non-AP MLD and the second non-AP MLD is based on a transmission opportunity (TXOP) duration, shared by the AP MLD, during which a relevant transmission of a first transmission is restricted,
   wherein the first transmission is a transmission to be performed in the TXOP duration shared by the AP MLD to the first non-AP MLD, or a transmission being performed in the TXOP duration shared by the AP MLD to the first non-AP MLD,
   wherein the first non-AP MLD and the second non-AP MLD are non-AP MLDs that work on non-simultaneous transmit and receive (NSTR) link pairs, and each NSTR link pair comprises two links that cannot simultaneously transmit and receive.

15. The AP MLD of claim 14, wherein the second non-AP MLD is determined based on first indication information sent by the first non-AP MLD.

16. The AP MLD of claim 14, wherein the first indication information indicates medium access control (MAC) address information of the second non-AP MLD.

17. The AP MLD of claim 16, wherein the MAC address information of the second non-AP MLD is carried by a management frame.

18. The AP MLD of claim 14, wherein the first transmission is a transmission between a first attaching STA in the first non-AP MLD and a first attaching STA in the second non-AP MLD; and wherein the relevant transmission of the first transmission comprises at least one of the following:
   a downlink transmission initiated by an attaching AP in the AP MLD to another attaching STA other than the first attaching STA in the first non-AP MLD;
   a downlink transmission initiated by the attaching AP in the AP MLD to another attaching STA other than the first attaching STA in the second non-AP MLD;
   a P2P transmission initiated by an attaching STA in a third non-AP MLD to the another attaching STA other than the first attaching STA in the first non-AP MLD using a TXOP sharing mechanism; or
   a P2P transmission initiated by the attaching STA in the third non-AP MLD to the another attaching STA other than the first attaching STA in the second non-AP MLD using the TXOP sharing mechanism,
   wherein the third non-AP MLD is another non-AP MLD other than the first non-AP MLD and the second non-AP MLD.

19. The AP MLD of claim 14, wherein the first transmission is a transmission between a first attaching STA in the first non-AP MLD and a first attaching STA in the second non-AP MLD; and wherein the relevant transmission of the first transmission comprises at least one of the following:
   a downlink transmission initiated by an attaching AP in the AP MLD to another attaching STA other than the first attaching STA in the first non-AP MLD; or
   a P2P transmission initiated by an attaching STA in a third non-AP MLD to the another attaching STA other than the first attaching STA in the first non-AP MLD using a TXOP sharing mechanism,
   wherein the third non-AP MLD is another non-AP MLD other than the first non-AP MLD and the second non-AP MLD.

20. The AP MLD of claim 14, wherein the P2P transmission between the first non-AP MLD and the second non-AP MLD is based on a TXOP shared by the AP MLD.

* * * * *